US012803007B2

(12) United States Patent
Yang et al.

(10) Patent No.: US 12,803,007 B2
(45) Date of Patent: Nov. 17, 2026

(54) # HIGH-ENTROPY ALLOY FOR HIGH-PERFORMANCE DIRECT ETHANOL FUEL CELLS

(71) Applicant: University of Central Florida Research Foundation, Inc., Orlando, FL (US)

(72) Inventors: Yang Yang, Orlando, FL (US); Jinfa Chang, Orlando, FL (US)

(73) Assignee: University of Central Florida Research Foundation, Inc., Orlando, FL (US)

( * ) Notice: Subject to any disclaimer, the term of this patent is extended or adjusted under 35 U.S.C. 154(b) by 641 days.

(21) Appl. No.: 18/219,983

(22) Filed: Jul. 10, 2023

(65) Prior Publication Data

US 2024/0014410 A1 Jan. 11, 2024

Related U.S. Application Data

(60) Provisional application No. 63/388,085, filed on Jul. 11, 2022.

(51) Int. Cl.
*H01M 4/92* (2006.01)
*H01M 8/1011* (2016.01)

(52) U.S. Cl.
CPC ........... *H01M 4/925* (2013.01); *H01M 4/921* (2013.01); *H01M 8/1013* (2013.01)

(58) Field of Classification Search
CPC ..... H01M 4/925; H01M 4/921; H01M 8/1013
See application file for complete search history.

(56) References Cited

U.S. PATENT DOCUMENTS

2011/0124499 A1* 5/2011 Fang ..................... B82Y 40/00 977/840
2018/0358641 A1 12/2018 Lewinski et al.

OTHER PUBLICATIONS

Thomas A.A. Batchelor et al. "High-Entropy Alloys as a Discovery Platform for Electrocatalysis" Mar. 20, 2019. pp. 834-845. Joule 3. CellPress.

Jinfa Chang et al. "An Effective Pd-Ni2P/C Anode Catalyst for Direct Formic Acid Fuel Cells" 2013. pp. S2-S28. Angewandte Chemie.

Qingqing Ding et al. "Tuning element distribution, structure and properties by composition in high-entropy alloys" Oct. 2019, pp. 223-230. vol. 574. Nature.

Wenxin Du et al. "Highly Active Iridium/Iridium Tin/Tin Oxide Heterogeneous Nanoparticles as Alternative Electrocatalysts for the Ethanol Oxidation Reaction" 2011, pp. 15172-157183. Journal of American Chemical Society.

Nina Erini et al. "The Effect of Surface Site Ensembles on the Activity and Selectivity of Ethanol Electrooxidation by Octahedral PtNiRh Nanoparticles" 2017, Angewandte Chemie, 10 pages.

Xiaoyang Fu et al. "Noble metal based electrocatalysts for alcohol oxidation reactions in alkaline media" 2022, Advanced Functional Materials, vol. 32, Issue 11.

Nana Han et al. "Nitrogen-doped tungsten carbide nanoarray as an efficient bifunctional electrocatalyst for water splitting in acid" 2018, Nature Communications, 9:924.

Graeme Henkelman et al. "A climbing image nudged elastic band method for finding saddle points and minimum energy paths" Journal of Chemical Physics, Dec. 8, 2000. vol. 113, No. 22, pp. 9901-9904. American Institute of Physics.

Wei Hong et al. "Bimetallic PdPt nanowire networks with enhanced electrocatalytic activity for ethylene glycol and glycerol oxidation" 2015, Energy & Environmental Science, Issue 10.

Richard Kavanagh et al. "Origin of Low CO2 Selectivity on Platinum in the Direct Ethanol Fuel Cell" 2012, Angew. Chem. Int. Ed. 51, 1572-1575.

Junqing Yan et al. "Single atom tungsten doped ultrathin α-Ni(OH)2 for enhanced electrocatalytic water oxidation" 2019, Nature Communications. 10:2149.

Ambarish Kulkarni et al. "Understanding Catalytic Activity Trends in the Oxygen Reduction Reaction" 2018, Chemical reviews. 118, 5, 2302-2312.

Changqing Li et al. "Recent Advances in Noble Metal (Pt, Ru, and Ir)-Based Electrocatalysts for Efficient Hydrogen Evolution Reaction" 2020. ACS Omega, 5:31-39.

Hongdong Li et al. "Fast site-to-site electron transfer of high-entropy alloy nanocatalyst driving redox electrocatalysis" 2020. Nature Communications. 11:5437.

Mufan Li et al. "Ultrafine jagged platinum nanowires enable ultrA high mass activity for the oxygen reduction reaction" Dec. 16, 2016. Science, vol. 354 Issue 6318, pp. 1414-1415.

Jing Liu et al. "High performance platinum single atom electrocatalyst for oxygen reduction reaction" Jul. 24, 2017. Nature Communications. 8:15938.

(Continued)

*Primary Examiner* — Yong L Chu
(74) *Attorney, Agent, or Firm* — Molly L. Sauter; Trenam Law

(57) ABSTRACT

Described herein relates to a high-entropy alloy (hereinafter "HEA") catalyst and a method of optimizing a catalytic reaction within an electrochemical cell. The HEA catalyst may be fabricated from the following which includes but is not limited to Platinum acetylacetonate, Palladium acetylacetonate, Iron acetylacetonate, Cobalt acetylacetonate, Nickel acetylacetonate, Manganese acetylacetonate, Potassium, Ethanol, Perchloric Acid, Oleylamine, 1-Octadecene, and/or Cyclohexane. The HEA catalyst may provide a substantially decreased polarization overpotential and active energy barrier for the electrochemical cell. In addition, the HEA catalyst may operate stably at a constant working voltage for a substantial period of time, with a negligible performance decay of the output density, whether using $O_2$ and/or air as cathode feeding. As such, the HEA catalyst may be used with the electrochemical cell to replace a $H_2$—$O_2$ fuel cell, since the HEA catalyst provides similar power density with long-term operating, solving the storage and transportation problems of $H_2$.

15 Claims, 84 Drawing Sheets

(56) References Cited

OTHER PUBLICATIONS

Rajesh Kodiyath et al. "Promoted C-C Bond Cleavage over Intermetallic TaPt3 Catalyst toward Low-temperature Energy Extraction from Ethanol" 2015. Energy & Environmental Science 8(6).
M. Luo et al. "PdMo Bimetallene for Oxygen Reduction Catalysis" Sep. 2019. Nature. 574, 81-85.
Li, Mufan et al. "Single-atom tailoring of platinum nanocatalysts for high-performance multifunctional electrocatalysis" 2019. Nature Catalysis, 2(6).
Ahmed Naitabdi et al. "CO oxidation activity of Pt, Zn and ZnPt nanocatalysts: a comparative study with in situ Near-Ambient Pressure X-ray Photoelectron Spectroscopy" 2018. Nanoscale. 10, 6566-6580.
Nagappan Ramaswamy et al. "Alkaline Anion-Exchange Membrane Fuel Cells: Challenges in Electrocatalysis and Interfacial Charge Transfer" 2019. Chemical Reviews.
Rubén Rizo et al. "Pt-richcore/Sn-richsubsurface/Ptskin nanocubes as highly active and stable electrocatalysts for the ethanol oxidation reaction" 2018. Journal of the American Chemical Society.
Deli Wang et al. "Pt-Decorated PdCo@Pd/C Core-Shell Nanoparticles with Enhanced Stability and Electrocatalytic Activity for Oxygen Reduction Reaction" J. Am. Chem. Soc. 2010, 132, 50, 17664-17666.
Minhua Shao et al. "Recent Advances in Electocatalysts for Oxygen Reduction Reaction." 2016. Chemical Reviews, V 116 (6) 3594-3657.
Vojislav R. Stamenkovic et al. "Improved Oxygen Reduction Activity on Pt3Ni(111) via Increased Surface Site Availability" Jan. 2007, Sciencexpress, USA.
Weiyan Ni et al. "An efficient nickel hydrogen oxidation catalyst for hydroxide exchange membrane fuel cells" 2022. Nature Materials, 21, 804-810.
Xinlong Tian et al. Engineering bunched Pt-Ni alloy nanocages for efficient oxygen reduction in practical fuel cells. 2019. Science 366, 850-856.
Xinlong Tian et al. "Advanced Electrocatalysts for the Oxygen Reduction Reaction in Energy Conversion Technologies" 2020. Joule 4, 45-68.
Pengsong Li et al. "Boosting oxygen evolution of single-atomic ruthenium through electronic coupling with cobaltiron layered double hydroxides" 2019. Nature Communications. 10:1711.
Guanzhi Wang et al. "Programmable Exposure of Pt Active Facets for Efficient Oxygen Reduction" 2019. Angewandte Chemie, vol. 58, Issue 44, pp. 15848-15854.
Siwen Wang et al. "Predicting Catalytic Activity of High-Entropy Alloys for Electrocatalysis" Mar. 14, 2019, Chem 5, 494-504.
Chi Xiao et al. "High-Index-Facet- and High-Surface-Energy Nanocrystals of Metals and Metal Oxides as Highly Efficient Catalysts" Dec. 16, 2020. Joule 4. pp. 2562-2598.
Yonggang Yao et al. "High-entropy nanoparticles: Synthesis-structureproperty relationships and data-driven discovery" Apr. 2022. Science 376, 151.
Yonggang Yao et al. "Carbothermal shock synthesis of high-entropy-alloy nanoparticles" Mar. 2018, Science 359, 1489-1494.
Changhong Zhan et al. "Subnanometer high-entropy alloy nanowires enable remarkable hydrogen oxidation catalysis" 2021. Narure Communications. 12:6261.
Wei Zhang et al. "Strong preciousmetal-metal oxide interaction for oxygen reduction reaction: A strategy for efficient catalyst design" Oct. 2022. Susmat Wiley, 3:2-20.
Liu Yang et al. "Recent Progress in MOF-Derived, Heteroatom-Doped Porous Carbons as Highly Efficient Electrocatalysts for Oxygen Reduction Reaction in Fuel Cells" 2018. Advanced Functional Materials, 28, 1704537.
Zhe Jia et al. "A Novel Multinary Intermetallic as an Active Electrocatalyst for Hydrogen Evolution" 2020. Advanced Materials. 32, 2000385.
Siraj Sultan et al. "Single Atoms and Clusters Based Nanomaterials for Hydrogen Evolution, Oxygen Evolution Reactions, and Full Water Splitting" 2019, Advanced Energy Materials, 9, 1900624.
Wenyu Shao et al. "Polyester@MXene nanofibers-based yarn electrodes" 2018. Journal of Power Sources, 396: 683-690.
Wen-Yi Huo et al. "Recent progress on high-entropy materials for electrocatalytic water splitting applications" 2021 Tungsten, 3:161-180.
Yue Xin et al. "High-Entropy Alloys as a Platform for Catalysis: Progress, Challenges, and Opportunities" 2020. ACS Catalysis, 10, 11280-11306.
Gracita M. Tomboc et al. "High entropy alloy electrocatalysts: a critical assessment of fabrication and performance" 2020. Journal of Materials Chemistry A. 8, 14844-14862.
Azadeh Amiri et al. "Recent progress of high-entropy materials for energy storage and conversion" 2021. Journal of Materials Chemistry A. 9, 782-823.
Jaumin Kim et al. "A Porous Pyrochlore Y2[Ru1.6Y0.4]O7—d Electrocatalyst for Enhanced Performance towards the Oxygen Evolution Reaction in Acidic Media" 2018. Angewandte Chemie, 130, 14073-14077.
Kelsey A. Stoerzinger et al. "Orientation-Dependent Oxygen Evolution Activities of Rutile IrO2 and RuO2" 2014. The Journal of Physical Chemistry Letters. 5, 1636-1641.
Jie Yu et al. "Recent Advances and Prospective in Ruthenium-Based Materials for Electrochemical Water Splitting" 2019. ACS Catalysis. 9, 9973-10011.
Hang Liu et al. "Operando Near-Ambient Pressure X-ray Photoelectron Spectroscopy Study of the CO Oxidation Reaction on the Oxide/ Metal Model Catalyst ZnO/Pt(111)" 2019. ACS Catal. 9, 10212-10225.
Chao Feng et al. "Fe-Based Electrocatalysts for Oxygen Evolution Reaction: Progress and Perspectives" 2020. ACS Catal. 10, 4019-4047.
Xiao Wang et al. "Porous Cobalt—Nickel Hydroxide Nanosheets with Active Cobalt lons for Overall Water Splitting" 2019. Small 15, 1804832.
Pengfei Zhang et al. "Nitrogen-doped carbon wrapped Co—Mo2C dual Mott—Schottky nanosheets with large porosity for efficient water electrolysis," 2021. Applied Catalysis B: Environmental 284, 119738.
Tingting Liang et al. "Interface and valence modulation on scalable phosphorene/phosphide lamellae for efficient water electrolysis" 2020. Chemical Engineering Journal 395, 124976.
Claudio Bianchini et al. "Palladium-Based Electrocatalysts for Alcohol Oxidation in Half Cells and in Direct Alcohol Fuel Cells" Chem. Rev. 2009, 109, 4183-4206.
Brian C. H. Steele et al. "Materials for fuel-cell technologies" Nov. 15, 2001. Nature, vol. 414, pp. 344-352.
In Kim et al. "Catalytic Reactions in Direct Ethanol Fuel Cells" Angew. Chem. Int. Ed. 2011, 50, 2270 -2274.
Zhixiu Liang et al. "Direct 12-Electron Oxidation of Ethanol on a Ternary Au(core)- Ptlr(Shell) Electrocatalyst" J. Am. Chem. Soc. 2019, 141, 9629-9636.
A. Kowal et al. "Ternary Pt/Rh/SnO2 electrocatalysts for oxidizing ethanol to CO2" Jan. 2009. Nature Materials, vol. 8, pp. 325-330.
Mming Zhu et al. "Subnanometer PtRh Nanowire with Alleviated Poisoning Effect and Enhanced C—C Bond Cleavage for Ethanol Oxidation Electrocatalysis" ACS Catal. 2019, 9, 6607-6612.
H. Wang et al. "Ethanol Electrooxidation on a Carbon-Supported Pt Catalyst: Reaction Kinetics and Product Yields" J. Phys. Chem. B 2004, 108, 19413-19424.
Claudio Bianchini et al. "Selective oxidation of ethanol to acetic acid in highly efficient polymer electrolyte membrane-direct ethanol fuel cells" 2009. Electrochemistry Communications 11, 1077-1080.
Jinfa Chang et al. "Atomically dispersed catalysts for small molecule electrooxidation in direct liquid fuel cells" 2022. Journal of Energy Chemistry 68, 439-453.
Meng Li et al. "Ternary Electrocatalysts for Oxidizing Ethanol to Carbon Dioxide: Making Ir Capable of Splitting C—C Bond" J. Am. Chem. Soc. 2013, 135, 132-141.
Shuiping Luo et al. "A Tensile-Strained Pt—Rh Single-Atom Alloy Remarkably Boosts Ethanol Oxidation" Adv. Mater. 2021, 33, 2008508.

(56) References Cited

OTHER PUBLICATIONS

Jinfa Chang et al. "Improving Pd—N—C fuel cell electrocatalysts through fluorination-driven rearrangements of local coordination environment" Dec. 2021. Nature Energy, vol. 6., pp. 1144-1153.
Lei Huang et al. "Advanced Platinum-Based Oxygen Reduction Electrocatalysts for Fuel Cells" Acc. Chem. Res. 2021, 54, 311-322.
Robert M. Darling et al. "Kinetic Model of Platinum Dissolution in PEMFCs" 2003. Journal of The Electrochemical Society, 150 (11) A1523-A1527.
Easo P. George et al. "High- entropy alloys" Aug. 2019. Nature Reviews, Materials, vol. 4, 515-534.
Tobias Löffler et al. "What makes high-entropy alloys exceptional electrocatalysts?" 2021. Angew. Chem. Int. Ed. 10.1002/anie.202109212.
Shuxing Bai et al. "Selective Ethanol Oxidation Reaction at the Rh—SnO2 Interface" Adv. Mater. 2021, 33, 2005767.
Mngjun Sun et al. "Ultrathin PtPd-Based Nanorings with Abundant Step Atoms Enhance Oxygen Catalysis" Adv. Mater. 2018, 30, 1802136.
Dennis F. van der Vliet et al. "Unique Electrochemical Adsorption Properties of Pt-Skin Surfaces" Angew. Chem. 2012, 124, 3193 -3196.
Dongshuang Wu et al. "Platinum-Group-Metal High-Entropy-Alloy Nanoparticles" J. Am. Chem. Soc. 2020, 142, 32, 13833-13838.
Kaizhu Zeng et al. "Surface-Decorated High-Entropy Alloy Catalysts with Significantly Boosted Activity and Stability" Adv. Funct. Mater. 2022, 2204643.
Jinfa Chang et al. "Dual-Doping and Synergism toward High-Performance Seawater Electrolysis" Adv. Mater. 2021, 33, 2101425.
Yao Wang et al. "p—d Orbital Hybridization Induced by a Monodispersed Ga Site on a Pt3Mn Nanocatalyst Boosts Ethanol Electrooxidation" Angew. Chem. Int. Ed. 2022, 61, e202115735.
Adam Holewinski et al. "Elementary Mechanisms in Electrocatalysis: Revisiting the ORR Tafel Slope" 2012. Journal of The Electrochemical Society, 159 (11) H864-H870.
Xiaoqing Huang et al. "Electrochemistry. High-performance transition metal-doped Pt3Ni octahedra for oxygen reduction reaction" Jun. 2015. Science, vol. 348 ISSUE 6240, pp. 1229-1234.
Shiyin Li et al. "Nanoporous high-entropy alloys with low Pt loadings for highperformance electrochemical oxygen reduction" 2020. Journal of Catalysis 383, 164-171.
Zeyu Jin et al. "Rugged High-Entropy Alloy Nanowires with in Situ Formed Surface Spinel Oxide as Highly Stable Electrocatalyst in Zn—Air Batteries" ACS Materials Lett. 2020, 2, 1698-1706.
R. Carrera-Cerritos et al. "Performance and stability of Pd nanostructures in an alkaline direct ethanol fuel cell" 2014. Journal of Power Sources 269, 370-378.
International Search Report and Written Opinion of the International Searching Authority mailed Dec. 12, 2023 for corresponding PCT International Application No. PCT/US23/27230.
Wei Wang et al., Engineering Multimetallic Nanocrystals for Highly Efficient Oxygen Reduction Catalysts, Adv. Energy Mater. 2016, 6, 1600236.

* cited by examiner

E

HIGH-ENTROPY ALLOY FOR HIGH-PERFORMANCE DIRECT ETHANOL FUEL CELLS

CROSS-REFERENCE TO RELATED APPLICATIONS

This nonprovisional application claims the benefit of U.S. Provisional Application No. 63/388,085 entitled "HIGH-ENTROPY ALLOY FOR HIGH-PERFORMANCE DIRECT ETHANOL FUEL CELLS" filed Jul. 11, 2022 by the same inventors, all of which is incorporated herein by reference, in its entirety, for all purposes.

BACKGROUND OF THE INVENTION

1. Field of the Invention

This invention relates, generally, to improving catalyst activity within a fuel cell. More specifically, it relates to a high-entropy alloy and a method of optimizing a catalytic reaction within an electrochemical fuel cell.

2. Brief Description of the Prior Art

With the rapid socioeconomic development, the increasing global demand for fossil fuels (e.g., coals, oil, and gas) has unceasingly contributed to the severe energy crisis. The overconsumption of the traditional energy resources is bound to cause environmental deterioration and climate variation. This critical issue has led to an increased exploration and development of both traditional energy and renewable energy technologies toward more environmentally friendly, sustainable, and regenerative alternatives of energy resources. However, renewable and clean energies like solar and wind create a bottleneck in many applications, due to the intermittent and geographical natures of themselves. Accordingly, multiple green energy technologies including electrochemical water splitting and/or electrochemical fuel cells (e.g., hydrogen, fuel cells, direct ethanol fuel cells, and/or solid oxide fuel cells) are poised to be the promising and appealing strategies that are mostly driven by catalytic redox reactions, such as hydrogen evolution reaction (HER), oxygen evolution reaction (OER), methanol oxidation reaction (MOR), etc.

Despite countless trials and success in the utilization of the noble metals and the noble metal-based oxides (e.g., Pt for HER, $RuO_2$ and $IrO_2$ for OER), currently known techniques comprise the high material costs, low natural abundance, and scarcity of these materials greatly prevent their usage in practical large-scale applications. Moreover, noble metal electrocatalysts frequently suffer from operational instability under the extreme working conditions, making them susceptible to dissolution, agglomeration, and have poor tolerance for poisoning.

Accordingly, what is needed is a low-cost, stable, highly-efficient, alloy-based electrocatalyst for electrochemical fuel cells. However, in view of the art considered as a whole at the time the present invention was made, it was not obvious to those of ordinary skill in the field of this invention how the shortcomings of the prior art could be overcome.

SUMMARY OF THE INVENTION

The long-standing but heretofore unfulfilled need, stated above, is now met by a novel and non-obvious invention disclosed and claimed herein. In an aspect, the present disclosure pertains to a high-entropy alloy catalyst. In an embodiment, the high entropy alloy catalyst may comprise the following: (a) at least one metal acetylacetonate, such that the at least one metal acetylacetonate may be metallically bonded with at least one alternative metal acetylacetonate precursor, forming a metal acetylacetonate-metal acetylacetonate ("HEA") compound; and (b) at least one carbon atom, such that the HEA compound may be chemically bonded to the at least one carbon atom, forming a metal acetylacetonate-carbon ("HEA/C") construct. In this embodiment, the HEA compound may be disposed evenly upon at least one portion of a surface of the at least one carbon atom. In addition, in this embodiment, at least one portion of a surface of the HEA/C construct may comprise at least one metal oxide configured to resist CO poisoning.

In some embodiments, the at least one metal acetylacetonate comprises at least one precious metal chemical element and/or at least one non-previous metal chemical element. As such, in these other embodiments, when the at least one non-precious metal chemical element interacts with the at least one precious metal chemical element, the at least one non-precious metal chemical element may comprise a positive electron shift. In this manner, the HEA construct comprises strong metal-oxide bonds.

In some embodiments, the at least one metal acetylacetonate may comprise at least one of the following: (a) platinum, (b) palladium, (c) iron, (d) cobalt, (e) nickel, (f) tin bis(acetylacetonate) dichloride, and (g) manganese. In these other embodiments, the HEA/C construct may be electrochemically stable. In this manner, the HEA/C construct may then comprise a direct 12e pathway.

In some embodiments, when the HEA/C construct is incorporated with the electrochemical cell, the HEA/C construct may be configured to produce $CO_2$ byproducts. Moreover, in these other embodiments the HEA/C construct may also be configured to produce negligible acetate byproducts.

Moreover, another aspect of the present disclosure pertains to a method of optimizing a catalytic reaction within an electrochemical cell. In an embodiment the method may comprise the following steps: (a) incorporating a high-entropy alloy catalyst into the electrochemical cell, the HEA catalyst comprising: (i) at least one metal acetylacetonate, such that the at least one metal acetylacetonate may be metallically bonded with at least one alternative metal acetylacetonate, forming a metal acetylacetonate-metal acetylacetonate ("HEA") compound; and (ii) at least one carbon atom, wherein the HEA compound may be chemically bonded to the at least one carbon atom, forming a metal acetylacetonate-carbon ("HEA/C") construct, such that the metal acetylacetonate may be disposed evenly upon at least one portion of a surface of the at least one carbon atom. In this embodiment, at least one portion of a surface of the HEA/C construct may comprise at least one metal oxide configured to resist CO poisoning. In addition, in this embodiment, the incorporation of the HEA catalyst to the electrochemical cell thereof may optimize the catalytic reaction within the electrochemical cell.

In some embodiments, the HEA/C construct may be electrochemically stable. In this manner, the HEA/C construct may be configured to operate continuously for at least 1,200 hours. As such, in these other embodiments, the HEA/C construct may be configured to retain a constant working voltage of at least 0.6 V. Additionally, in these other embodiments, the HEA/C construct may comprise a performance decay of at most 4%.

In some embodiments, the HEA/C construct may be configured to produce $CO_2$ byproducts, such that the HEA/C construct may be configured to produce negligible acetate byproducts.

Furthermore, an additional aspect of the present disclosure pertains to a method of synthesizing a high-entropy alloy catalyst. In an embodiment, the method may comprise the following steps: (a) metallically bonding at least one metal acetylacetonate to at least one alternative metal acetylacetonate, forming a metal acetylacetonate-metal acetylacetonate ("HEA") compound; (b) chemically bonding at least one carbon atom to the HEA compound, forming a metal acetylacetonate-carbon ("HEA/C") construct; and (c) oxidizing the HEA/C construct, wherein at least one portion of a surface of the HEA/C construct comprises at least one metal oxide.

In some embodiments, sonification may be used to pretreat the at least one metal acetylacetonate and/or the at least one alternative metal acetylacetonate, or both. Additionally, in some embodiments, the method may further comprise the step of, removing at least one contaminant molecule from the HEA/C construct.

In addition, in some embodiments, the method may further comprise the step of pre-dissolving the at least one metal acetylacetonate and/or the at least one alternative metal acetylacetonate within an oleylamine and/or 1-octadecene solution. As such, in these other embodiments, the solution may comprise a volumetric ratio of oleylamine to 1-octadecene having a range of at least 1:1 to at most 20:1.

Moreover, in these other embodiments, the step of metallically bonding the at least one metal acetylacetonate to the at least one alternative metal acetylacetonate may further comprise the step of, treating, via an ethanol and/or cyclohexane solution, the HEA compound. In this manner, the HEA compound may be collected from the solution and/or washed with the ethanol and/or cyclohexane solution at least 3 times, such that at least one oleylamine and/or at least one residue molecule may be removed from the HEA compound. In some embodiments, the final at least one HEA compound may be stored within a vacuum oven at a predetermined temperature, such that the lifespan of the at least one HEA compound may be increased.

In some embodiments, the HEA/C may be heated within a chemical vapor deposition (hereinafter "CVD") oven. As such, at least one containment molecule and/or at least one non-HEA/C molecule (e.g., residue molecule) may be removed from the HEA/C. In these other embodiments, the CVD oven may use a noble gas to heat the HEA/C.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not restrictive.

The invention accordingly comprises the features of construction, combination of elements, and arrangement of parts that will be exemplified in the disclosure set forth hereinafter and the scope of the invention will be indicated in the claims.

BRIEF DESCRIPTION OF THE DRAWINGS

For a fuller understanding of the invention, reference should be made to the following detailed description, taken in connection with the accompanying drawings, in which.

DETAILED DESCRIPTION OF THE INVENTION

Figure 1:
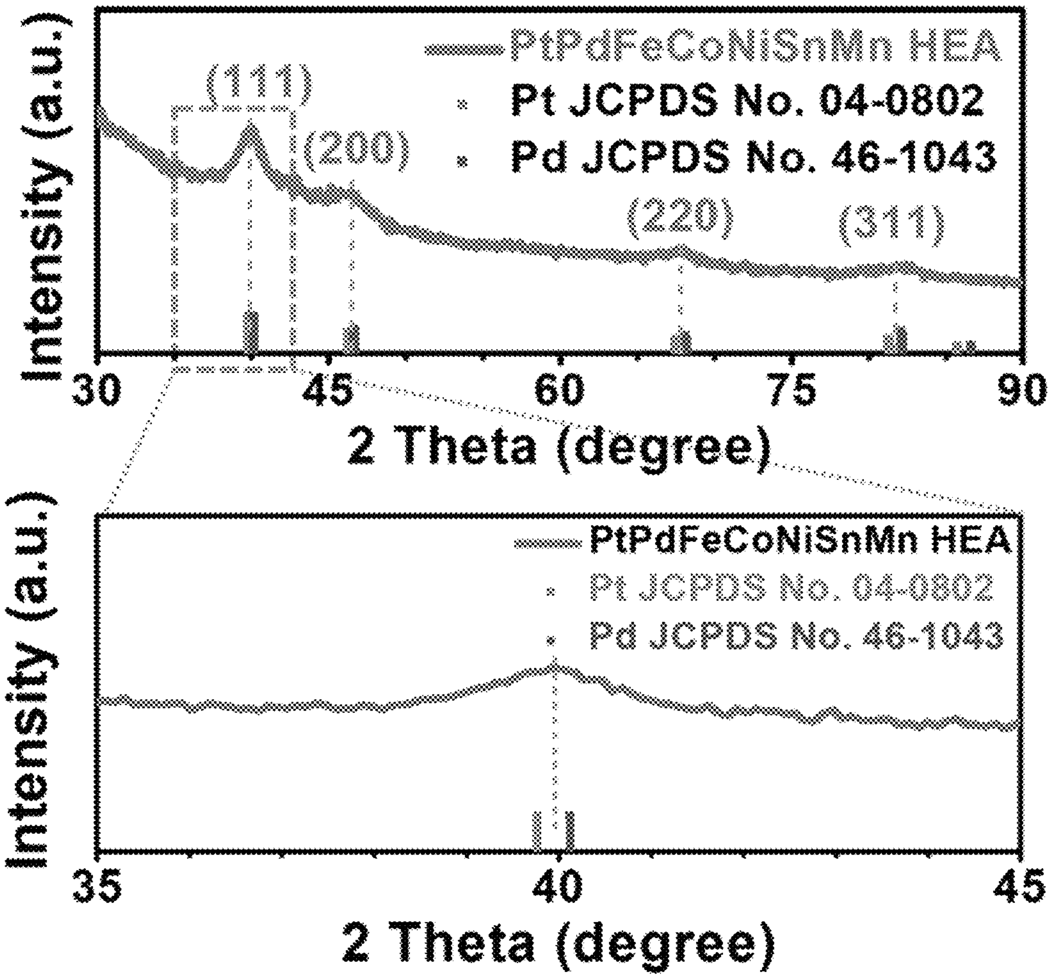
FIG. 1 is a plot illustrating XRD patterns of HEA, according to an embodiment of the present disclosure. The standard card of Pt and Pd was also added.

In the following detailed description of the preferred embodiments, reference is made to the accompanying drawings, which form a part thereof, and within which are shown by way of illustration specific embodiments by which the invention may be practiced. It is to be understood that one skilled in the art will recognize that other embodiments may be utilized, and it will be apparent to one skilled in the art that structural changes may be made without departing from the scope of the invention. Elements/components shown in diagrams are illustrative of exemplary embodiments of the disclosure and are meant to avoid obscuring the disclosure. Any headings, used herein, are for organizational purposes only and shall not be used to limit the scope of the description or the claims. Furthermore, the use of certain terms in various places in the specification, described herein, are for illustration and should not be construed as limiting.

Reference in the specification to "one embodiment," "preferred embodiment," "an embodiment," or "embodiments" means that a particular feature, structure, characteristic, or function described in connection with the embodiment is included in at least one embodiment of the disclosure and may be in more than one embodiment. The appearances of the phrases "in one embodiment," "in an embodiment," "in embodiments," "in alternative embodiments," "in an alternative embodiment," or "in some embodiments" in various places in the specification are not necessarily all referring to the same embodiment or embodiments. The terms "include," "including," "comprise," and "comprising" shall be understood to be open terms and any lists that follow are examples and not meant to be limited to the listed items.

Definitions

As used in this specification and the appended claims, the singular forms "a," "an," and "the" include plural referents unless the content clearly dictates otherwise. As used in this specification and the appended claims, the term "or" is generally employed in its sense including "and/or" unless the context clearly dictates otherwise.

In the following description, for the purposes of explanation, numerous specific details are set forth in order to provide a thorough understanding of embodiments of the present technology. It will be apparent, however, to one skilled in the art that embodiments of the present technology may be practiced without some of these specific details.

As used herein, the term "electrochemical cell" refers to any apparatus known in the art which generates electrical energy from chemical reactions and/or uses electrical energy to cause chemical reactions. Non-limiting examples of the electrochemical cell may comprise the following: (a) a polymer electrolyte membrane fuel cell; (b) an ethanol-based fuel cell; (c) a direct methanol fuel cell; (d) an alkaline fuel cell; (e) a phosphoric acid fuel cell; (f) a hydrogen fuel cell; (g) an electrochemical cell comprising water electrolysis; (h) an electrochemical cell comprising $CO_2$ reduction; and/or (i) any electrochemical cell known in the art. For ease of reference, the exemplary embodiment described herein refers to an ethanol-based fuel cell, but this description should not be interpreted as exclusionary of other electrochemical cells.

As used herein, the term "metal acetylacetonate" refers to any complex known in the art which may be derived from the derived from an acetylacetonate anion ($CH_3COCHCOCH_3^-$) and at least one metal ion. Non-limiting examples of the metal acetylacetonate may comprise the following: (a) Platinum(II) acetylacetonate; (b) Palladium(II) acetylacetonate; (c) Iron(III) acetylacetonate; (d) Cobalt(II) acetylacetonate; (e) nickel acetylacetonate; (f) Bis(2,4-pentanedionato)Tin(IV) Dichloride; and/or (g) Manganese(III) acetylacetonate.

As used herein, the term "comprising" is intended to mean that the products, compositions, and methods include the referenced components or steps, but not excluding others. "Consisting essentially of" when used to define products, compositions, and methods, shall mean excluding other components or steps of any essential significance. "Consisting of" shall mean excluding more than trace elements of other components or steps.

The term "about", "approximately", or "roughly" as used herein refers to being within an acceptable error range for the particular value as determined by one of ordinary skill in the art, which will depend in part on how the value is measured or determined, i.e., the limitations of the measurement system, i.e., the degree of precision required for a particular purpose, such as fuel cell performance and/or efficiency. As used herein "about" refers to within ±15% of the numerical.

All numerical designations, including ranges, are approximations which are varied up or down by increments of 1.0, 0.1, 0.01 or 0.001 as appropriate. It is to be understood, even if it is not always explicitly stated, that all numerical designations are preceded by the term "about". It is also to be understood, even if it is not always explicitly stated, that the compounds and structures described herein are merely exemplary and that equivalents of such are known in the art and can be substituted for the compounds and structures explicitly stated herein.

Wherever the term "at least," "greater than," or "greater than or equal to" precedes the first numerical value in a series of two or more numerical values, the term "at least," "greater than" or "greater than or equal to" applies to each of the numerical values in that series of numerical values. For example, greater than or equal to 1, 2, or 3 is equivalent to greater than or equal to 1, greater than or equal to 2, or greater than or equal to 3.

Wherever the term "no more than," "less than," or "less than or equal to" precedes the first numerical value in a series of two or more numerical values, the term "no more than," "less than" or "less than or equal to" applies to each of the numerical values in that series of numerical values. For example, less than or equal to 1, 2, or 3 is equivalent to less than or equal to 1, less than or equal to 2, or less than or equal to 3.

High Entropy Alloy Catalyst

The present disclosure pertains to optimizing a catalytic reaction within an electro chemical cell (e.g., an ethanol-based fuel cell) using a high-entropy alloy (hereinafter "HEA" and/or "PtPd HEA") construct (i.e., catalyst) (hereinafter "HEA/C" and/or "PtPd HEA/C"). In an embodiment the HEA/C construct may comprise a cubic structure.

As such, FIG. 1 depicts the XRD pattern of the alloy catalyst, according to an embodiment of the present disclosure. In an embodiment, the XRD of the HEA may comprise a typical face-centered cubic (hereinafter "fcc") structure, such that the peak may be disposed about a center of Pt and/or Pd, such that a formation of an alloy may be indicated. As such, in this embodiment, the weakening and/or broadening of peaks in the XRD pattern may be attributed to a lattice distortion in HEA. Additionally, in this embodiment the HEA construct (i.e., catalyst) may comprise a composition including but not limited to at least one of the following: (a) Platinum (II) acetylacetonate (e.g., 98%); (b) Palladium (II) acetylacetonate (e.g., 35% Pd); (c) Iron (III) acetylacetonate (e.g., 99%); (d) Cobalt (II) acetylacetonate (e.g., 99%); (e) Nickel acetylacetonate (e.g., 96%); (f) Bis(2,4-pentanedionato) Tin (IV) Dichloride (e.g., 98.0+%); (g) Manganese (III) acetylacetonate (e.g., 97%); (h) Potassium hydroxide (e.g., pellets, 85%); (i) Perchloric Acid; (j) Oleylamine (e.g., 50.0%); (k) ascorbic acid (e.g., 99%); (1) ethanol (e.g., 100%); (m) 1-Octadecene (e.g., 90%); and/or (n) cyclohexane (e.g., 99%).

Figure 2A:
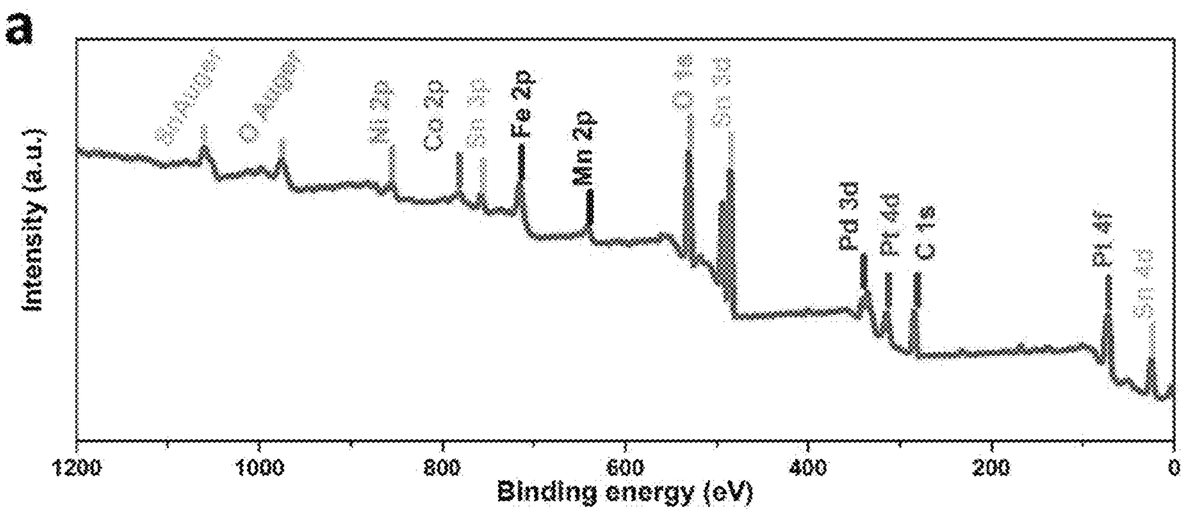
FIG. 2A is a plot illustrating a survey spectrum of Pt, Pd, Fe, Co, Ni, Sn, Mn, respectively, according to an embodiment of the present disclosure.
Figure 2B:
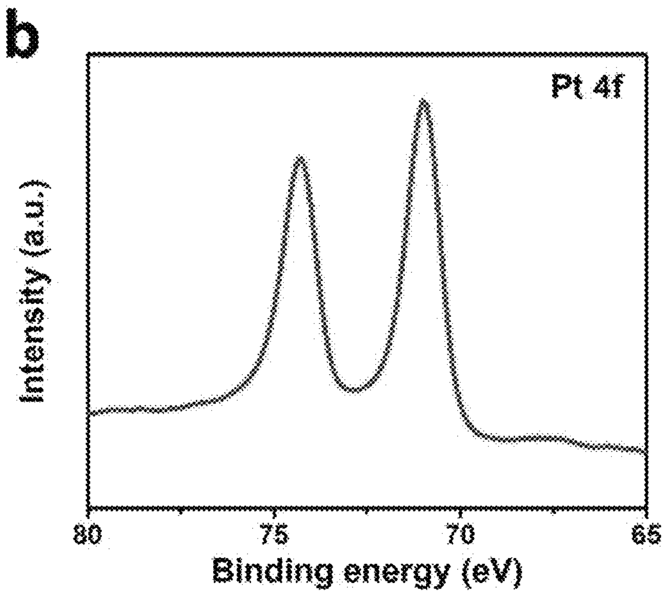
FIG. 2B is a plot illustrating a XSP of Pt 4f HEA, according to an embodiment of the present disclosure.
Figure 2C:
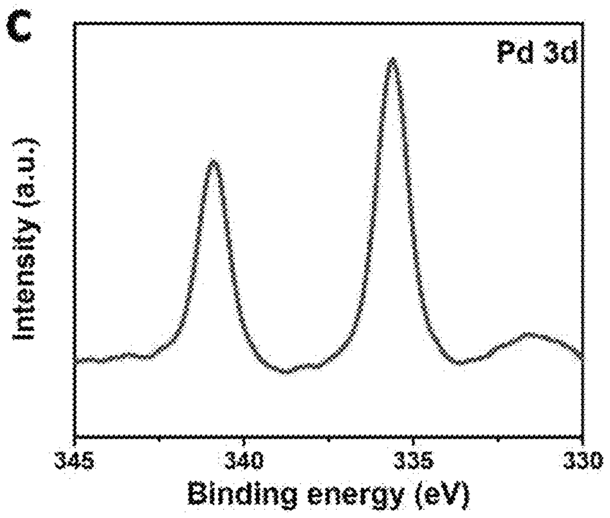
FIG. 2C is a plot illustrating a XSP of Pd 3d HEA, according to an embodiment of the present disclosure.

Accordingly, FIGS. 2A-2H depict a XPS of the metals which may comprise the HEA alloy, according to an embodiment of the present disclosure. In an embodiment, as shown in FIG. 2A, the metals may comprise Pt, Pd, Fe, Co, Ni, Sn, and/or Mn and/or the atomic contents may be approximately the same. In addition, in this embodiment, the precious metals surface, Pt and Pd, may be in a metallic state, as seen from the high-resolution Pt and/or Pd XPS, as shown in FIGS. 2B-2C. In this manner, as shown in FIGS. 2D-2H, the non-platinum groups metals, including but not limited to, as Fe, Co, Ni, Sn, and/or Mn may be mixed within a metal state and/or an oxidation state (e.g., due to air-exposure). As such, the presence of at least one metal oxide may optimize the CO poisoning resistance of the HEA/C construct.

In an embodiment, the HEA may be fabricated from a mixture of at least one (1) metal acetylacetonate precursor. For example, in some embodiments embodiment, the HEA may be fabricated from seven (7) metal acetylacetonate precursors. As such, the strong metal-acetylacetonate interaction of the HEA may facilitate coprecipitation by slowing down the rate of the precipitation of the HEA. Additionally, in an embodiment, the at least one metal acetylacetonate precursor may be introduced at a molar ratio comprising a range of at least 1:20 to at most 1:1, encompassing every integer in between. In this manner, at least one metal acetylacetonate precursor may be pre-dissolved before being introduced to at least one alternative metal acetylacetonate precursor. In this embodiment, the at least one metal acetylacetonate may be disposed within an oleylamine and/or a 1-octadecene solution comprising a volumetric ratio of oleylamine to 1-octadecene having a range of at least 1:1 to at most 20:1, encompassing every integer in between, in order to aid in the pre-dissolving of the at least one metal acetylacetonate precursor. Moreover, once the at least one metal acetylacetonate precursor is introduced into the oleylamine and/or 1-octadecene solution, in an embodiment, the at least one metal acetylacetonate precursor may be sonicated for a first predetermined amount of time. In this embodiment, ascorbic acid may also be introduced to the solution comprising the at least one acetylacetonate precursor and/or the solution may then be further sonicated for a second predetermined amount of time.

Figure 3:
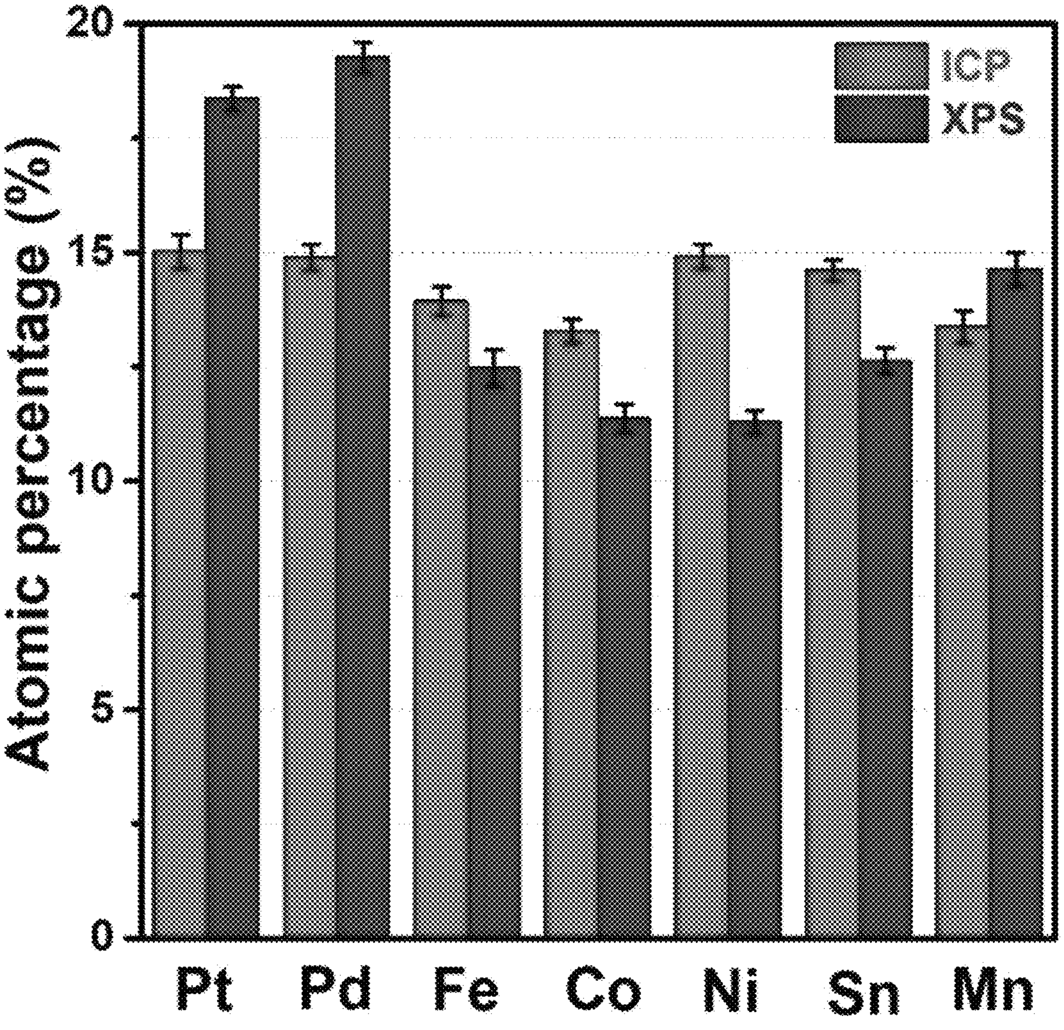
FIG. 3 is a graph illustrating an atomic percentage (%) of all elements in PtPdFeCoNiSnMn HEA (hereinafter "HEA" and/or "PtPd HEA") detected by ICP and XPS, according to an embodiment of the present disclosure.

As such, as shown in FIG. 3, in an embodiment, both the ICP and/or XPS results may indicate that the at least one metal acetylacetonate precursor may have a content having a range of at least 10% to at most 25%, encompassing every integer in between, while the commercial catalysts, Pt and/or Pd, may comprise a little higher content than other metals as seen within the XPS, as shown in FIG. 3, indicating a surface enrichment due to the annealing treatment.

Next, in an embodiment, the solution comprising the at least one metal acetylacetonate precursor may be transferred into an oil bath for a third predetermined amount of time. Furthermore, subsequent to being transferred into the oil bath, the solution comprising the at least one metal acetylacetonate precursor may then be removed from the oil bath and/or cooled to room temperature. In this embodiment, a colloidal product may be collected from the solution. In some embodiments, the colloidal product may be opaque, while comprising a color. Nonlimiting examples of the color may comprise black, white, cream, and/or any color known in the art which a colloidal product may comprise. For ease of reference, the exemplary embodiment described herein refers to black, but this description should not be limited to other colors.

Furthermore, in an embodiment, the colloidal product may be treated and/or washed with a mixture comprising ethanol and/or cyclohexane. In this embodiment, the mixture may comprise a mass ratio of ethanol to cyclohexane having a range of at least 1:1 to at most 15:1, encompassing every integer in between. In some embodiments, the colloidal product may be treated and/or washed with the mixture at least three (3) times, such that at least one oleylamine and/or at least one residue molecule may be removed from the colloidal product. As such, the final at least one PtPdFeCoNiSnMn HEA compound (hereinafter "HEA compound") may be stored within a vacuum oven at a predetermined temperature, such that the lifespan of the at least one HEA compound may be increased.

Moreover, in an embodiment, the at least one HEA compound may be deposited on at least one active carbon atom and/or carbon molecule (e.g., carbon black). As such, the active carbon atom and/or carbon molecule may comprise a range of at least 150 $m^2g^{-1}$ to at most 300 $m^2g^{-1}$, encompassing every integer in between. In this manner, the at least one HEA compound may be disposed in a solution comprising ethanol and/or the active carbon atom and/or molecule (hereinafter "E:C solution"), in which the E:C solution may comprise a mass ratio of ethanol to carbon having a range of at least 1:20 to at most 1:1, encompassing every integer in between. In this embodiment, the E:C solution may then be mixed and/or subsequently sonicated for a fourth predetermined amount of time, such that the at least one HEA compound disposed within the E:C solution may be evenly supported on the carbon molecule, forming the HEA construct (hereinafter "HEA/C").

Accordingly, in an embodiment, the HEA/C may then be removed from the E:C solution, collected, washed, and/or subsequently dried. In some embodiments, the HEA/C may be washed via an ethanol solution and/or may be dried via a vacuum oven. Additionally, in these other embodiments, the HEA/C may be further heated in a chemical vapor deposition (hereinafter "CVD") oven, such that at least one containment molecule and/or at least one non-HEA/C molecule (i.e., residue molecule) may be removed from the HEA/C. In some embodiments the CVD oven may use a noble gas to heat the HEA/C.

Figure 4A:
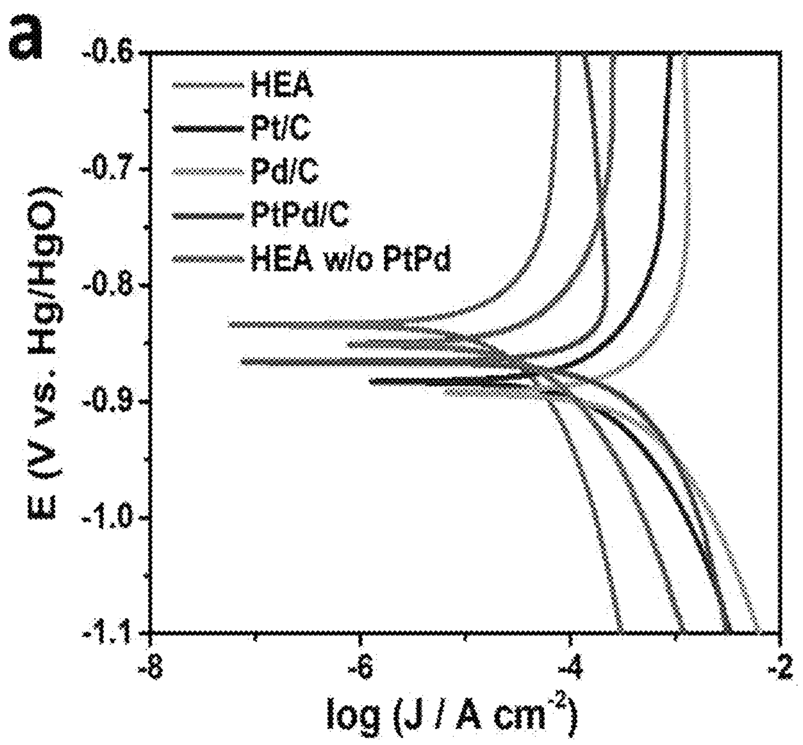
FIG. 4A is a plot illustrating Tafel curves of HEA, Pt/C, Pd/C, PtPd/C, and HEA without PtPd, according to an embodiment of the present disclosure. The data was acquired in 0.1 M KOH solutions.
Figure 4B:
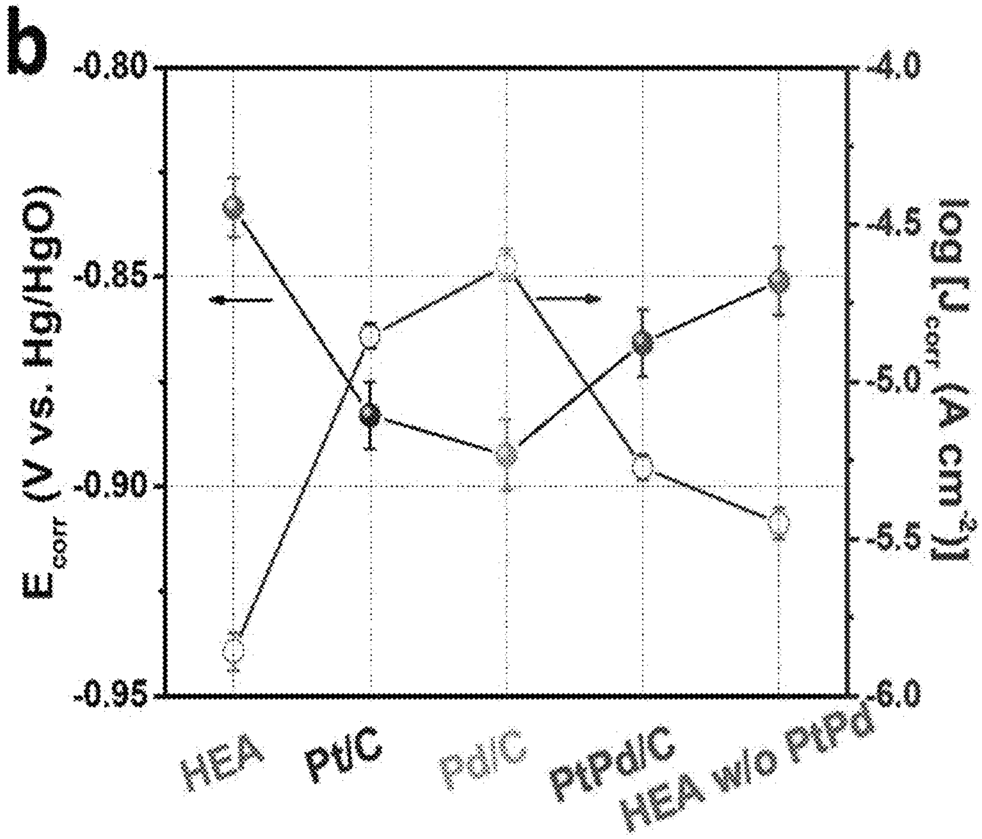
FIG. 4B is a plot illustrating a corresponding corrosion voltage and a corrosion current density of HEA, Pt/C, Pd/C, PtPd/C, and HEA without PtPd, according to an embodiment of the present disclosure. The data was acquired in 0.1 M KOH solutions.

In an embodiment, the HEA/C may be dispersed within a solution comprising Nafion, ethanol, water, and/or any molecule known in the art used in fuel cells. In this embodiment, the solution may comprise Nafion, ethanol, and/or water (hereinafter "N:E:W solution") comprising a volumetric ratio of Nafion to ethanol to water having a range of at least 1:20:20 to at most 1:1:1, encompassing every integer in between. In some embodiments, the volumetric ratio of 1:12:12 may be used within the solution. In an embodiment, once the HEA/C is disposed within the N:E:W solution, the HEA/C may be sonicated for a fifth predetermined amount of time, such that a homogenous catalyst ink of the HEA/C may be formed. The HEA/C may then be disposed within a fuel cell, such that catalytic reaction of the fuel cell is optimized. In this manner, as shown in FIGS. 4A-4B, in this embodiment, the aqueous corrosion behavior in 0.1 M KOH solution for the HEA catalyst, Pt/C, Pd/C, PtPd/C, and the HEA/C without PtPd (hereinafter "HEA w/t PtPd"). It may be seen that HEA has much higher corrosion voltage and much smaller corrosion current density than other samples, indicating that it much better anti-corrosion behavior.

Figure 5:
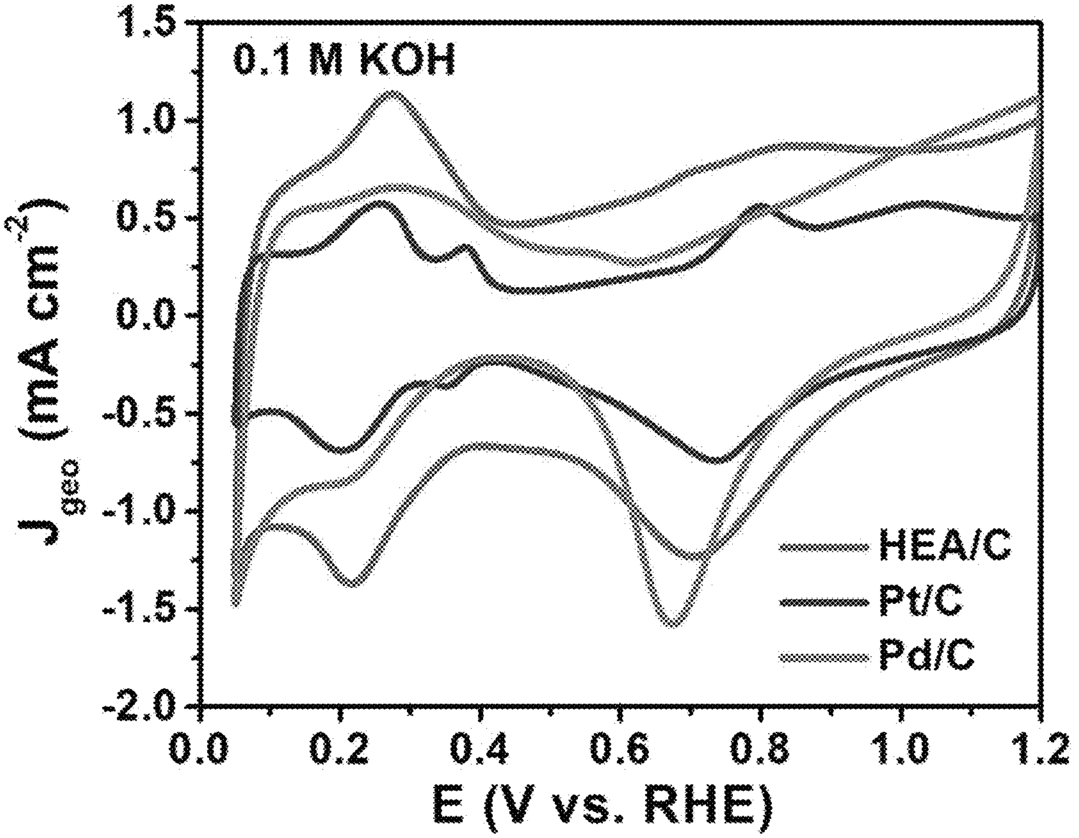
FIG. 5 is a plot illustrating an electrochemical cyclic voltammogram ("CV") of (1) a PtPdFeCoNiSnMn HEA/C; (2) a Pt/C; and (3) Pd/C in $N_2$-saturated 0.1 M KOH solution, according to an embodiment of the present disclosure. The scan rate is 50 mV $s^{-1}$.

As shown in FIG. 5, in an embodiment, the mass activity and/or the specific activity of HEA/C may be obtained by normalizing the precious metal loading and the peak current (for EOR) or kinetic current (e.g., for ORR at 0.9 V without iR correction) to the corresponding ECSAs, respectively. Accordingly, as shown in FIG. 5, in this embodiment, the HEA/C may have a larger $H_{UPD}$ than the Pt/C and the Pd/C, and/or accordingly, the HEA/C may comprise a much higher electrochemically active surface area (ECSA) of the HEA/C than the Pt/C and/or the Pd/C.

Figure 6A:
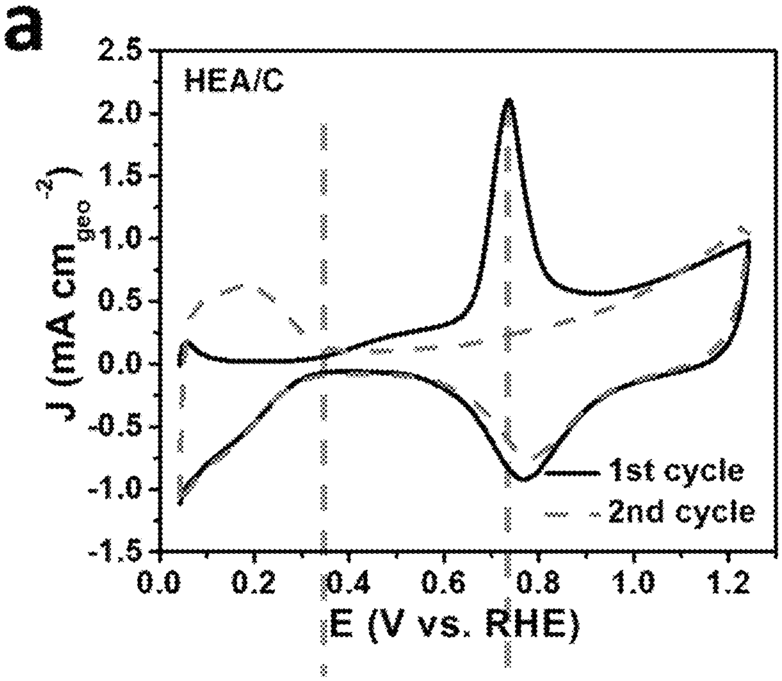
FIG. 6A is a plot illustrating a CV of a HEA/C catalyst in 0.1 M $HClO_4$ solution, according to an embodiment of the present disclosure. The ECSA of each catalyst was calculated from the charge integration of CO stripping.
Figure 6B:
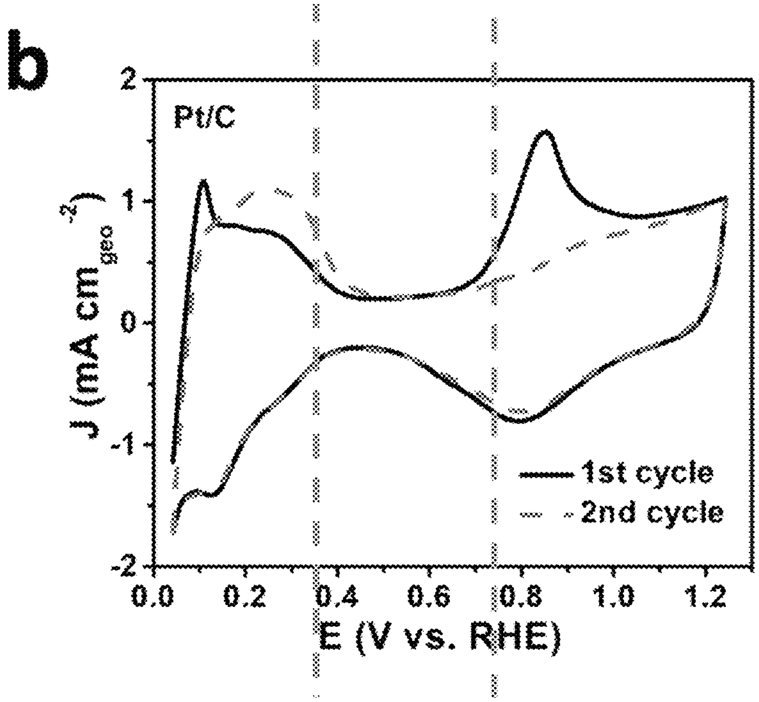
FIG. 6B is a plot illustrating a CV of Pt/C catalyst in 0.1 M $HClO_4$ solution, according to an embodiment of the present disclosure. The ECSA of each catalyst was calculated from the charge integration of CO stripping.
Figure 6C:
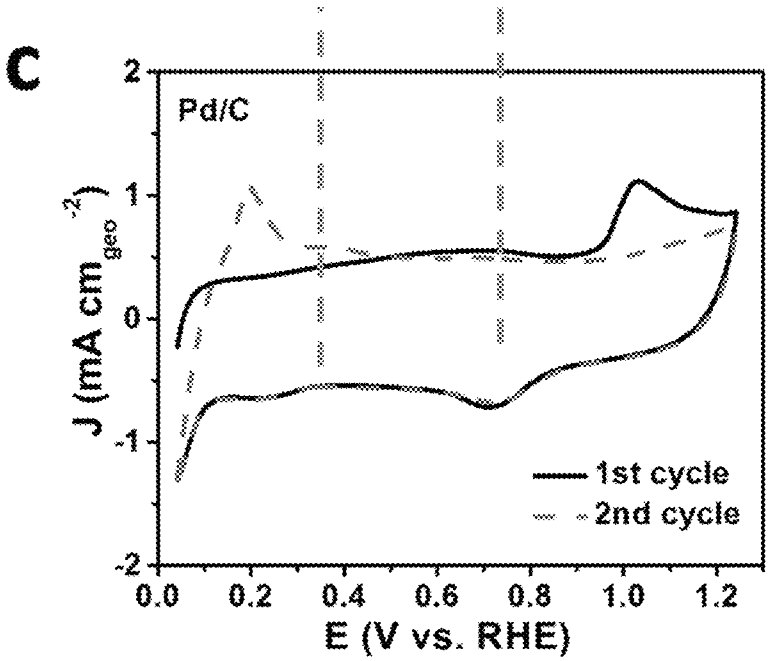
FIG. 6C is a plot illustrating a CV of Pd/C catalyst in 0.1 M $HClO_4$ solution. The scan rate is 20 mV $s^{-1}$, according to an embodiment of the present disclosure. The ECSA of each catalyst was calculated from the charge integration of CO stripping.
Figure 6D:
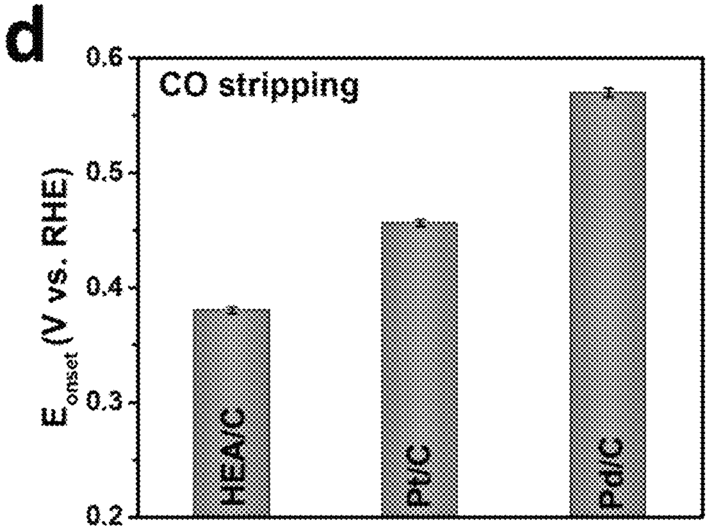
FIG. 6D is a graph illustrating a comparison of an onset potential of catalysts, HEA/C, Pt/C, and Pd/C, for CO stripping, according to an embodiment of the present disclosure. The error bars represent the standard deviations of at least three independent measurements.
Figure 6E:
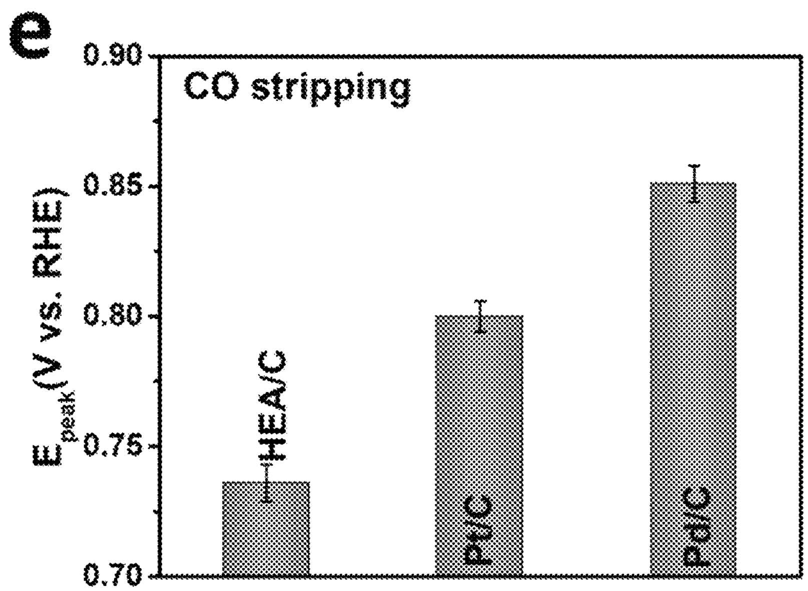
FIG. 6E is a graph illustrating a comparison of a peak potential of catalysts, HEA/C, Pt/C, and Pd/C, for CO stripping, according to an embodiment of the present disclosure. The error bars represent the standard deviations of at least three independent measurements.
Figure 6F:
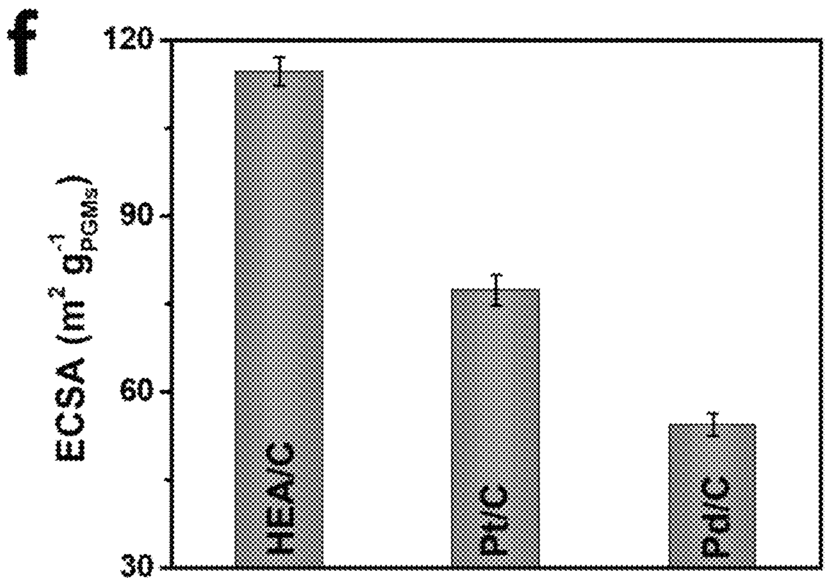
FIG. 6F is a graph illustrating an ECSA of different samples of catalysts, HEA/C, Pt/C, and Pd/C, from a CO stripping method, according to an embodiment of the present disclosure. The error bars represent the standard deviations of at least three independent measurements.

In this manner, as shown in FIGS. 6A-6C, the HEA/C may comprise a much lower onset potential than commercial catalysts (e.g., Pt/C and/or Pd/C). Moreover, FIG. 6D depicts peak potential, while FIG. 6E depicts CO stripping, according to an embodiment of the present disclosure. In this manner, the HEA/C may comprise an increased anti-poisoning performance as compared to commercial catalysts. Furthermore, as shown in FIG. 6F, as compared to the commercial catalysts, the HEA/C may comprise an increased ECSA, such that the HEA/C may comprise increased active sites (also referred to as "Local Coordination Environment") for electrochemical reaction as compared to the commercial catalysts.

In addition, in an embodiment, the value of electron transfer (n) and hydrogen peroxide ($H_2O_2$) yield may be calculated based on the disk current ($I_{Disk}$) and ring current ($I_{Ring}$) via the following equation:

$$n=4\,I_{disk}/(I_{disk}+I_{ring}/N) \quad (1)$$

N may represent the current collection efficiency of Pt ring. As such, N may be 0.37. Accelerated durability tests for OER may be conducted by cycling between 0.6 V and 1.2 V versus RHE at 50 mV $s^{-1}$ for 50,000 cycles, and/or from 0.6 to 1.0 V versus RHE at 50 mV $s^{-1}$ for 1,000,000 cycles for ORR.

Figure 7A:
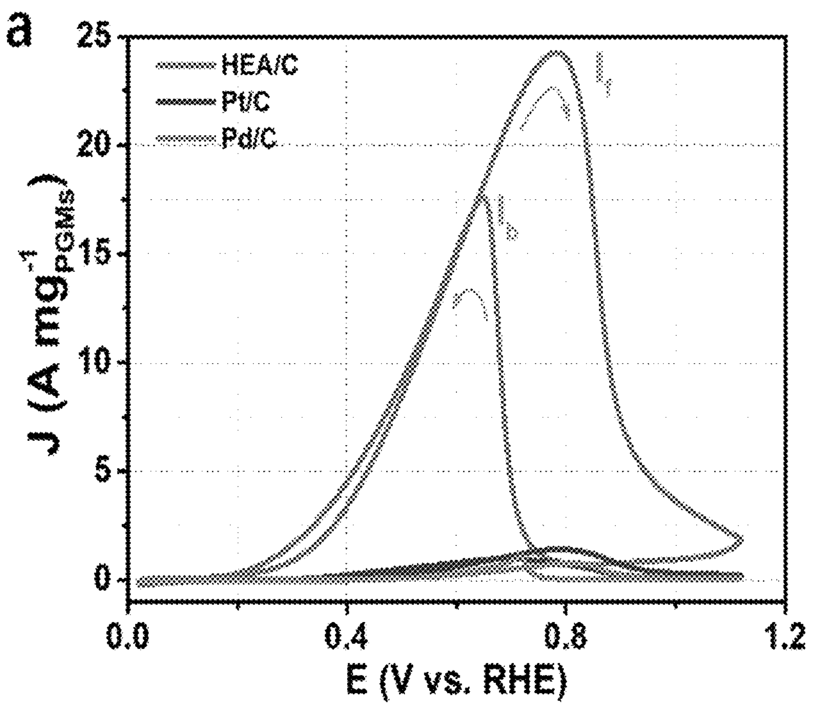
FIG. 7A is a plot illustrating a CV curve of HEA, Pt/C and Pd/C in Ar-saturated 1 M KOH with 1 M EtOH, according to an embodiment of the present disclosure. The scan rate is 10 mV $s^{-1}$, according to an embodiment of the present disclosure.
Figure 7B:
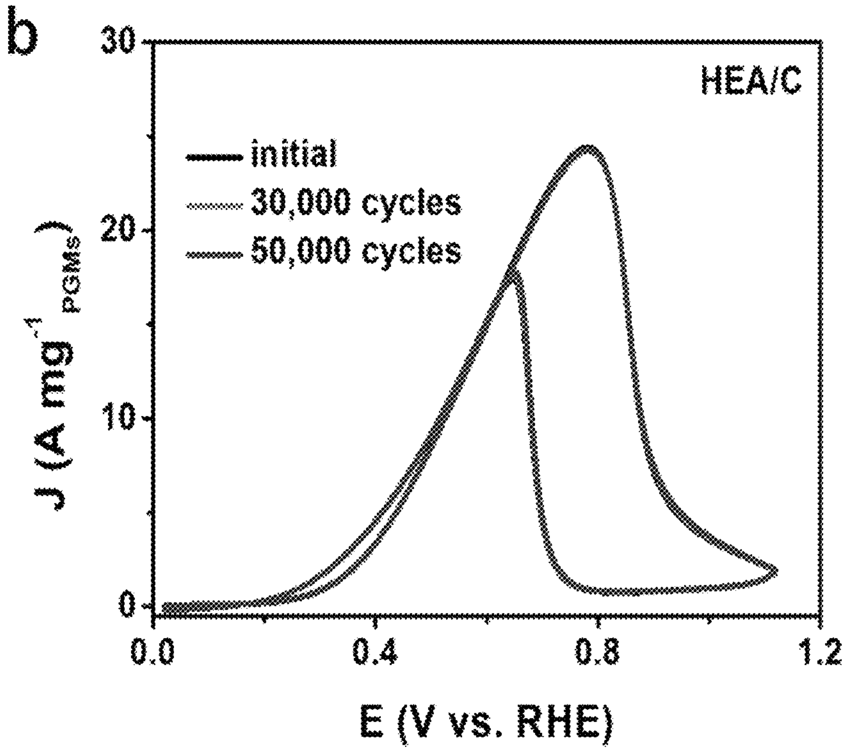
FIG. 7B is a plot illustrating an AST of HEA/C after 30 k and 50 k cycles stability, according to an embodiment of the present disclosure. The scan rate is 10 mV $s^{-1}$, according to an embodiment of the present disclosure.
Figure 7C:
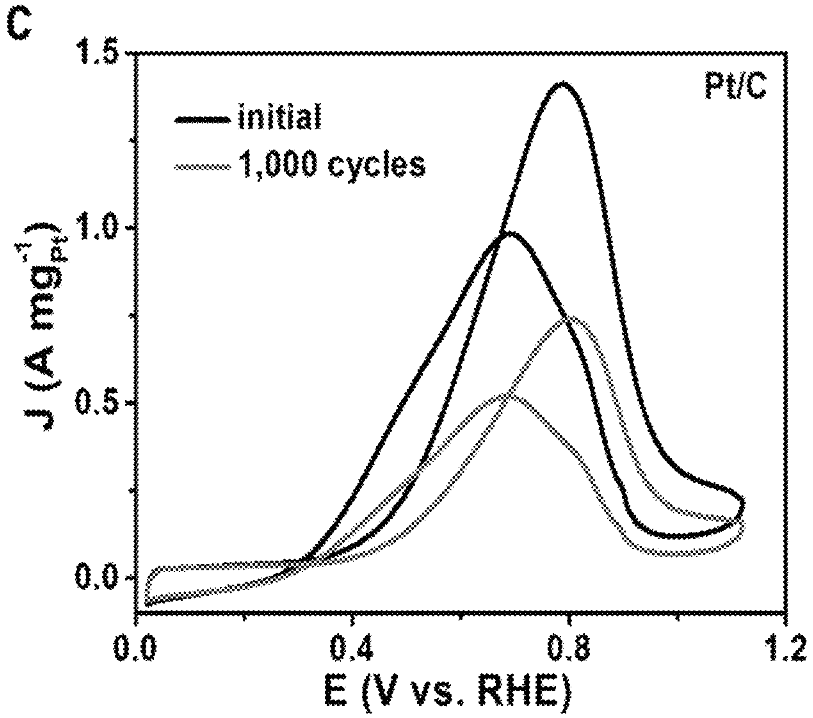
FIG. 7C is a plot illustrating an AST of Pt/C after 1 k cycles stability, according to an embodiment of the present disclosure. The scan rate is 10 mV $s^{-1}$, according to an embodiment of the present disclosure.
Figure 7D:
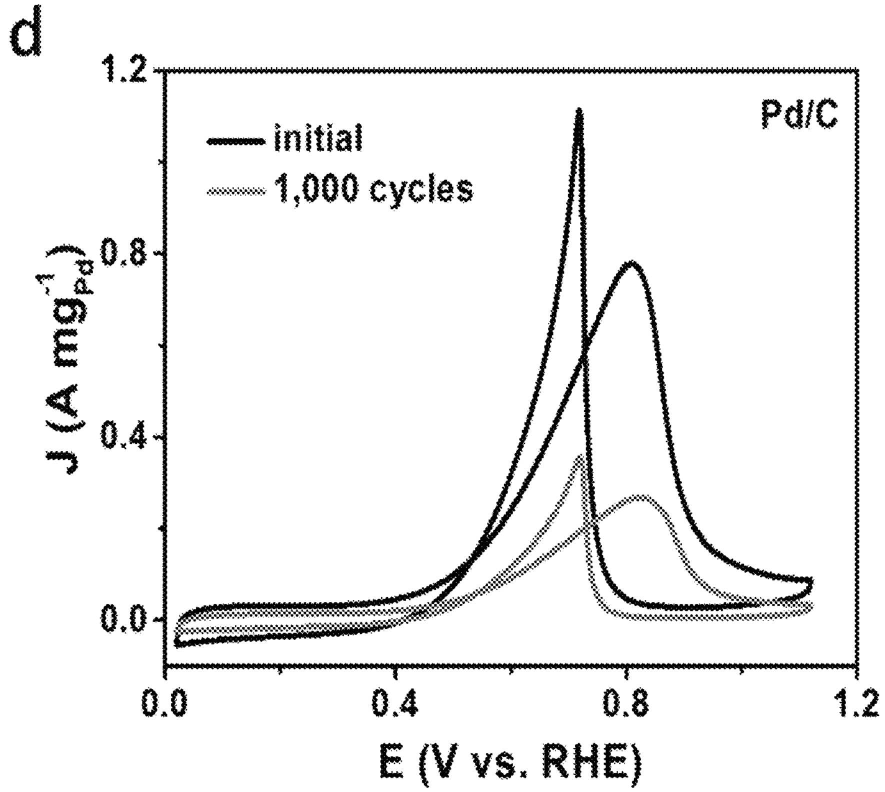
FIG. 7D is a plot illustrating an AST of Pd/C after 1 k cycles stability, according to an embodiment of the present disclosure. The scan rate is 10 mV $s^{-1}$, according to an embodiment of the present disclosure.

As shown in FIGS. 7A-7D, in an embodiment, $CO_3^{-1}$ release may be determined via the EOR performance of HEA/C. As such, FIG. 7A depicts the ethanol electrooxidation reaction (EOR) performance of HEA/C and/or the commercial catalysts, according to an embodiment of the present disclosure. Accordingly, in an embodiment, the peak mass activity ($J_{mass}$) of HEA/C may be at least 24.3 A $mg^{-1}_{PGMs}$, about 17.4 and/or 31.6 times higher than those of the commercial catalysts (e.g., Pt/C (1.4 A $mg^{-1}_{Pt}$) and/or Pd/C (0.77 A $mg^{-1}_{Pd}$)). Furthermore, as shown in FIG. 7B, the HEA/C may also comprise a robust stability, such that even after at least 50,000 cycles accelerated stability test (AST), no obvious performance decay may be found, while serious performance decay may be found on the commercial catalysts. Furthermore, as shown in FIGS. 7C-7D, in this embodiment, only about 52.1% and/or 34.1% current density may be reserved after 1,000 cycles AST of the commercial catalysts, Pt/C and/or Pd/C, respectively.

Figure 8A:
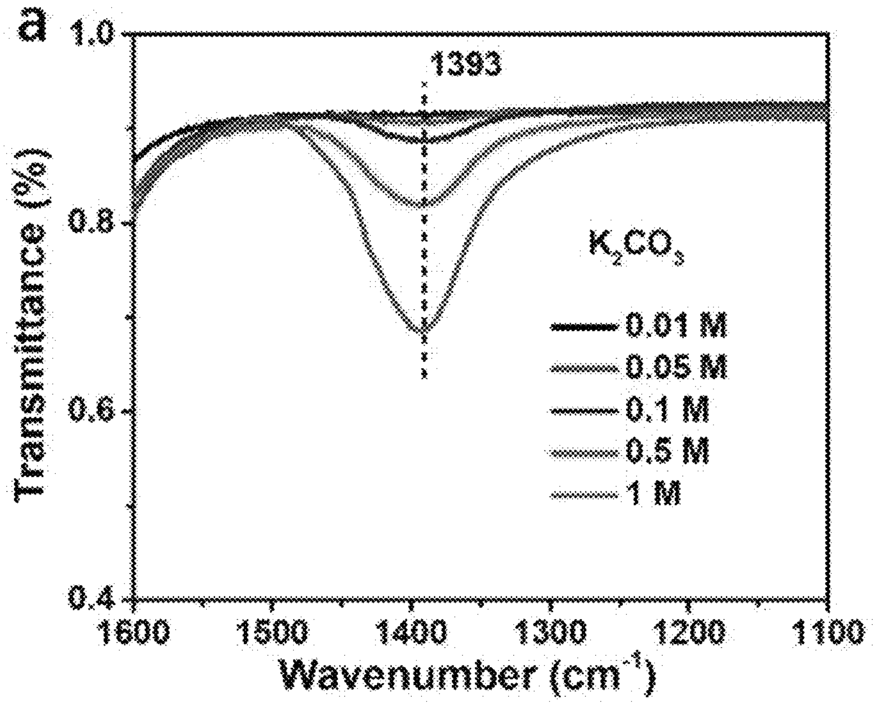
FIG. 8A is a plot illustrating Transmission IR spectra of 0.01, 0.05, 0.1, 0.5, and 1 M $K_2CO_3$ aqueous solution, according to an embodiment of the present disclosure.
Figure 8B:
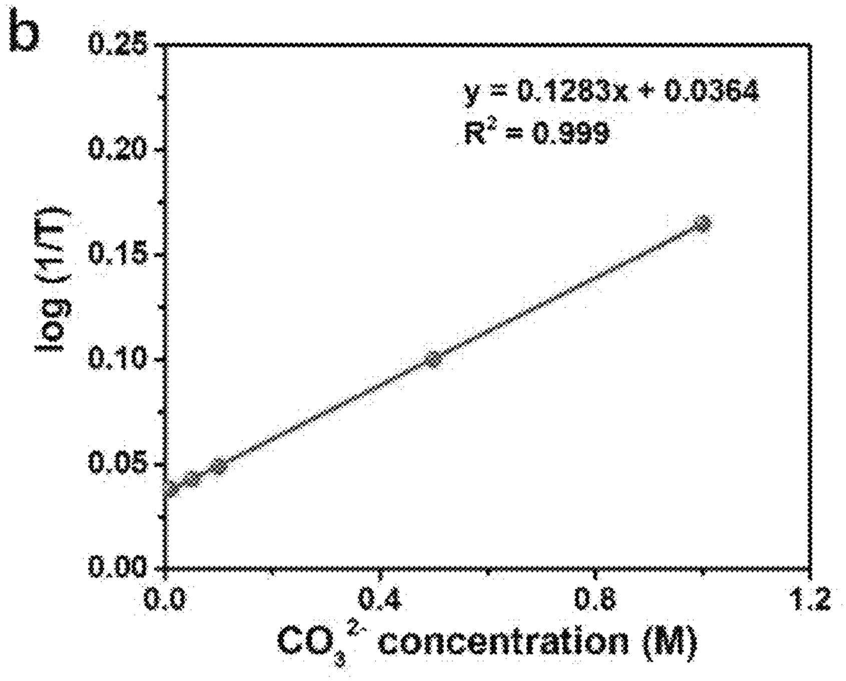
FIG. 8B is a plot illustrating standard curves of $K_2CO_3$ in IR for the determining concentration, according to an embodiment of the present disclosure.
Figure 8C:
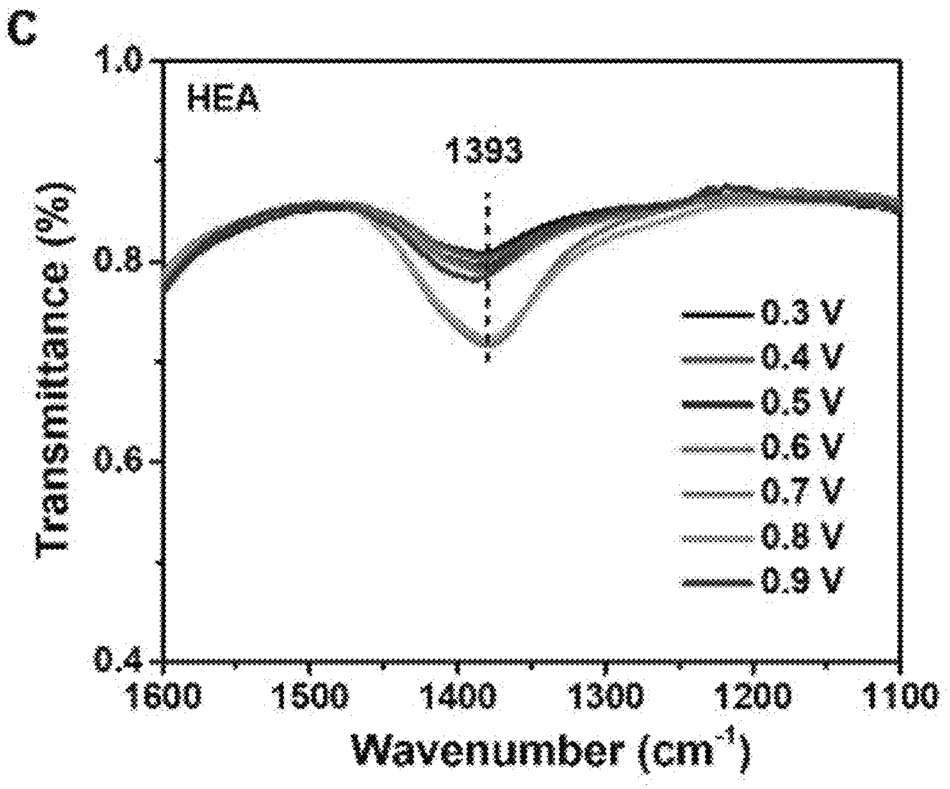
FIG. 8C is a plot illustrating a Transmission IR spectra of the electrolytes of EOR on HEA/C after the i-t tests for 3 h at different potentials, according to an embodiment of the present disclosure.
Figure 8D:
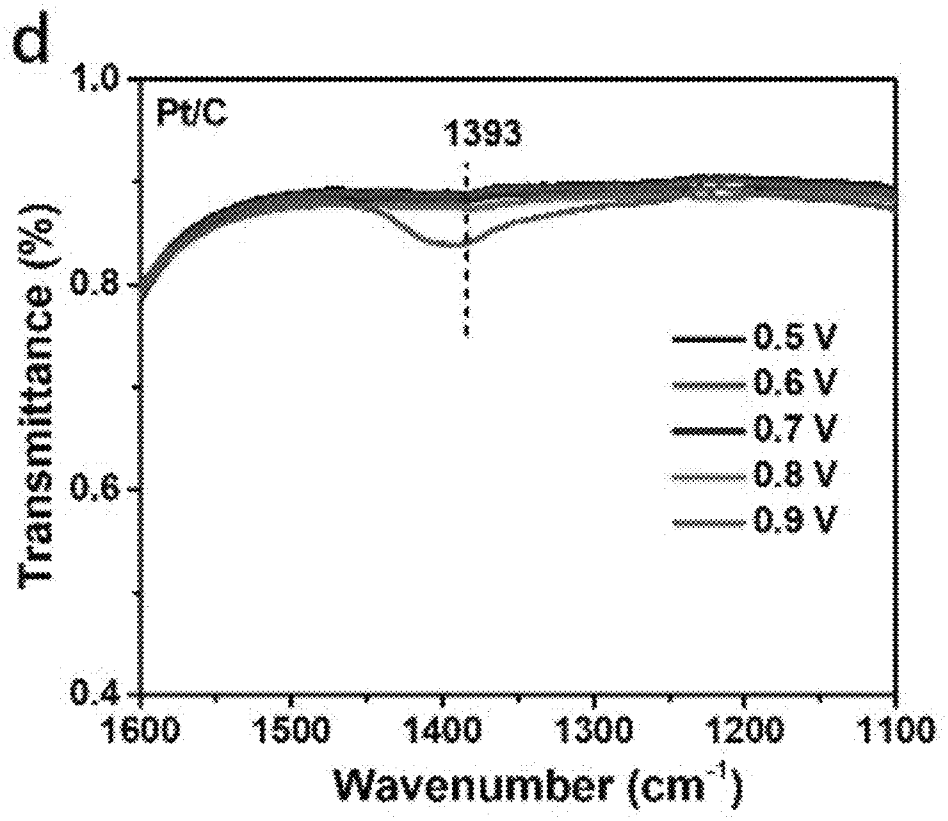
FIG. 8D is a plot illustrating a Transmission IR spectra of the electrolytes of EOR on Pt/C after the i-t tests for 3 h at different potentials, according to an embodiment of the present disclosure.
Figure 8E:
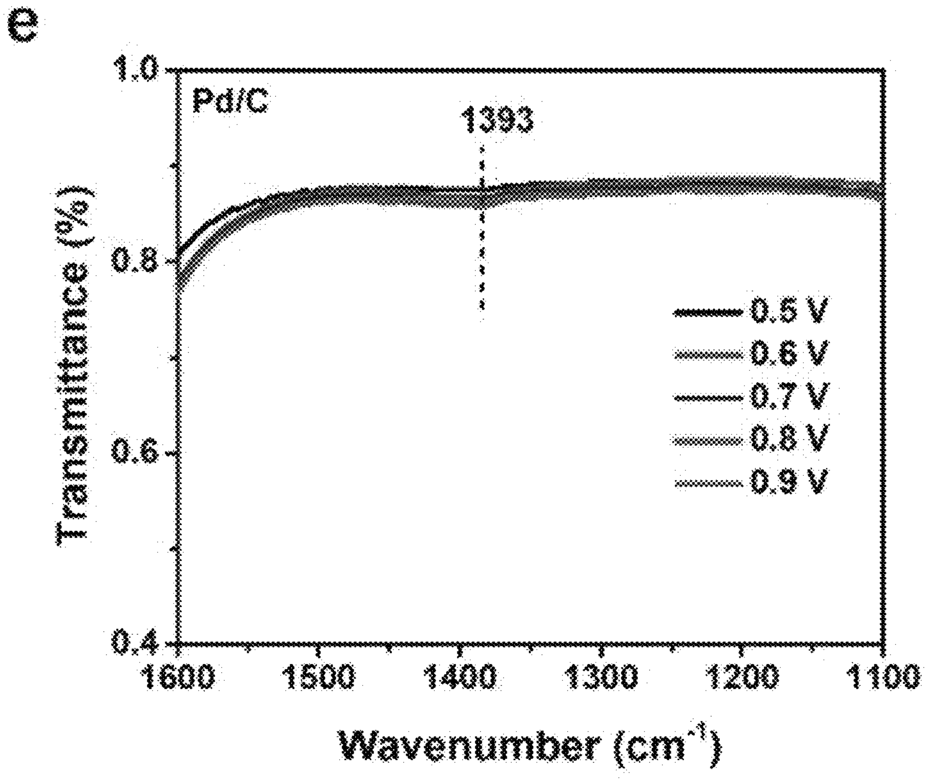
FIG. 8E is a plot illustrating a Transmission IR spectra of the electrolytes of EOR on Pd/C after the i-t tests for 3 h at different potentials, according to an embodiment of the present disclosure.
Figure 8F:
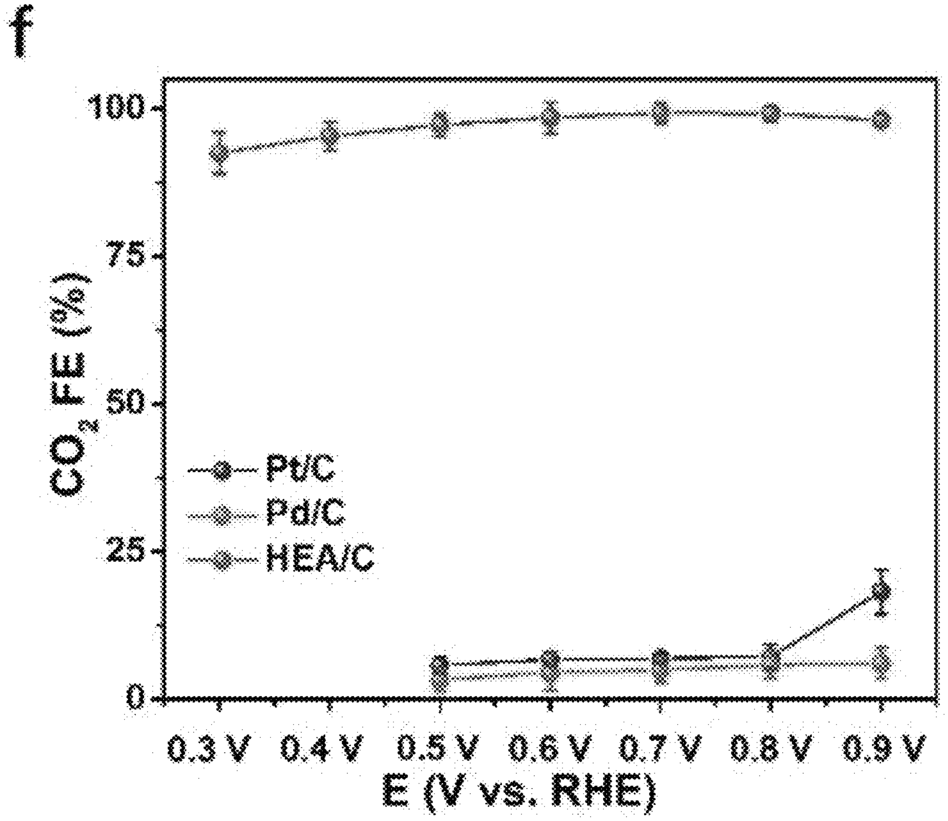
FIG. 8F is a plot illustrating a Faradaic efficiency (FE) of EOR to $CO_2$ on different samples, HEA/C, Pt/C, and Pd/C, at different potentials, according to an embodiment of the present disclosure.

The production $CO_2$ from EOR may be detected by Transmission IR spectra, since the $CO_2$ may be further reacted with KOH and the $CO_3^{2-}$ as the final products. Thus, the $CO_3^{2-}$ may be used to characteristic a peak of the catalysts. Moreover, the KOH with different concentrations (e.g., 0.01M, 0.05M, 0.1 M, 0.5 M, and 1M) may then be prepared to obtain the standard curves, as shown in FIGS. 8A-8F. As such, as shown in FIGS. 8C-8E, in an embodiment, the $CO_2$ from EOR of the catalysts may be detected by the IR spectrum at different potentials. Moreover, as shown in FIG. 8F, the Faradic efficiency (hereinafter "FE") of EOR to $CO_2$ may also be calculated at a wide potential range. Accordingly, as shown in FIG. 8F, in this embodiment, the HEA/C may comprise a high $CO_2$ FE of at least 80%, such that a direct C—C 12e pathway may be detected on HEA/C electrode. In contrast, as shown in FIG. 8F, the commercial catalysts may comprise a FE of at most 20% $CO_2$ FE, such that an incomplete oxidation may be clearly detected on the commercial catalysts, Pt/C and/or Pd/C respectively.

Figure 9A:
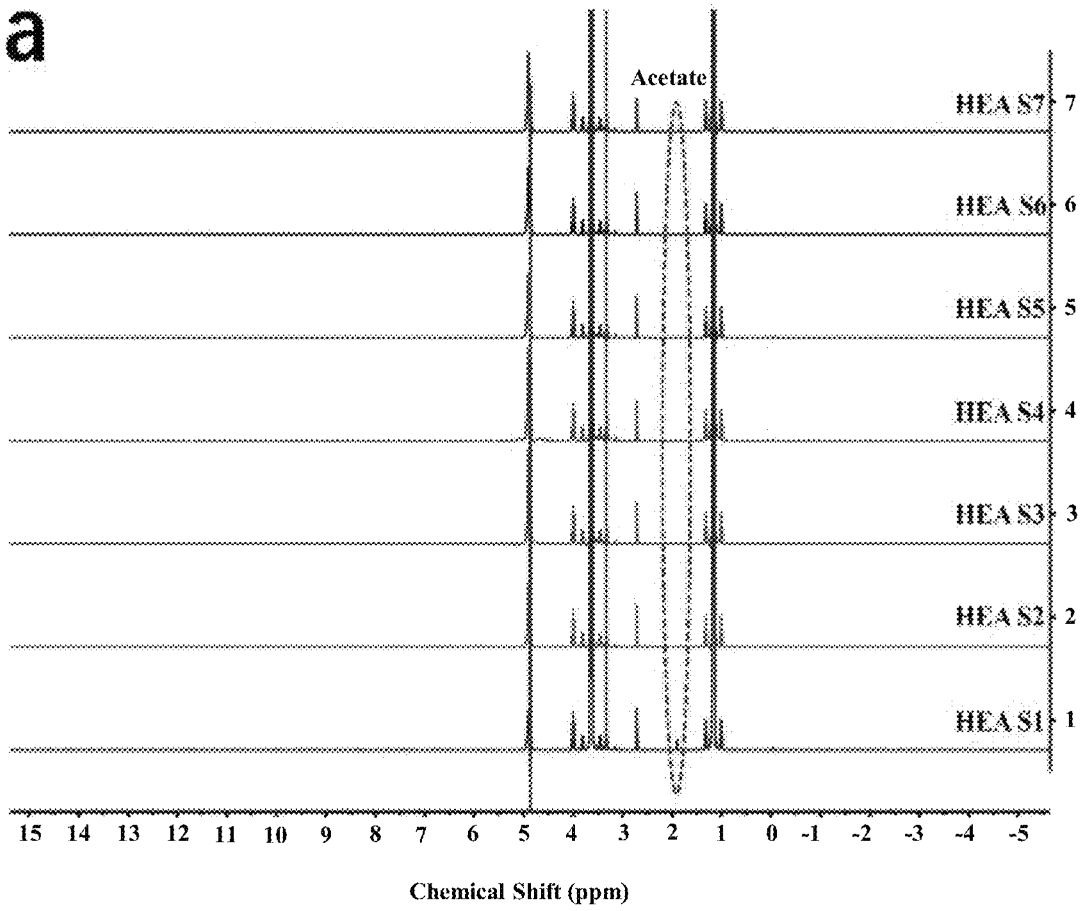
FIG. 9A is a plot illustrating a $H^1$ NMR spectra of the electrolytes of EOR on HEA/C after the i-t tests for 3 h at different potentials, according to an embodiment of the present disclosure. To prevent contamination of $CO_2$ from the air, the experiments were performed in a sealed and air-free H-type cell with continuous $N_2$ gas flowing into 100 mL electrolyte (1 M KOH+1 M EtOH). After 3 h potentiostatic i-t testing, the electrolyte was used for the $H^1$ NMR test immediately.
Figure 9B:
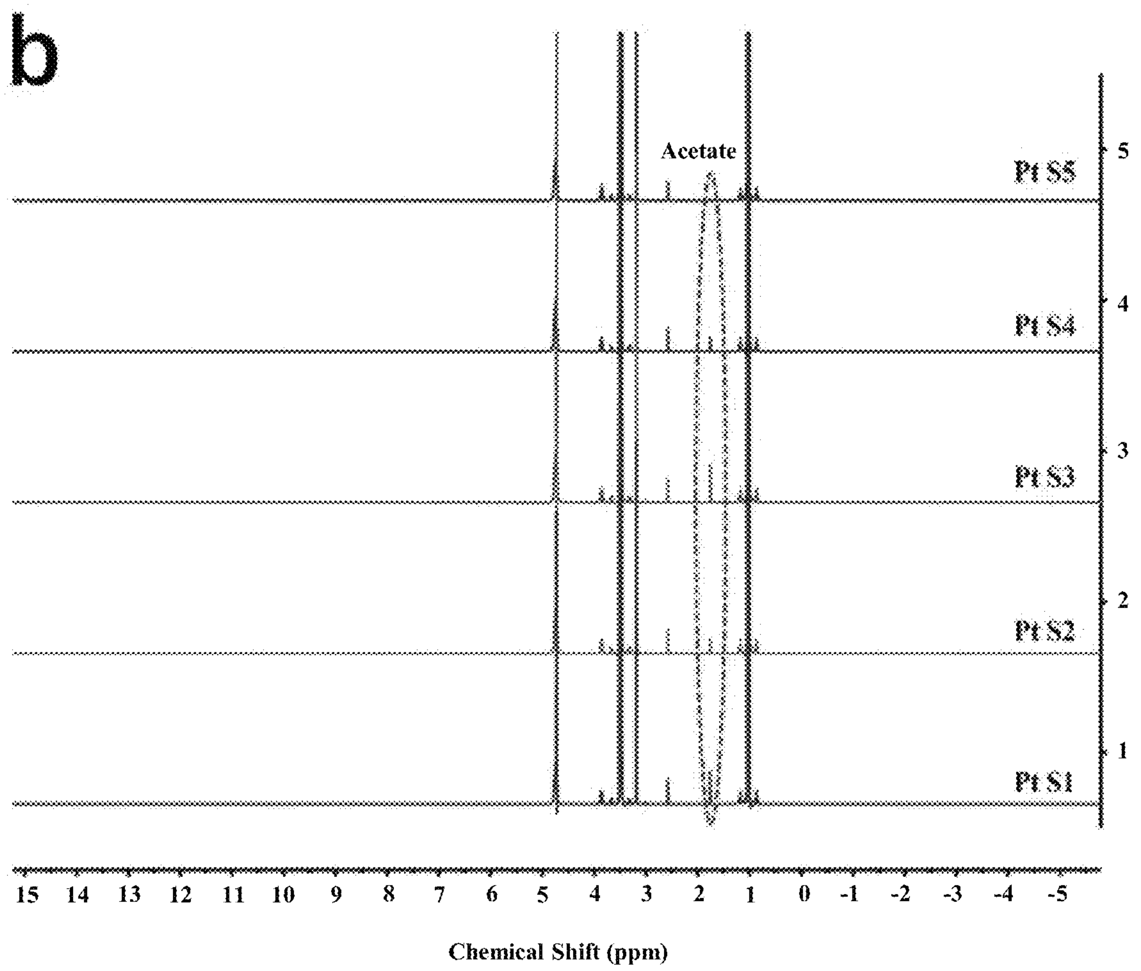
FIG. 9B is a plot illustrating a $H^1$ NMR spectra of the electrolytes of EOR on Pt/C after the i-t tests for 3 h at different potentials, according to an embodiment of the present disclosure. To prevent contamination of $CO_2$ from the air, the experiments were performed in a sealed and air-free H-type cell with continuous $N_2$ gas flowing into 100 mL electrolyte (1 M KOH+1 M EtOH). After 3 h potentiostatic i-t testing, the electrolyte was used for the $H^1$ NMR test immediately.
Figure 9C:
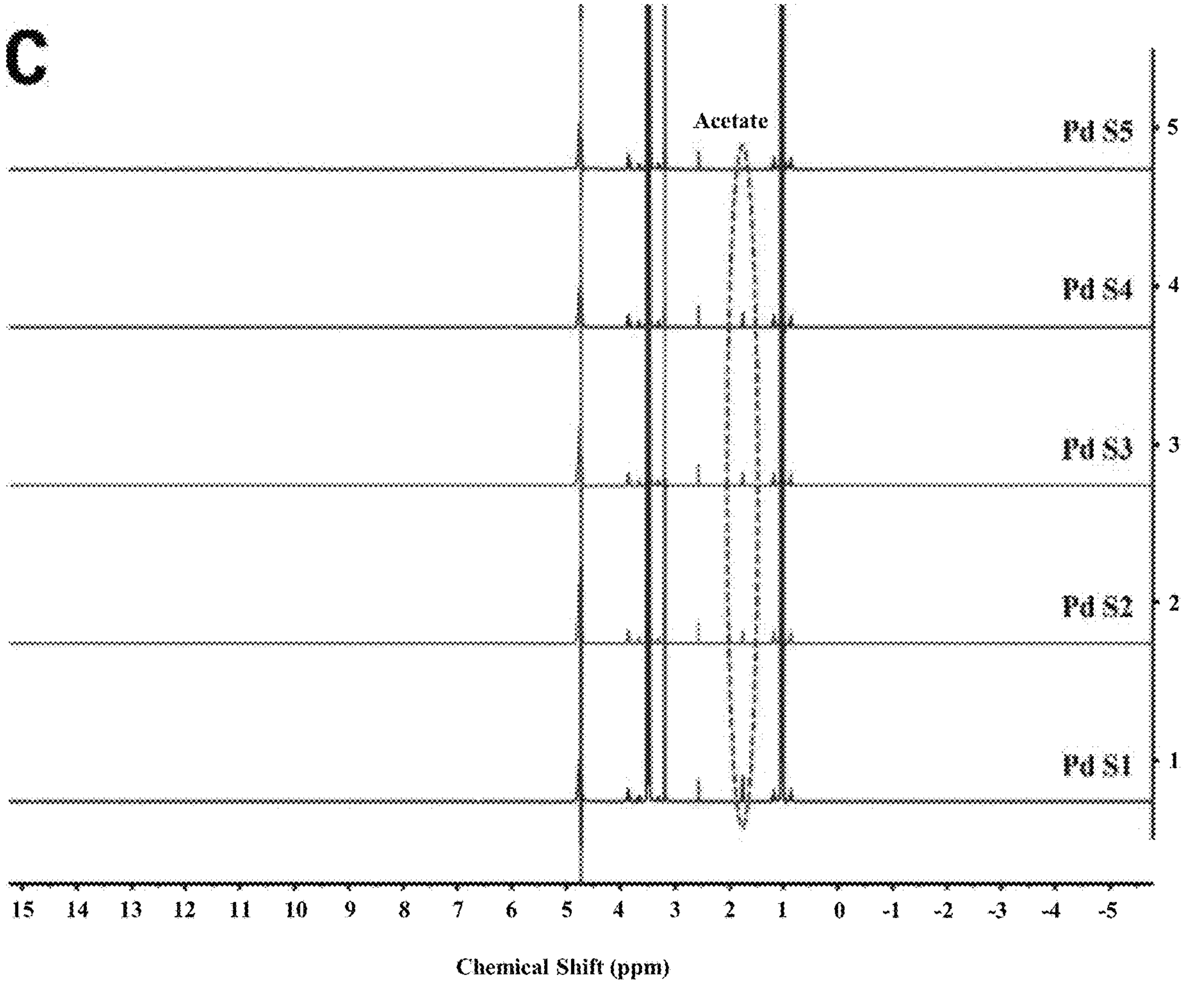
FIG. 9C is a plot illustrating a $H^1$ NMR spectra of the electrolytes of EOR on Pd/C after the i-t tests for 3 h at different potentials, according to an embodiment of the present disclosure. To prevent contamination of $CO_2$ from the air, the experiments were performed in a sealed and air-free H-type cell with continuous $N_2$ gas flowing into 100 mL electrolyte (1 M KOH+1 M EtOH). After 3 h potentiostatic i-t testing, the electrolyte was used for the $H^1$ NMR test immediately.
Figure 9D:
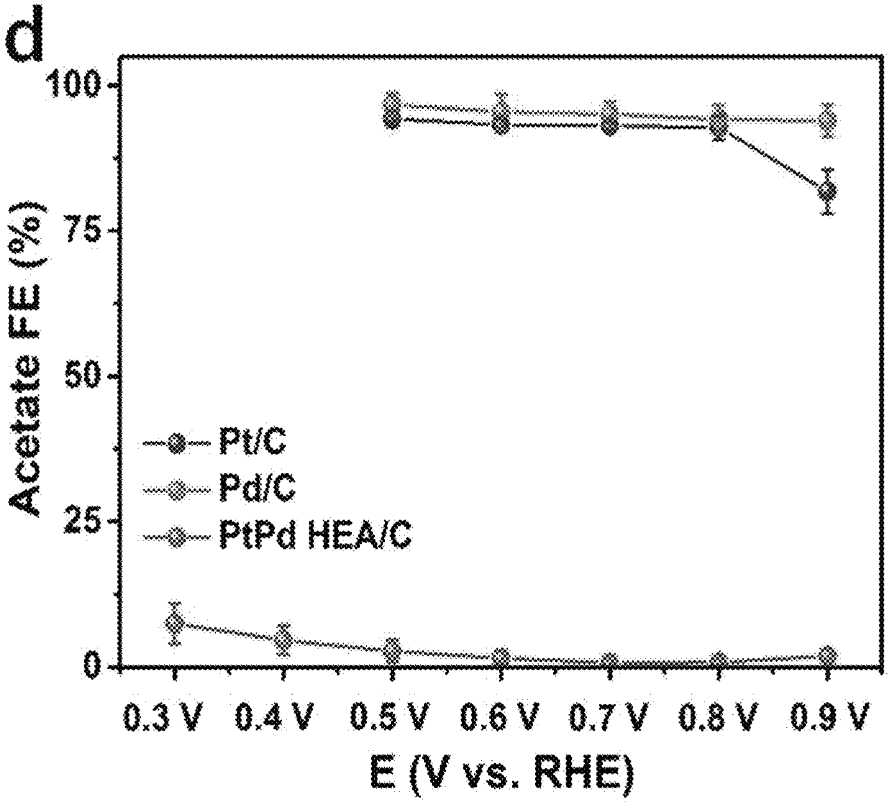
FIG. 9D is a plot illustrating a FE of EOR to acetate on different samples, HEA/C, Pt/C, and Pd/C, at different potentials, according to an embodiment of the present disclosure.

FIGS. 9A-9D depict an acetated formed by the EOR, according to an embodiment of the present disclosure. As shown in FIG. 9A, in an embodiment, for the HEA/C, no acetate signals may be found, such that it can be determined that no acetate was generated on a HEA/C electrode during EOR. In contrast, as shown in FIGS. 9B-9C, in this embodiment, acetate signals may be found on the commercial catalyst (e.g., Pt/C and/or Pd/C) electrodes, such that it may be determined that the EOR on the commercial catalyst electrode may be mainly through a 4e pathway with acetate as the mainly products. Furthermore, as shown in FIG. 9D, in this embodiment, the HEA/C may comprise a direct 12e pathway with $CO_2$ as the final product, while the indirect 4e pathway on the commercial catalysts comprise acetate as the final products.

Figure 10A:
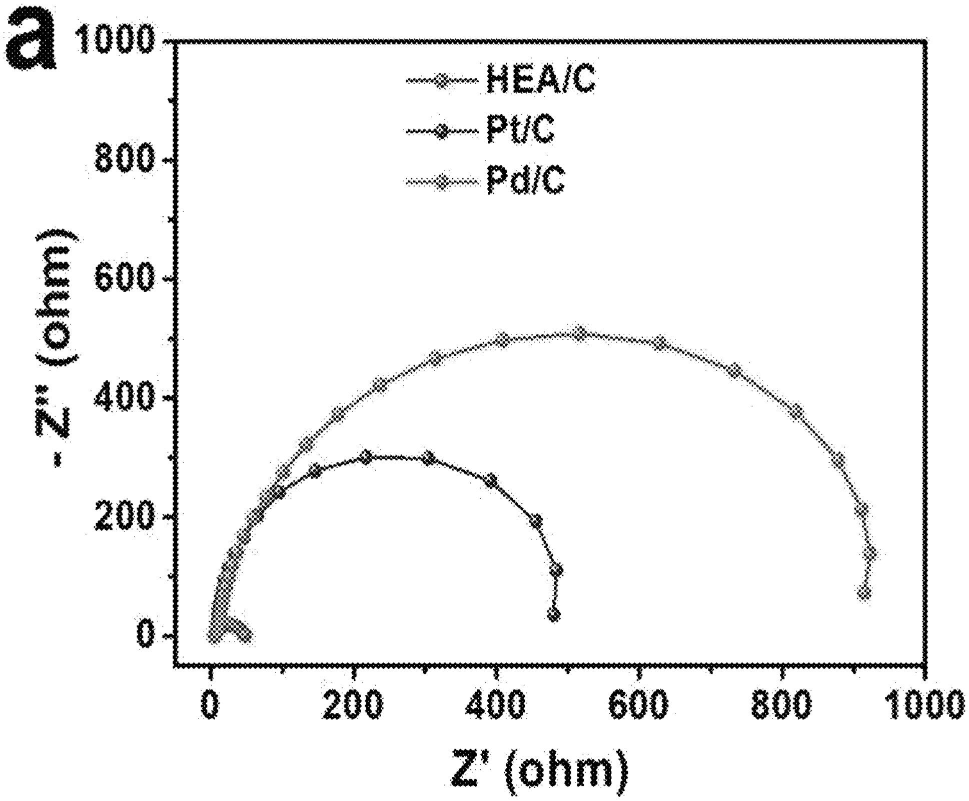
FIG. 10A is a plot illustrating an EIS test of HEA/C, Pt/C, and Pd/C for EOR at 0.7 V vs. RHE, according to an embodiment of the present disclosure.
Figure 10B:
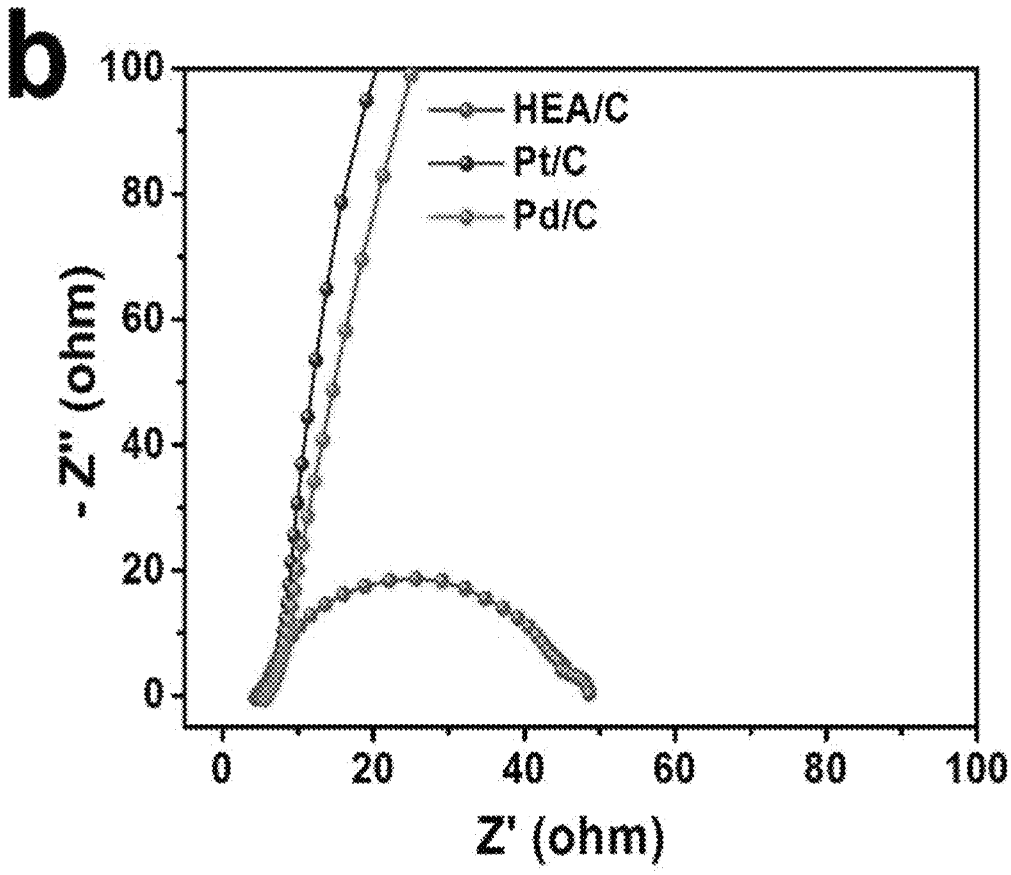
FIG. 10B is a plot illustrating an enlarged EIS test of HEA/C, Pt/C, and Pd/C for EOR at 0.7 V vs. RHE, according to an embodiment of the present disclosure.
Figure 10C:
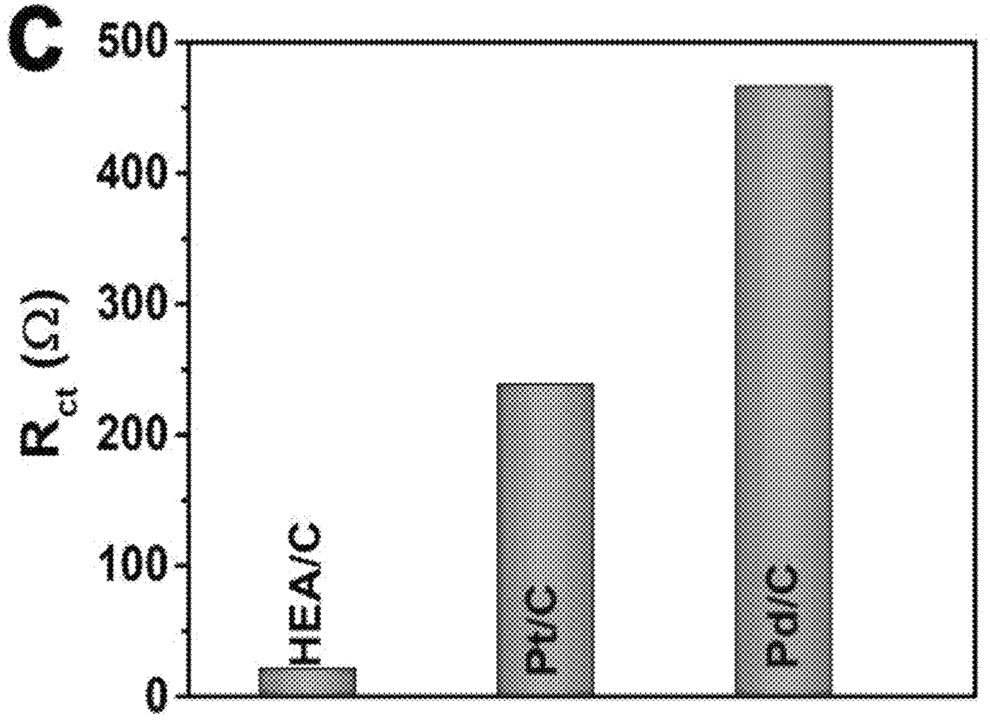
FIG. 10C is a graph illustrating a charge transfer resistance (hereinafter "$R_{ct}$") of catalysts, HEA/C, Pt/C, and Pd/C, according to an embodiment of the present disclosure. The $R_{ct}$ of PtPdFeCoNiSnMn HEA/C is much smaller than other control samples, indicating the much faster EOR kinetic rate on HEA/C.
Figure 10D:
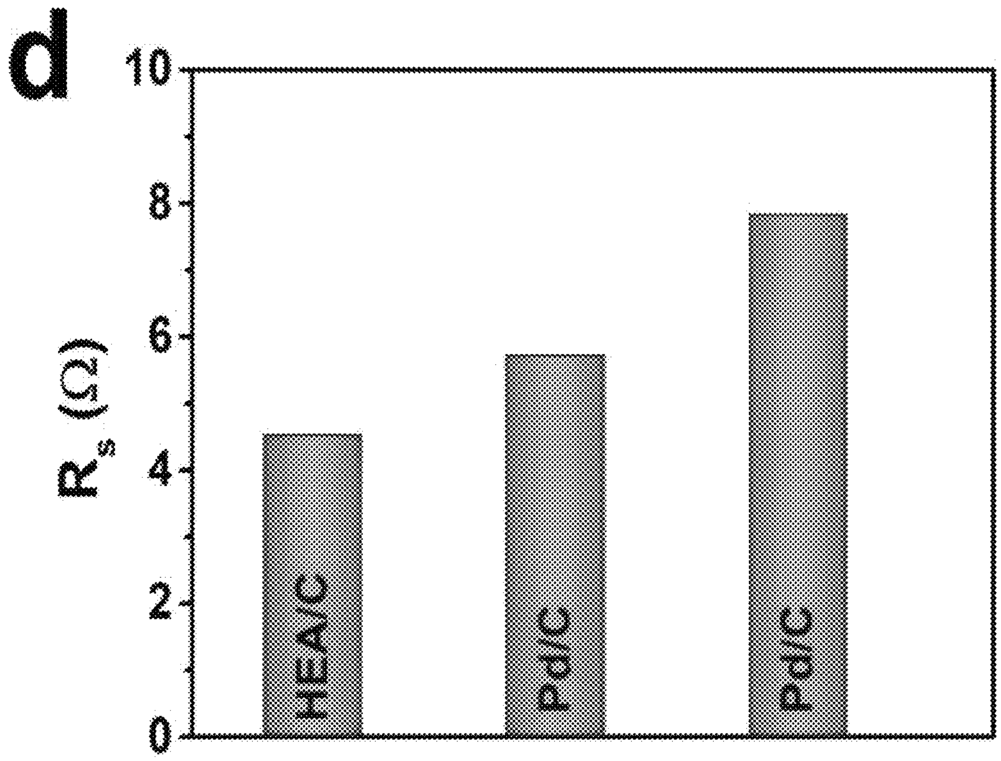
FIG. 10D is a graph illustrating a system resistance (hereinafter "$R_s$") of catalysts, HEA/C, Pt/C, and Pd/C, according to an embodiment of the present disclosure.

In addition, FIGS. 10A-10B depict Nyquist plots and enlarged plots of different samples in 1M KOH containing 1M EtOH solutions, according to an embodiment of the present disclosure. Accordingly, as shown in FIGS. 10-10B, in an embodiment, the HEA/C may comprise a smaller arc as compared to the commercial catalysts. As such, as shown in FIG. 10C, in this embodiment, a charge transfer resistance of HEA/C may be substantially decreased as compared to the commercial catalysts. In some embodiments, a system resistance ($R_s$) of the commercial catalysts may show similar values.

Figure 11A:
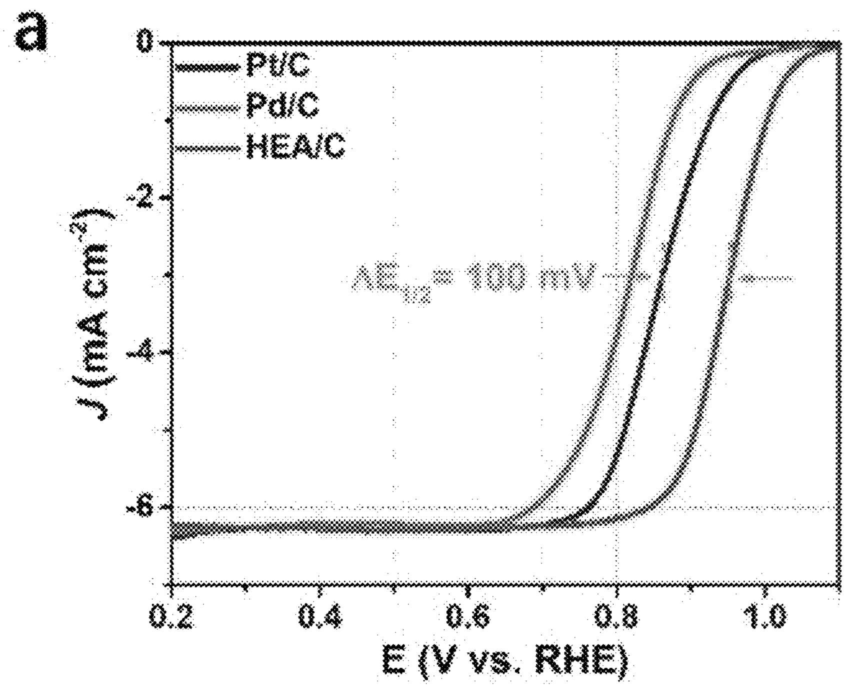
FIG. 11A is a plot illustrating an ORR LSV polarization curves of Pt/C, Pd/C, and HEA/C in $O_2$ saturated 0.1 M KOH solution with a scan rate of 5 mV $s^{-1}$ and 1600 rpm, according to an embodiment of the present disclosure.
Figure 11B:
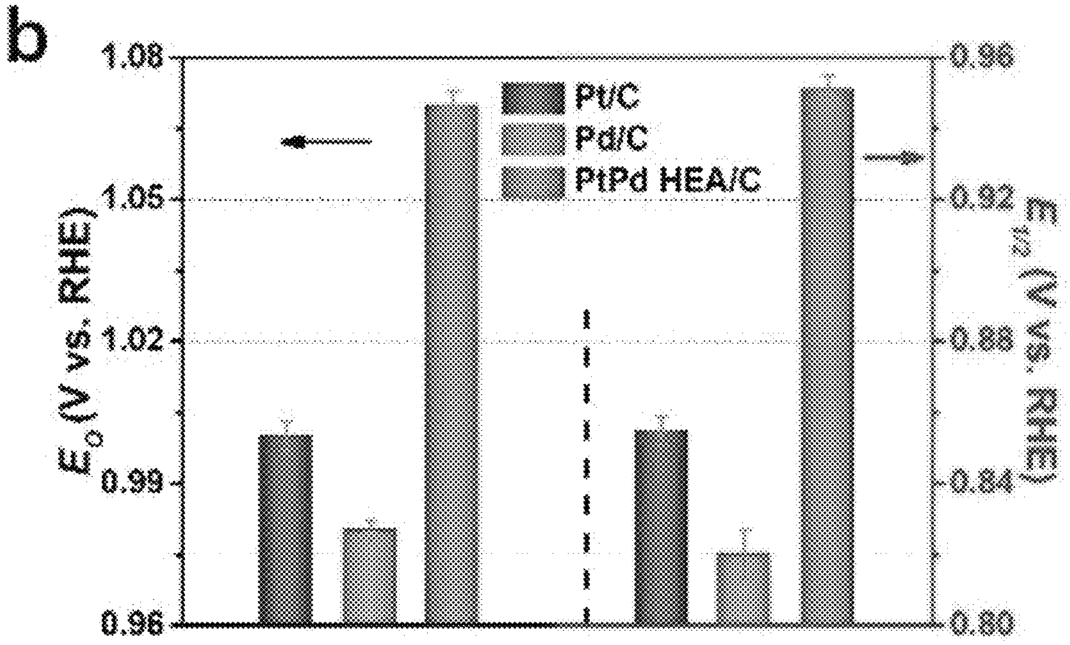
FIG. 11B is a graph illustrating an onset potential ($E_0$) and half-wave potential ($E_{1/2}$) for ORR on different electrodes, according to an embodiment of the present disclosure.
Figure 11C:
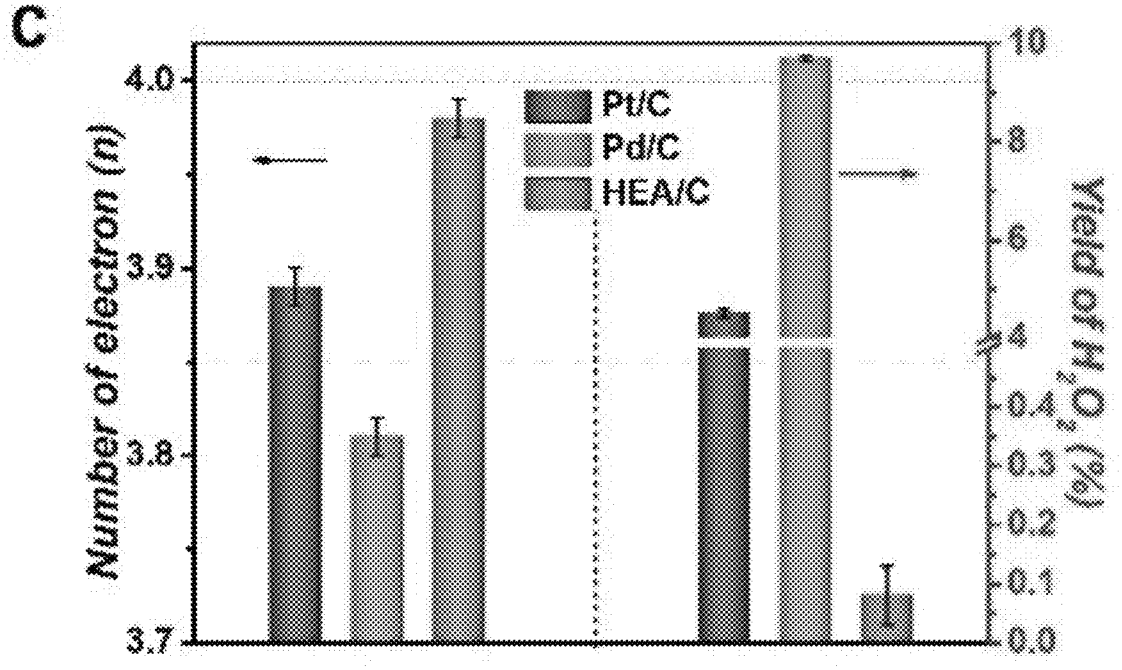
FIG. 11C is a graph illustrating an electron transfer number (n) and $H_2O_2$ selectivity (z) of different catalysts determined by RRDE test, according to an embodiment of the present disclosure.
Figure 12A:
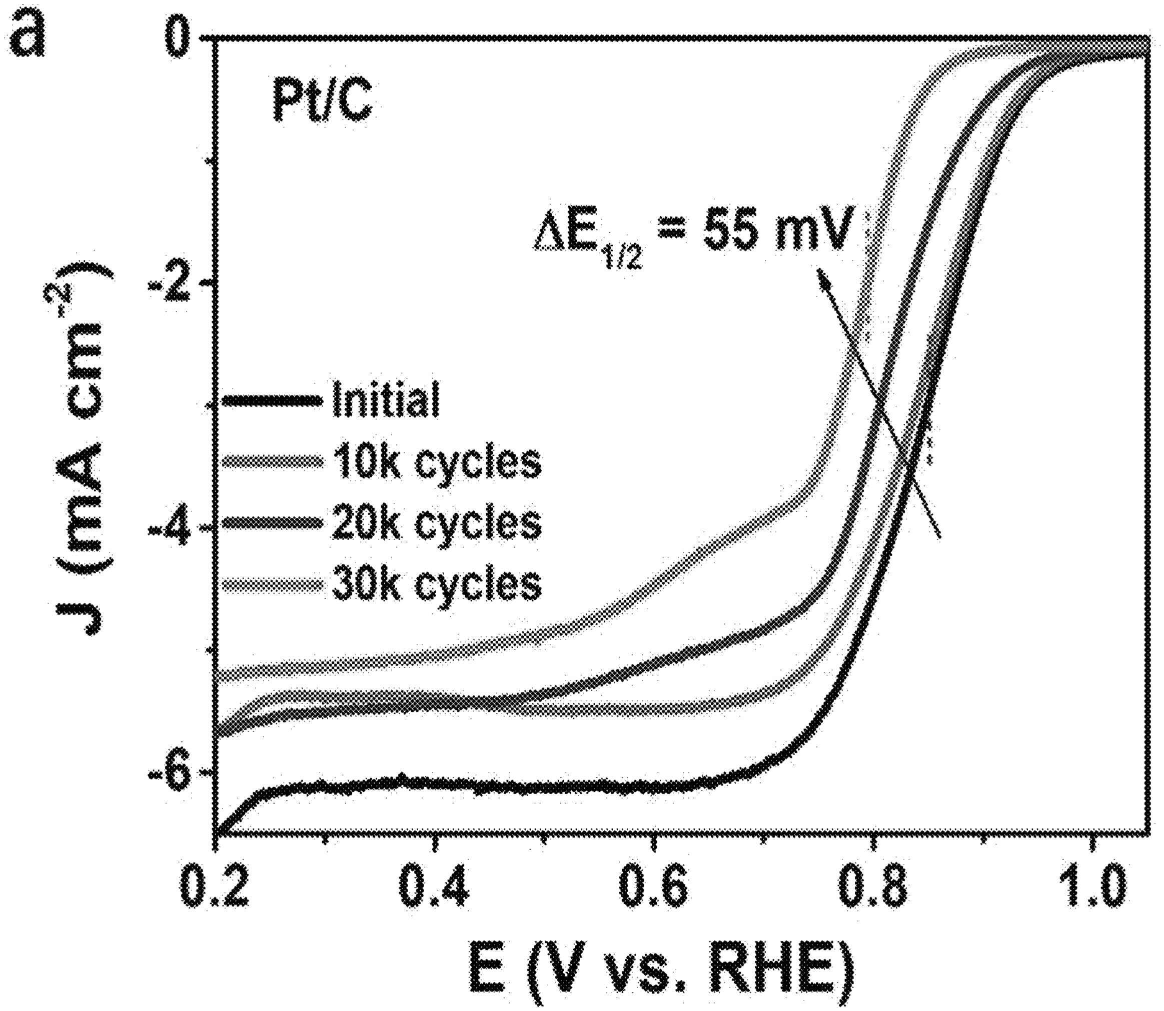
FIG. 12A is a plot illustrating a stability of commercial Pt/C for ORR after 10 k, 20 k, and 30 k CV cycles, according to an embodiment of the present disclosure. The scanning rate is 5 mV $s^{-1}$ and 1600 rpm in $O_2$ saturated 0.1 M KOH solutions.
Figure 12B:
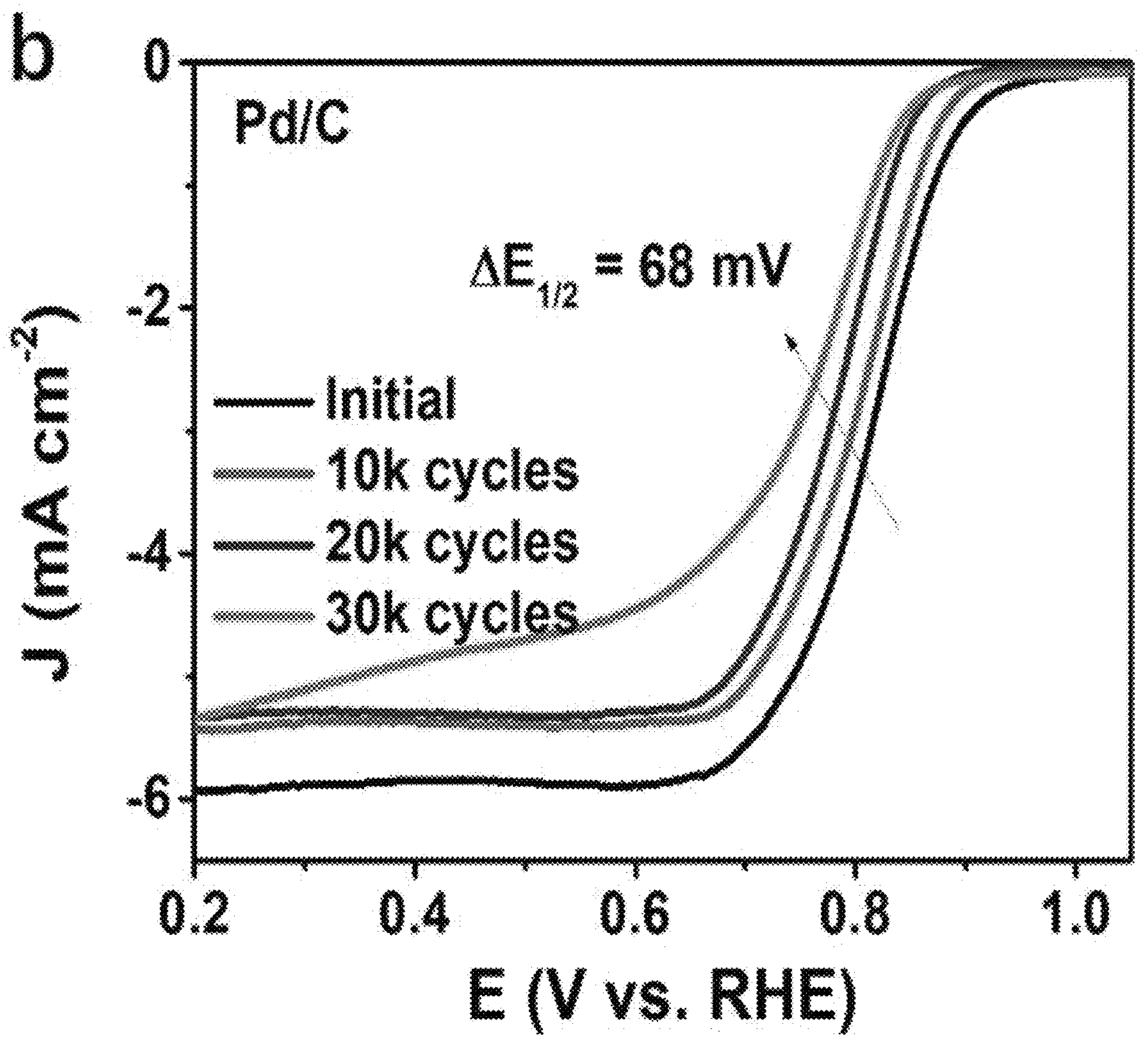
FIG. 12B is a plot illustrating a stability of commercial Pd/C for ORR after 10 k, 20 k, and 30 k CV cycles, according to an embodiment of the present disclosure. The scanning rate is 5 mV $s^{-1}$ and 1600 rpm in $O_2$ saturated 0.1 M KOH solutions.

As shown in FIG. 11A, in an embodiment, the half-wave potential ($E_{1/2}$) of HEA/C may comprise a negative shift as compared to the commercial catalyst, Pt/C for an oxygen reduction reaction (hereinafter "ORR"). In this manner, in this embodiment, as shown in FIG. 11B, the onset potential and/or half-wave potential of HEA/C for ORR may comprise at least 1.05V and/or at least 0.90V vs. RHE, respectively. As shown in FIG. 12A and FIG. 12B, in this embodiment, these values may be significantly higher than the commercial catalysts, Pt/C and/or Pd/C, respectively. As such, the HEA/C may comprise optimized activity at the activation sites of the HEA/C for the ORR.

In addition, in this embodiment, the HEA/C may comprise an electron transfer of at least 4 electrons with a super low yield of $H_2O_2$ on HEA/C, such that the 4e pathway may be detected. In contrast, the commercial catalysts (e.g., Pt/C and Pd/C) may comprise an electron transfer of at most 3.9 and/or at most 3.8 electrons respectively, and/or both commercial catalysts may comprise a much higher yield of $H_2O_2$ than HEA/C.

Figure 11D:
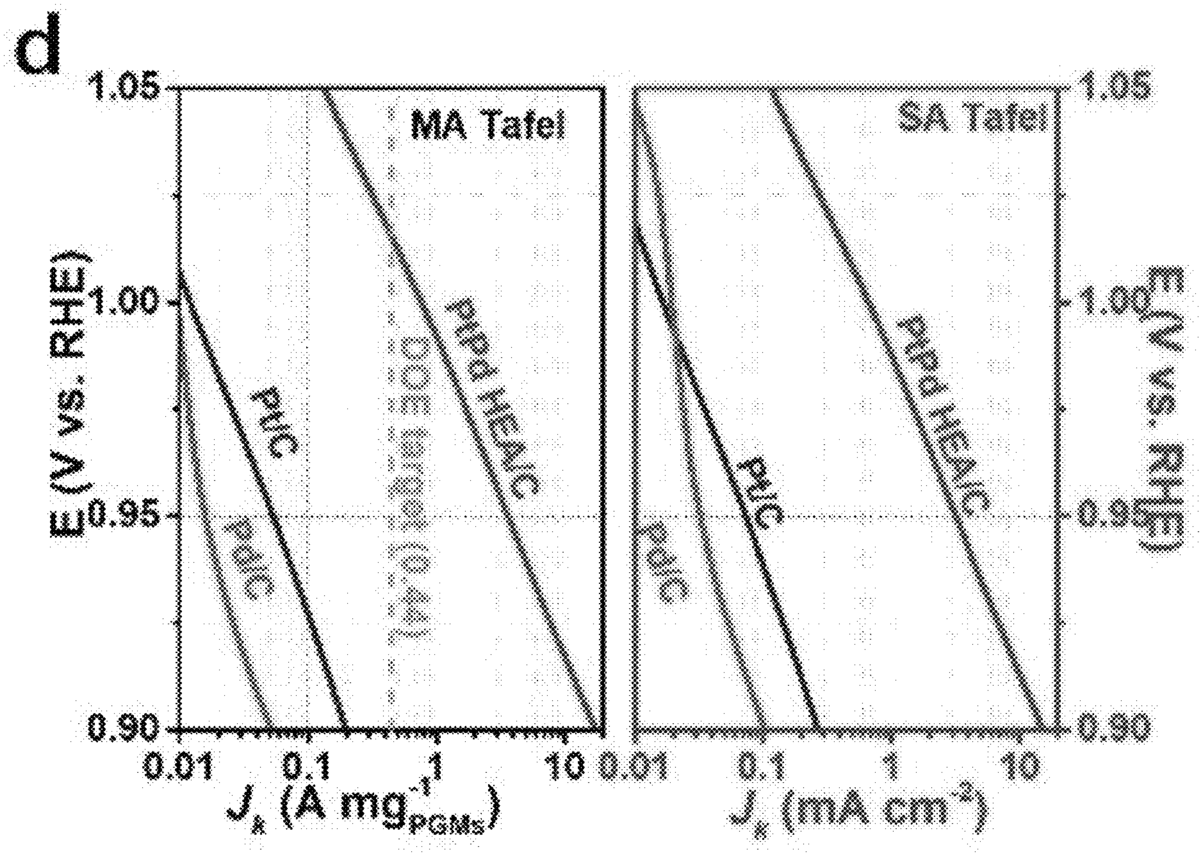
FIG. 11D is a plot illustrating a Mass activity (MA) and specific activity (SA) Tafel plot for catalysts, HEA/C, Pt/C, and Pd/C, according to an embodiment of the present disclosure.
Figure 11E:
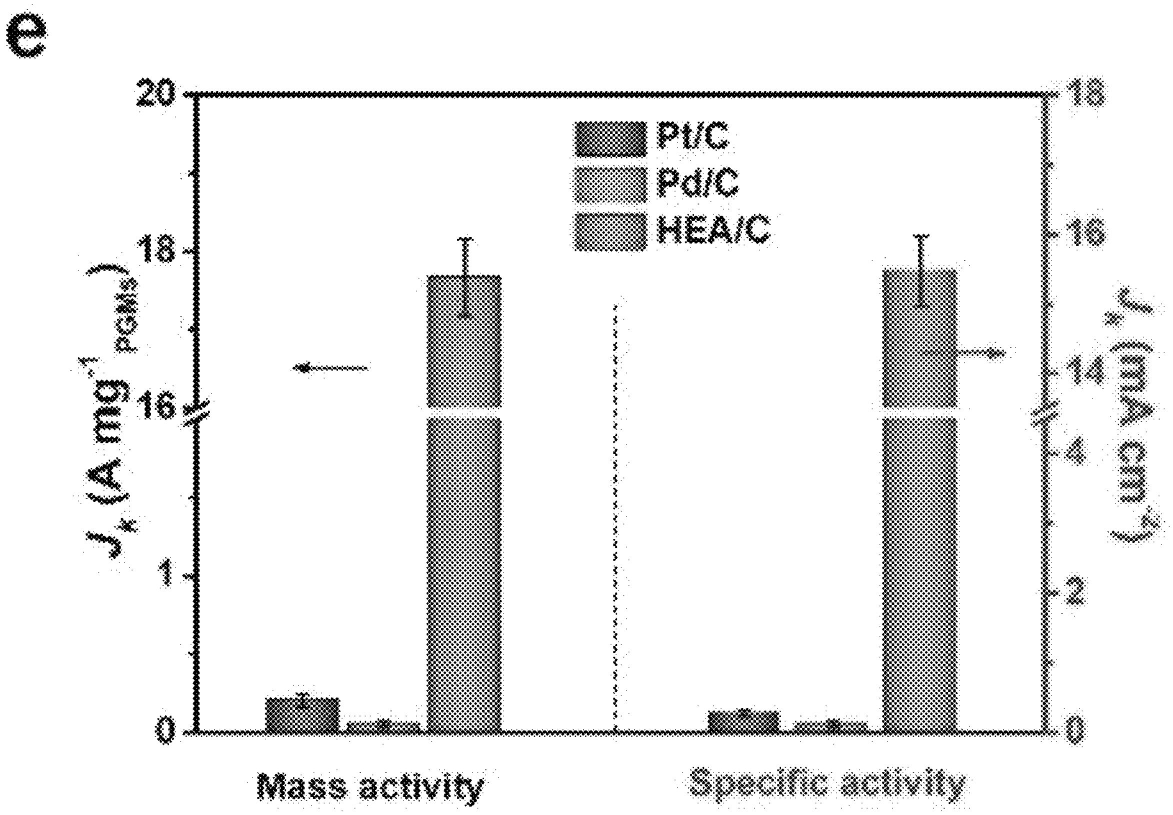
FIG. 11E is a graph illustrating a comparison of MA and SA at 0.9 $V_{iR\text{-}free}$ vs. RHE of catalysts, HEA/C, Pt/C, and Pd/C, according to an embodiment of the present disclosure.

Furthermore, as shown in FIG. 11D, in an embodiment, a mass activity and/or a specific activity for HEA/C may be at least 17.7 A $mg^{-1}_{PGMs}$ and/or at least 15.5 A $cm^{-2}$ vs. RHE, which may be at least 71-times and/or at least 54-times higher than Pt/C (MA=0.25 A $mg^{-1}_{Pt}$, SA=0.27 mA $cm^{-2}$). Additionally, as shown in FIG. 11E, in this embodiment, the mass activity and/or the specific activity for HEA/C may be at least 354-times and/or at least 141-times higher than Pd/C (MA=0.05 A $mg^{-1}_{Pt}$, SA=0.11 mA $cm^{-2}$.

Figure 11F:
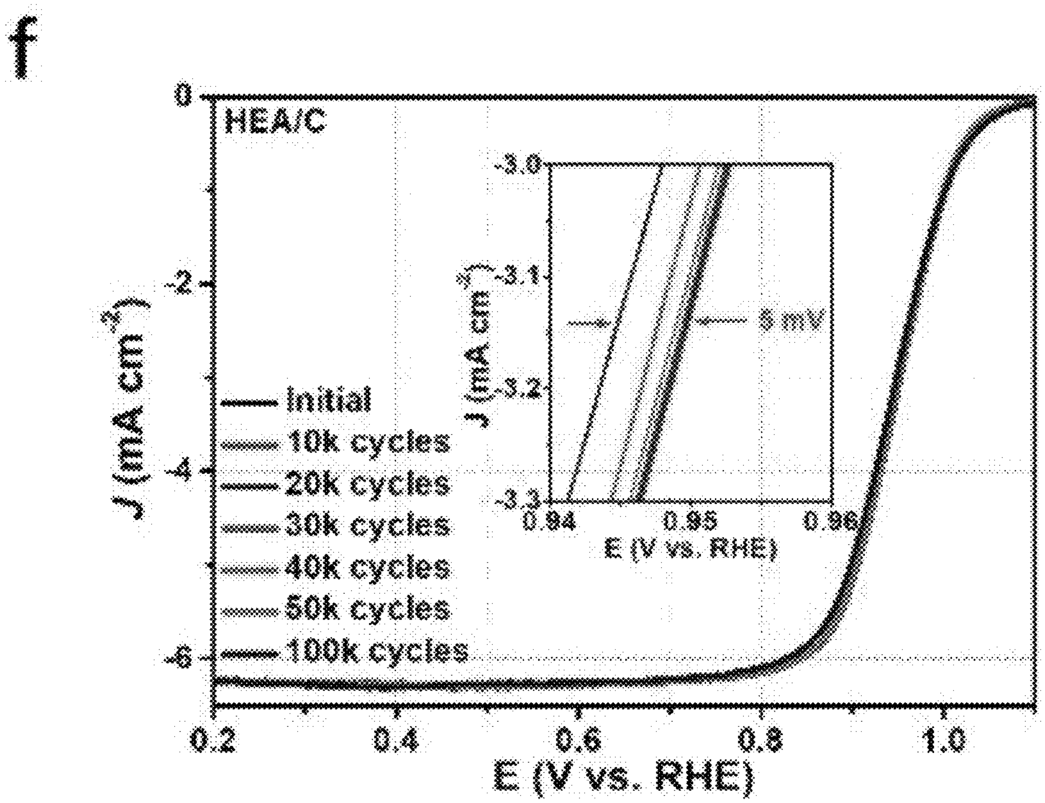
FIG. 11F is a plot illustrating an ORR LSV polarization curves of HEA/C before and after 10 k, 20 k, 30 k, 40 k, 50 k and 100 k CV cycles, according to an embodiment of the present disclosure. The inset is the enlarged areas in near $E_{1/2}$ regions.

Moreover, besides the super activity, the stability may also be important for an ORR catalyst in real application. Additionally, as shown in FIG. 11F, in an embodiment, even after 100 k continuous cycling in a range of at least 0.4 V and/or at most 2.0 V, such that the ORR-LSV of the HEA/C may comprise no obvious change in performance. Additionally, in this embodiment, the $E_{1/2}$ of the HEA/C may depict a negative shift of at most 5 mV after 100 k CVs cycles compared with the initial curves, indicating the super stability (i.e., optimized stability) of the HEA/C. In contrast, as shown in FIGS. 12A-12B, after only 30 k AST test, the Pt/C and/or Pd/C may show a $E_{1/2}$ of at most 55 mV and at most 68 mV respectively.

Figure 13A:
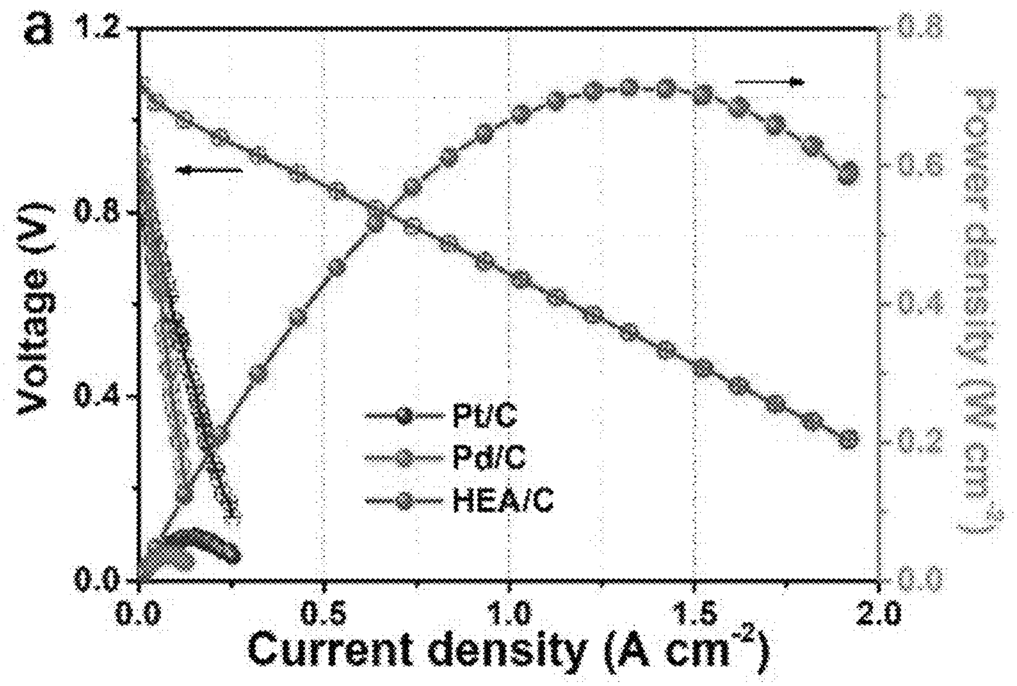
FIG. 13A is a plot illustrating a Steady-state DEFCs polarization and power-density curves using Pt/C, Pd/C, and HEA/C as catalysts to fabricate MEA, according to an embodiment of the present disclosure.
Figure 13B:
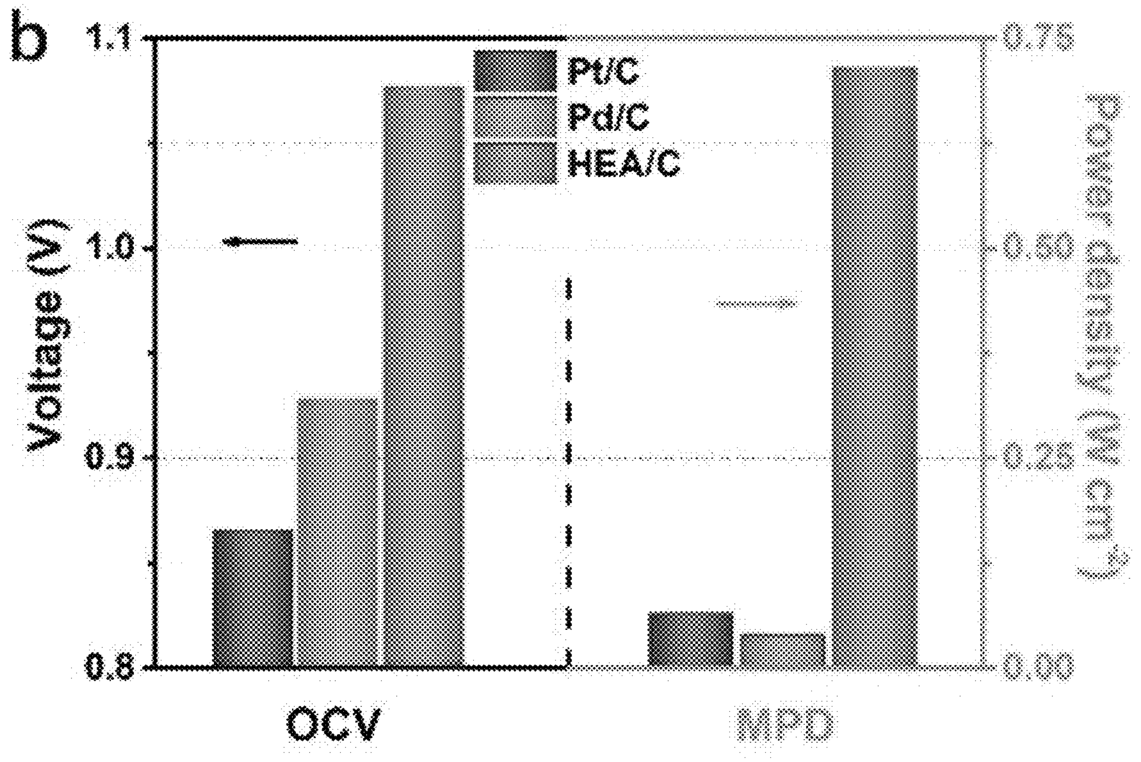
FIG. 13B is a graph illustrating an open circuit voltage (OCV) and maximum power density (MPD) of catalysts HEA/C, Pt/C, and Pd/C, according to an embodiment of the present disclosure.

As shown in FIGS. 13A-13B, in an embodiment, the membrane electrode assembly (hereinafter "MEA") fabricated by HEA/C may depict an open-circuit voltage (hereinafter "OCV") of at least 1.05 V. As such, the OCV of the HEA/C may be very close to the theoretical value in the alkaline DEFCs (i.e., 1.14 V) and/or may be much higher than the commercial catalysts, Pt/C, comprising at most 0.92 V, and Pd/C, comprising at most 0.87 V, respectively. Additionally, as shown in FIG. 13B, in this embodiment, the much higher OCV may allow for a much lower polarization overpotential to be required and/or a lower active energy barrier for DEFCs may be decreased. Furthermore, in this embodiment, the maximum peak power density (MPD) of HEA/C may be at least 0.72 W and/or may be at least 11.3 and/or 18.9-times higher than Pt/C, comprising at most 0.06 W $cm^{-2}$, and Pd/C, comprising 0.038 W $cm^{-2}$, respectively.

Figure 13C:
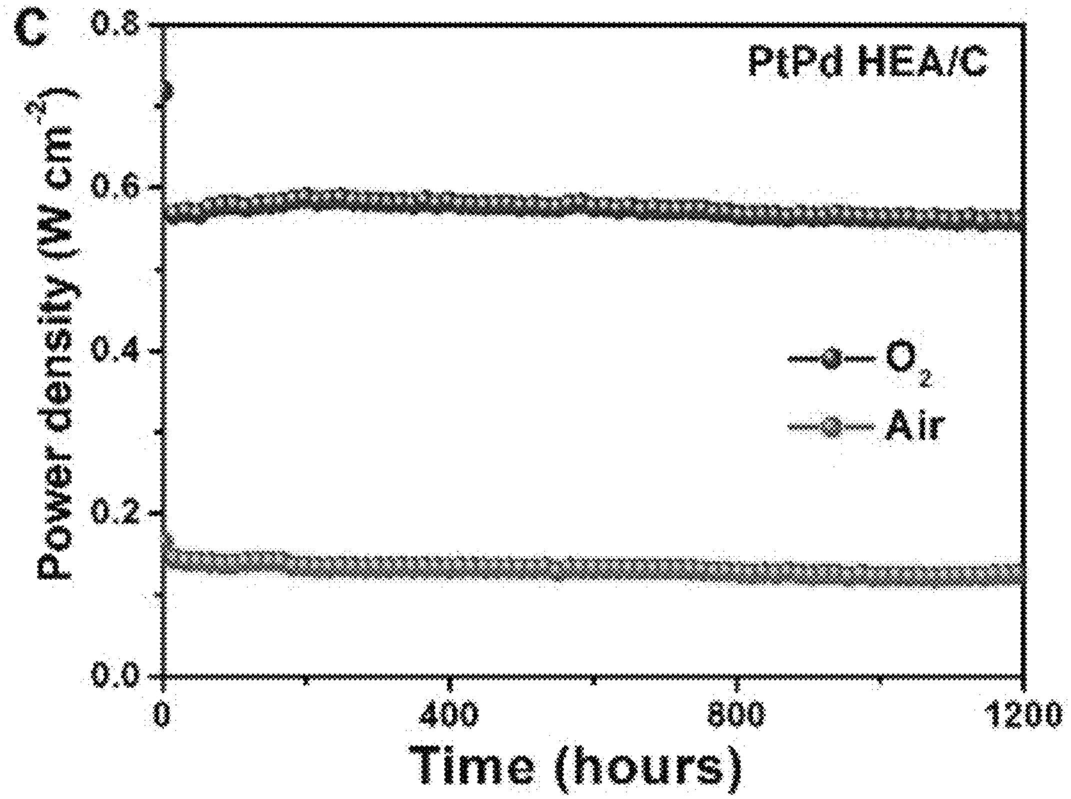
FIG. 13C is a plot illustrating discharge curves for DEFCs at 0.6 V with $O_2$ or air as cathode feeding, according to an embodiment of the present disclosure. The anode was fed with 1 M KOH+2 M EtOH aqueous solution with a flow rate of 20 mL $min^{-1}$, the cathode was fed with $O_2$ or air with a flow rate of 100 mL $min^{-1}$. The test temperature was 60° C. without backpressure.
Figure 13D:
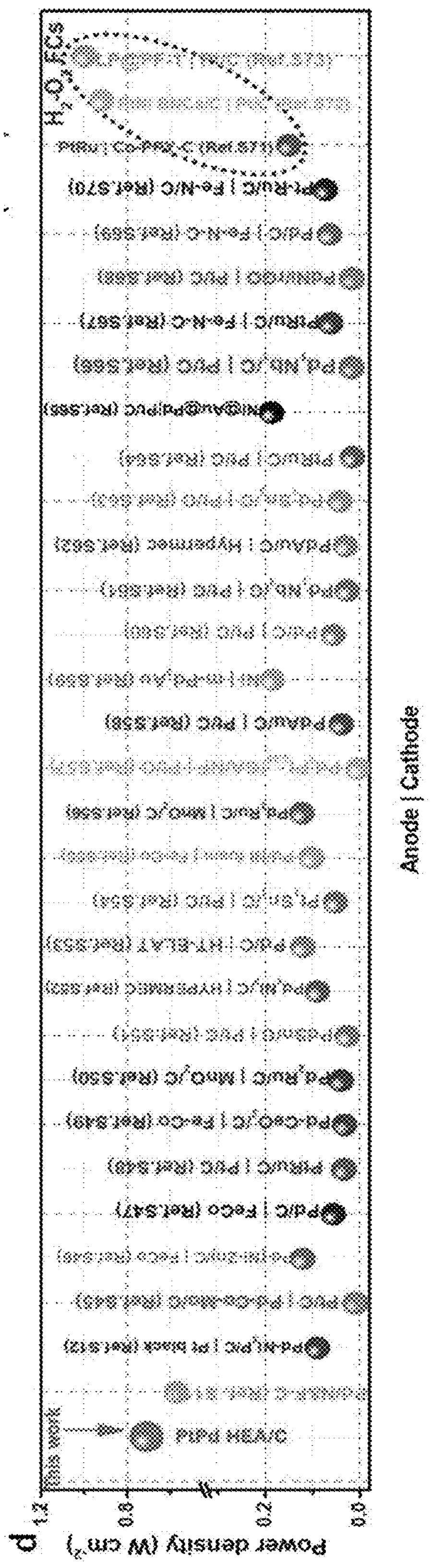
FIG. 13D is a graph illustrating a comparison of DEFCs performance with HEA/C and benchmarking catalysts, according to an embodiment of the present disclosure.

Additionally, as shown in FIGS. 13C-13D, in an embodiment, the power density of HEA/C may be more than 10-times higher than other state-of-the-art DEFCs and/or the power density of the HEA/C may be almost the same level to the performance of $H_2$—$O_2$ fuel cells. In this manner, as shown in FIG. 13C, in this embodiment, the HEA/C construct may be able to operate stably at a constant working voltage of at least 0.6 V for at least 1,200 hours with a negligible performance decay (e.g., at most 4%) of the output power densities, regardless of whether $O_2$ and/or air may be used as cathode feeding. Therefore, the HEA/C construct may optimize the catalytic reaction of an ORR allowing for a practical application to replace $H_2$—$O_2$ fuel cell. As such, in this embodiment, the HEA/C construct may provide a similar power density with long-term operation and/or may solve the storage and/or transportation problems of $H_2$.

The following examples are provided for the purpose of exemplification and are not intended to be limiting.

EXAMPLES

Example 1

Synthesis of PtPdFeCoNiSnMn High Entropy Alloy (Hereinafter "HEA")

This example describes the materials and synthesis thereof for the studies described in Example 2, Example 3, Example 4, Example 5, Example 6, and Example 7.

Platinum(II) acetylacetonate (98%), Palladium(II) acetylacetonate (35% Pd), Iron(III) acetylacetonate (99%), Cobalt (II) acetylacetonate, (99%), Nickel acetylacetonate (96%), Bis(2,4-pentanedionato)Tin(IV) Dichloride (98.0+%) Manganese(III) acetylacetonate (97%), Potassium hydroxide (pellets, 85%), Perchloric Acid, Oleylamine (50.0%), ascorbic acid (99%), ethanol (100%), 1-Octadecene (90%), cyclohexane (99%) et al. were used to synthesize the HEA. Commercial Pt/C (20 wt % of 3-nm Pt nanoparticles on carbon black, Johnson Matthey) and Pd/C (10 wt % of 8-nm Pd nanoparticles on activated carbon, Aldrich) were used as a baseline catalyst. Nafion solution (5.0 wt %), carbon paper (TGP-H-060), and anion-exchange membrane (Fumasep FAS-30) were purchased from Fuel Cell Earth and Fuel Cell Store, respectively. Deionized water (18.2 MΩ $cm^{-1}$) was used to prepare all aqueous solutions.

FIG. 1 depicts the XRD pattern of the alloy catalyst, according to an embodiment of the present disclosure. In this embodiment, the XRD of PtPdFeCoNiSnMn HEA may comprise a typical face-centered cubic (fcc) structure, such that the peak may be located at the center of Pt (JCPDS No. 04-0802) and Pd (JCPDS No. 46-1043), indicating the formation of alloy. The weakening and broadening of peaks in the XRD pattern may be attributed to the lattice distortion in HEA.

Briefly, a mixture of seven metal acetylacetonate precursors (e.g., the use of metal acetylacetonates may be the key point to the fabrication of HEA here. The strong metal-acetylacetonate interaction facilitates coprecipitation by slowing down the rate of the precipitation) at an equal molar amount (0.051 mmol) was pre-dissolved in a 20 mL glass vial mixture of 8 mL oleylamine and 2 mL 1-octadecene. After sonicated for 60 min, 60 mg ascorbic acid was added in the vial and sonicated for another 30 min till the solution changed a homogeneous solution, then the vial was sealed with argon and transferred into an oil bath. Within 30 min, the temperature of oil bath was heated to 160° C. and kept for another 8 hours. After cooling to room temperature, the black colloidal product was collected with centrifugation, and washed with mixture of ethanol and cyclohexane (3:1 in volume ratio) at least five times to complete remove the excess oleylamine and residue. The final PtPdFeCoNiSnMn HEA was stored at vacuum oven at 60° C. overnight for further use. FIGS. 2A-2H depict a XPS of the metals which may comprise the metal alloy, according to an embodiment of the present disclosure. In this embodiment, as shown in FIG. 2A, in the XSP survey, the metals of Pt, Pd, Fe, Co, Ni, Sn, Mn may be clearly seen, and the atomic contents may be approximately the same. In addition, the precious metals surface, Pt and Pd, may be mainly in metallic state from the high-resolution Pt and Pd XPS, as shown in FIGS. 2B-2C. In this manner, as shown in FIGS. 2D-2H, the non-platinum groups metals, such as Fe, Co, Ni, Sn, Mn may be mixed within a metal state and/or a oxidation state due to the air-exposure. As such, the presence of metal oxide optimizes the CO poisoning resistance of the HEA catalyst.

Example 2

Electrochemical Results of the PtPdFeCoNiSnMn HEA

CHI 760E electrochemical workstation was used to perform all the electrochemical measurements at room temperature (~25° C.), which equipped with a glassy carbon rotating ring-disk electrode tip (PINE research, 0.2475 $cm^2$ disk area and 0.1866 $cm^2$ Pt ring area) and an electrode rotator. Hg/HgO (1.0 M KOH) electrode was used as reference electrode while graphite rod as counter electrode, respectively. All potentials were referred to the reversible hydrogen electrode (RHE), the Hg/HgO reference electrode was calibrated using a RHE standard before the electrochemical measurement. All potentials were vs. RHE in this work. As shown in FIG. 3, both ICP and XPS results may indicate that the seven metals have a similar content (e.g., 10~20 at. %), while the commercial catalysts, Pt and Pd, may comprise a little higher content than other metals from XPS, indicating the surface enrichment due to the annealing treatment.

The as prepared PtPdFeCoNiSnMn HEA was deposited on commercial Vulcan XC-72 active carbon black (200-250 $m^2$ $g^{-1}$) for electrochemical test. Briefly, 15 mg PtPdFeCoNiSnMn HEA was dispersed in 15 mL ethanol, and 60 mg carbon in 60 mL ethanol were mixed with subsequently sonicated for at least 60 min. The mixture was stirring for another 12 hours to make the evenly supporting of metals on carbon. The product was collected by centrifugation (8000 rpm), washed with plenty of ethanol and dried at 60° C. overnight under vacuum. Then, the as prepared PtPdFeCoNiSnMn HEA/C was further heated at 500° C. in a chemical vapor deposition (CVD) oven under argon for 1 hours to obtain the final HEA/C products. 5.0 mg HEA/C was dispersed in the solution of Nafion/ethanol/water/(40 μL/480 μL/480 μL) in a 2 mL plastic vial under sonication for at least 1 h to obtain a homogeneous catalyst ink. The catalysts were then dropped on the surface of the polished RRDE using pipette and dried in air naturally with a catalyst total loading of ~38 μg $cm^{-2}$. For the counterparts, such as commercial Pt/C, commercial Pd/C, et al, the noble metal loading was kept at ~38 μg $cm^{-2}$ (ca. 7.5 $\mu g_{PGM}$ $cm^{-2}$). FIGS. 4A-4B depict the aqueous corrosion behavior in 0.1 M KOH solution for HEA/C, Pt/C, Pd/C, PtPd/C, and FeCoNiSnMn HEA without PtPd (hereinafter "HEA w/t PtPd"). It may be seen that HEA has much higher corrosion voltage and much smaller corrosion current density than other samples, indicating that it much better anti-corrosion behavior.

Before the EOR and ORR recording, at least 20 cycles cyclic voltammograms (CVs) were performed at 100 mV $s^{-1}$ to clean and stabilize the catalyst surface until the steady-state current was obtained. The carbon monoxide (CO) stripping experiments were used to calculate the ECSAs precisely in 0.1 M $HClO_4$ solution, CO gas (10% CO balanced $N_2$, Airgas Co.) was initially bubbled into the 0.1 M $HClO_4$ solution, and the working electrode was kept at potential of 0.1 V versus RHE for 15 min. To make sure the monolayer adsorption of CO on electrode surface, ultra-high pure $N_2$ was then purged in the electrolyte for 30 min to remove the redundant CO in $HClO_4$ solution, then two CVs were recorded with a scan rate of 20 mV $s^{-1}$. The ECSAs can be obtained by integrating the charge of CO stripping (the first CV) by subtracting the background charge (the second CV) assuming a charge density of 420 μC $cm^{-2}$.

For all catalysts, the mass activity and the specific activity were obtained by normalizing the precious metal loading and the peak current (for EOR) or kinetic current (for ORR at 0.9 V without iR correction) to the corresponding ECSAs, respectively. The electrochemical EOR experiments were performed in Ar-saturated 1.0 M KOH containing 1.0 M $C_2H_5OH$ solution at a scan rate of 20 mV $s^{-1}$. The electrochemical impedance spectra (EIS) were recorded at a frequency range from 0.1 Hz to 100 kHz with 10 points per decade and the amplitude of 5 mV. For the electrochemical ORR experiments, linear scan voltammetry (LSV) tests were performed in $O_2$-saturated 0.1 M KOH solution at a sweep rate of 5 mV $s^{-1}$ with different rotate speeds of 1600 rpm and the data with 1600 rpm (without iR correction) was used to compare with other works. FIG. 5 shows that the PtPdFeCoNiSnMn HEA/C has much bigger $H_{UPD}$ than Pt/C and Pd/C, thus much higher electrochemically active surface area (ECSA) of the HEA/C than Pt/C and Pd/C.

FIGS. 6A-6C shows the CO stripping of HEA/C, Pt/C, and Pd/C. The HEA/C shows a much lower onset potential. FIG. 6D depicts peak potential, while FIG. 6E depicts CO stripping, indicating the much better anti-poisoning performance of HEA/C than Pt/C and Pd/C. In addition, FIG. 6F shows that the HEA/C has the biggest ECSA than other control samples, indicating it can provide many available active sites for electrochemical reaction.

The value of electron transfer (n) and hydrogen peroxide ($H_2O_2$) yield were calculated based on the disk current ($I_{Disk}$) and ring current ($I_{Ring}$) via the equation provided above, where N=0.37 is the current collection efficiency of Pt ring. Accelerated durability tests for OER were conducted by cycling between 0.6 V and 1.2 V versus RHE at 50 mV $s^{-1}$ for 50,000 cycles, and from 0.6 to 1.0 V versus RHE at 50 mV $s^{-1}$ for 1,000,000 cycles for ORR.

Fumasep FAS-30 (specific hydroxide conductivity of 3.0~7.0 mS $cm^{-1}$, thickness of 30 m, ion-exchange capacity of 1.2~1.4 mmol $g^{-1}$; Fuel Cell Store) was used as an anion-exchange membrane (AEM). The AEM was soaked in 0.5 M NaCl for 3 days and 1 M KOH for 4 days to change it to $OH^-$ environment, then rinsed and stored in ultrapure water (18.2 MΩ cm) for further use. The catalyst inks were made by mixing the HEA/C catalysts (both for anode and cathode), 5% Nafion solution (Aldrich, USA), ethanol, and ultrapure water, in a ratio of 20 mg:100 μL:4 mL:1 mL, respectively. After the ultrasound and homogeneous mixing for 1 hour, the inks were sprayed on a waterproof (0.4 mg $cm^{-2}$ carbon powder containing 40 wt % PTFE) carbon paper gas diffusion layer with a PGM loading of 0.3 mg $cm^{-2}$. Finally, the anode catalyst layer, AEM, and cathode catalyst layer were sandwiched together and pressed at 400 N $cm^{-2}$ for 3 min at 80° C. The obtained MEA was sandwiched between two bi-polar stainless steels and plate-embedded graphite plates with 2 mm parallel channel flow fields. The anode was fed with 1 M KOH+2 M ethanol solution at a flow rate of 20 mL $min^{-1}$; while the cathode was fed with high purity $O_2$ (99.99%) at 200 mL $min^{-1}$ without backpressure. The polarization curves were obtained using a Fuel Cell Test System. The I-V curves and stability tests of direct ethanol fuel cells were measured and collected at 60° C. (heated and controlled by a thermocouple) after establishing a steady state. The control MEAs assembled with other catalysts, commercial Pd/C and Pt/C as both anode and cathode catalysts with a noble metal loading of 0.3 mg $cm^{-2}$ were also prepared and studied.

The ethanol electrooxidation reaction (EOR) performance of HEA/C and the control samples are shown in FIG. 7A. The peak mass activity ($J_{mass}$) of HEA/C is 24.3 A $mg^{-1}{}_{PGMs}$, ca. 17.4 and 31.6 times higher than those of the Pt/C (1.4 A $mg^{-1}{}_{Pt}$) and Pd/C (0.77 A $mg^{-1}{}_{Pd}$). The HEA/C also shows robust stability, even after 50,000 cycles accelerated stability test (AST), no obvious performance decay can be found as shown in FIG. 7B. While serious performance decay was found on both Pt/C and Pd/C, only 52.1% and 34.1% current density was reserved after 1,000 cycles AST.

The production $CO_2$ from EOR was detected by Transmission IR spectra. Since the $CO_2$ can be further reacted with KOH and the $CO_3^{2-}$ as the final products. Thus, the $CO_3^{2-}$ at 1393 $cm^{-1}$ was sued to characteristic peak, and the KOH with different concentrations (0.01M, 0.05M, 0.1 M, 0.5 M, and 1M) were prepared to obtain the standard curves as shown in FIGS. 8A-8B. Then, the $CO_2$ from EOR on different samples at different potentials are detected by IR spectrum, as shown in FIGS. 8C-8E. The Faradic efficiency of EOR to $CO_2$ can be calculated, as shown in FIG. 8F, at a wide potential range, the HEA show a very high $CO_2$ FE (e.g., at least 85%), indicating that a direct C—C 12e pathway on HEA/C electrode. While at most 20% $CO_2$ FE was found on Pt/C and Pd/C electrode, indicating the incomplete oxidation on these two samples.

As shown in FIG. 9A, the incomplete EOR via a 4e pathway product, acetate, was detected by $H^1$ NMR. For the HEA/C sample at all studied potentials, no acetate signals at ~1.9 ppm can be found, indicating that no acetate was generated on HEA/C during EOR. While obviously acetate signals can be found on Pt/C and Pd/C electrodes, as shown in FIGS. 9B-9C, indicating the EOR on Pt/C and Pd/C electrode is mainly through a 4e pathway with acetate as the main products. These results combine with the above IR spectrums further indicating that a direct 12e pathway on HEA/C with $CO_2$ as the final products; in contrast, an indirect 4e pathway on Pt/C and Pd/C with acetate as the final products.

FIGS. 10A-10B show Nyquist plots and enlarged plots of different samples in 1M KOH containing 1M EtOH solutions. From FIG. 10*a-b*, the HEA/C has much smaller arc than other two control samples, indicating the much smaller charge transfer resistance ($R_{ct}$), as shown in FIG. 10C. While the system resistance ($R_s$) of different catalysts shows similar value. The oxygen reduction reaction (ORR) performance was further evaluated. The half-wave potential ($E_{1/2}$) of HEA/C is negative shift ca. 100 mV compared to Pt/C for ORR reaction, as shown in FIG. 11A. The onset potential and half-wave potential of HEA/C for ORR is 1.07 V and 0.95 V vs. RHE, respectively, as shown in FIG. 11B. These values are much higher than Pt/C and Pd/C samples, as shown in FIGS. 12A-12B, indicating the excellent activity of HEA for ORR. In addition, the number of electron transfer is roughly 4 with a super low yield of $H_2O_2$ on HEA/C, indicating a 4e pathway; while the number of electron transfer is 3.9 and 3.8 for Pt/C and Pd/C with a much higher yield of $H_2O_2$ than HEA/C.

As shown in FIG. 11D, from the Tafel slope analysis, the mass activity and specific activity for HEA/C is 17.7 A $mg^{-1}_{PGMs}$ and 15.5 A $cm^{-2}$ at 0.9 $V_{iR\text{-}free}$ vs. RHE, which is ca 71- and 54-times higher than Pt/C (MA=0.25 A $mg^{-1}_{Pt}$, SA=0.27 mA $cm^{-2}$), 354- and 141-times higher than Pd/C (MA=0.05 A $mg^{-1}_{Pt}$, SA=0.11 mA $cm^{-2}$), respectively, as shown in FIG. 11E. Besides the super activity, the stability is also important for an ORR catalyst in real application. Even after 100 k continuous cycling between 0.6 V and 1.1 V, the ORR-LSV of HEA/C shows no obvious change, as shown in FIG. 11F, and the $E_{1/2}$ shows only 5 mV negative shift after 100 k CVs cycles compared with the initial curves, as shown in FIG. 11F, indicating the super stability. While after 30 k AST test, the Pt/C and Pd/C shows a $E_{1/2}$ of 55 mV and 68 mV respectively.

The proof-to-concept application is then performed to display its feasibility in direct ethanol fuel cells (DEFCs) as both anode and cathode catalysts. The membrane electrode assembly (MEA, see experimental for details) fabricated by HEA/C shows an open-circuit voltage (OCV) of 1.07 V, as shown in FIGS. 13A-13B, which is very close to the theoretical value in the alkaline DEFCs (1.14 V) and much higher than Pt/C (0.92 V) and Pd/C (0.87 V). The much higher OCV indicates much lower required polarization overpotential and much lower active energy barrier for DEFCs. More importantly, the maximum peak power density (MPD), as shown in FIG. 13B, of HEA/C was 0.72 W $cm^{-2}$ at 1.3 A $cm^{-2}$, ca. 11.3 and 18.9-times higher than Pt/C (0.06 W $cm^{-2}$) and Pd/C (0.038 W $cm^{-2}$), respectively. The power density of HEA/C is more than ten-times higher than other state-of-the-art DEFCs and almost the same level to the performance of $H_2$—$O_2$ fuel cells, as shown in FIG. 13D. The HEA/C MEA can operate stably at a constant working voltage of 0.6 V for over 1200 hours with a negligible performance decay of at most 4% of the output power densities, no matter using $O_2$ or air as cathode feeding, as shown in FIG. 13C. Thus, the HEA/C shows great promise for practical application to replace $H_2$—$O_2$ fuel cell, which can provide similar power density with long-term operation and solve the storage and transportation problems of $H_2$.

Example 3

Characterizations of PtPdFeCoNiSnMn High Entropy Alloy (Hereinafter "PtPd HEA")

Figure 14A:
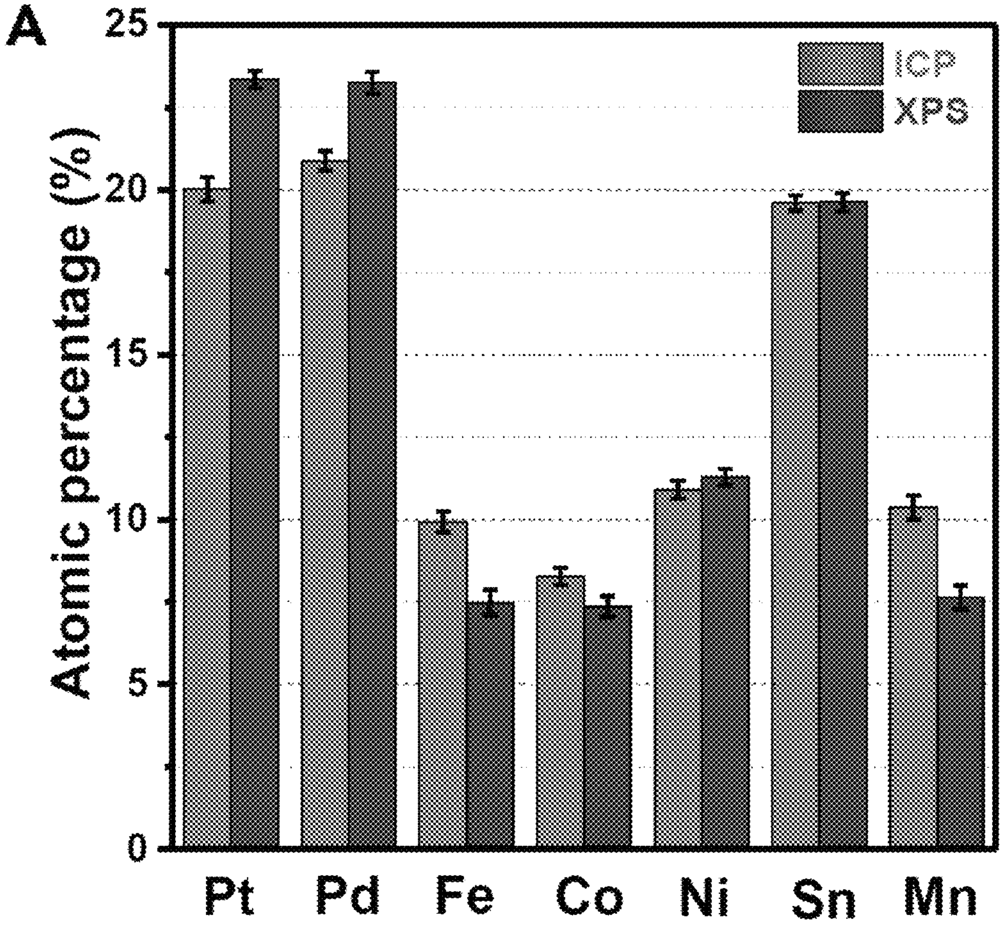
FIG. 14A is a graph illustrating an atomic percentage of elements of an exemplary embodiment of a PtPd HEA obtained from ICP and/or XPS, according to an embodiment of the present disclosure. The error bars represent the standard deviation (SD) of three independent tests, and data are presented as mean values G SD

X-ray diffraction (XRD) of PtPd HEA shows a single phase face-centered cubic (fcc) structure with a space group of cubic, Fm-3m (225). The characteristic peaks located between the Pt (JCPDS no. 04-0802) and Pd (JCPDS no. 46-1043) indicate the lattice distortion in the alloy phase compared with the pure metals. The composition of PtPd HEA was further characterized by X-ray photoelectron spectroscopy (XPS) and inductively coupled plasma-mass spectrometry (ICP-MS). As shown in FIG. 14A, the surface composition analyzed by XPS of Pt and Pd is a little higher than the bulk ones analyzed by ICP of PtPd HEA, indicating the PtPd-rich surface achieved by the thermal annealing treatment. The compositions of other non-PGM elements analyzed by XPS and ICP are quite similar, proving the homogeneous elemental distributions of each element across the entire (from surface to the interior) PtPd HEA. The ICP and XPS results show that all the elements are in the range of 7-25 at % with a higher content of Pt, Pd, and Sn than Fe, Co, Ni, and Mn, as shown in FIG. 14A.

Figure 14B:
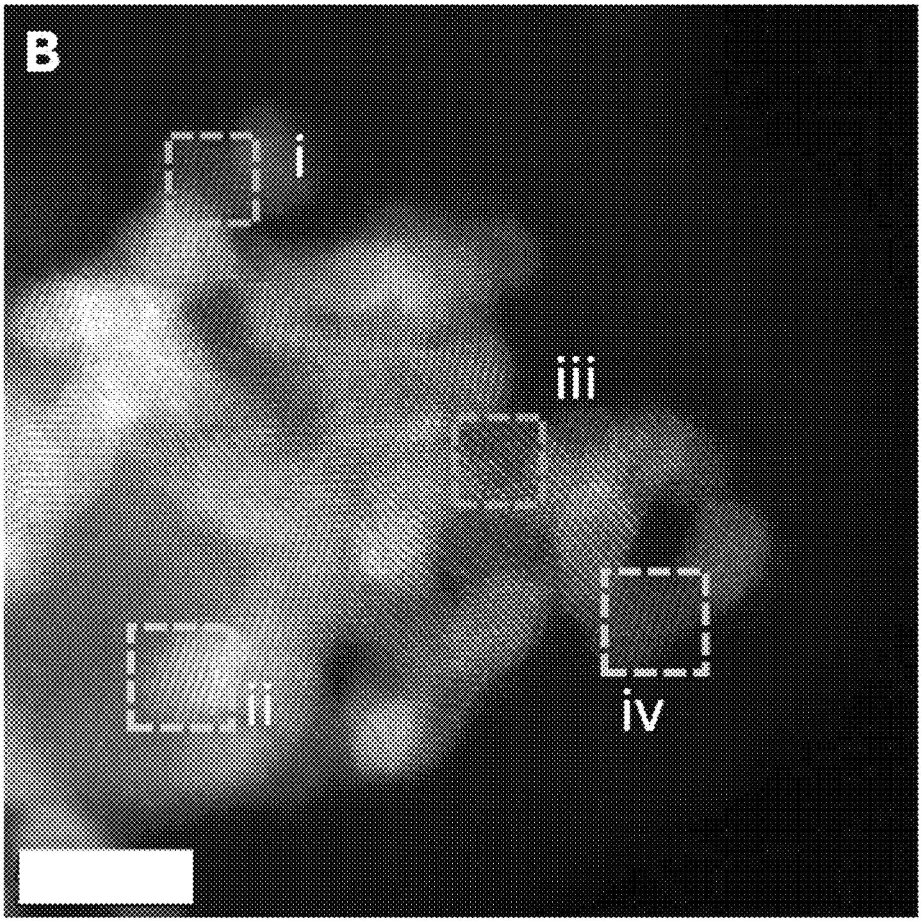
FIG. 14B is an image illustrating a STEM of an exemplary embodiment of a PtPd HEA, according to an embodiment of the present disclosure. The scale bars represent 5 nm, 5 nm_1, 10 nm, and 2 nm, respectively.
Figure 14C:
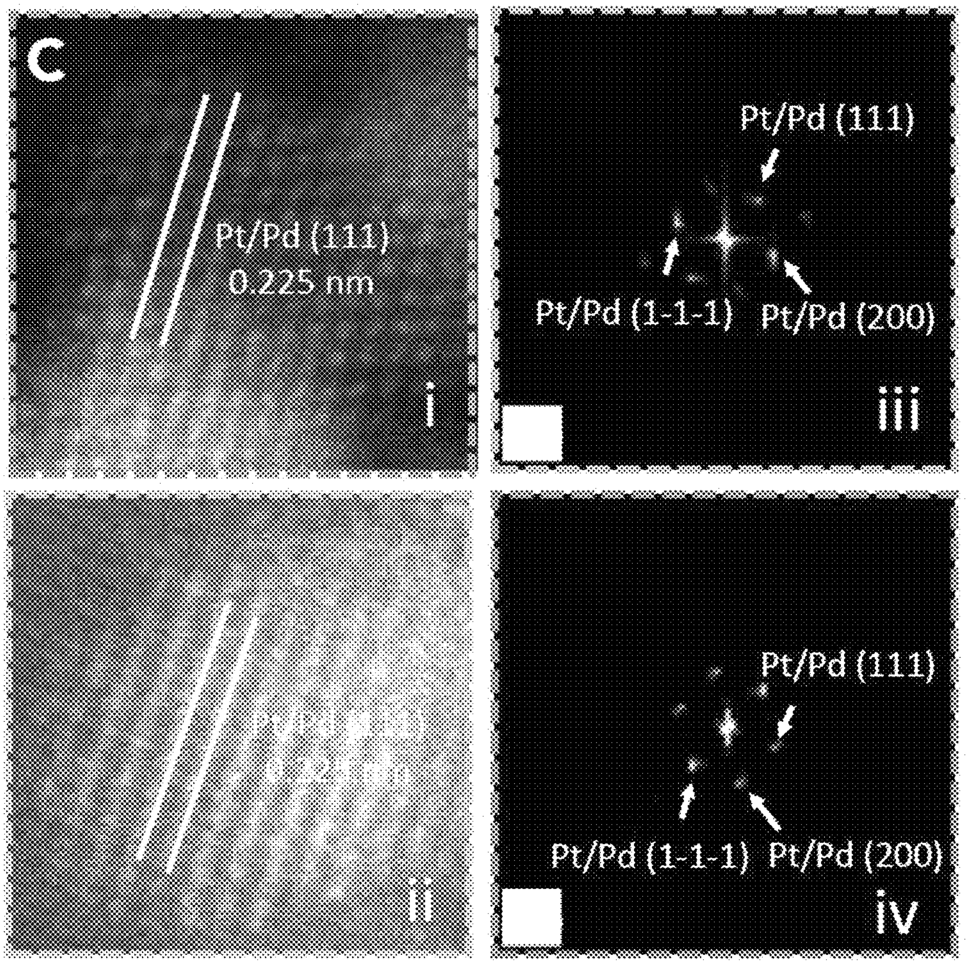
FIG. 14C is a set of images illustrating a HR-STEM and FFT of the exemplary embodiment of the PtPd HEA of FIG. 14B, according to an embodiment of the present disclosure. The scale bars represent 5 nm, 5 nm_1, 10 nm, and 2 nm, respectively.
Figure 14D:
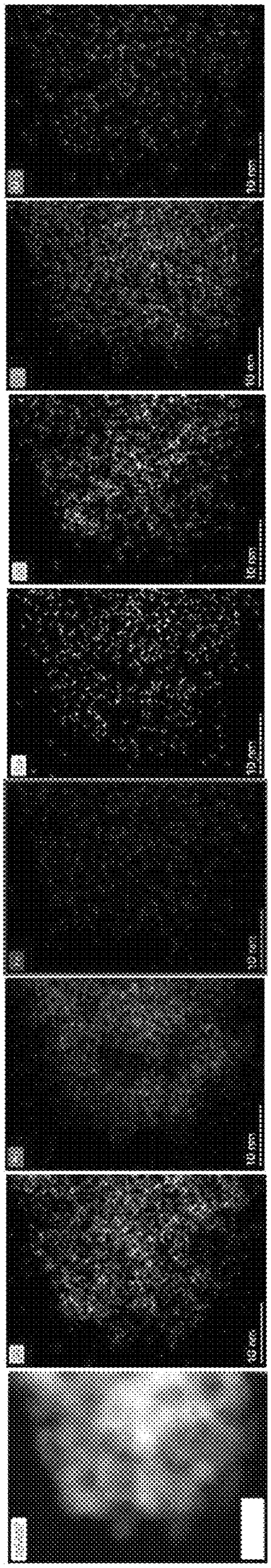
FIG. 14D is a set of images illustrating element mappings of the exemplary embodiment of the PtPd HEA of FIG. 14B, according to an embodiment of the present disclosure. The scale bars represent 5 nm, 5 nm_1, 10 nm, and 2 nm, respectively.
Figure 14E:
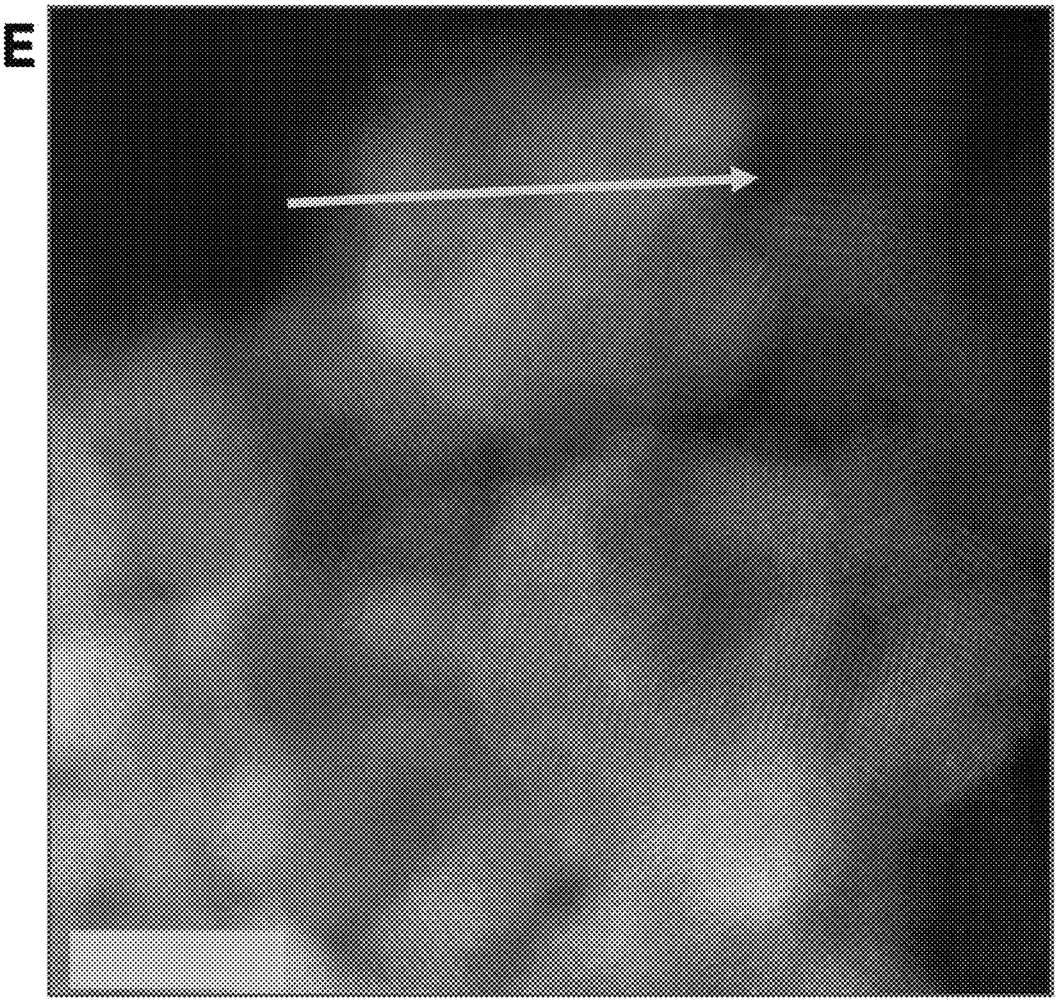
FIG. 14E is an image illustrating a HAADF of an atomic fraction of individual elements within an exemplary embodiment of a PtPd HEA, according to an embodiment of the present disclosure. The white arrow represents the scan direction when performing the line profiles the atomic fraction of individual elements. The scale bars represent 5 nm, 5 nm_1, 10 nm, and 2 nm, respectively.
Figure 14F:
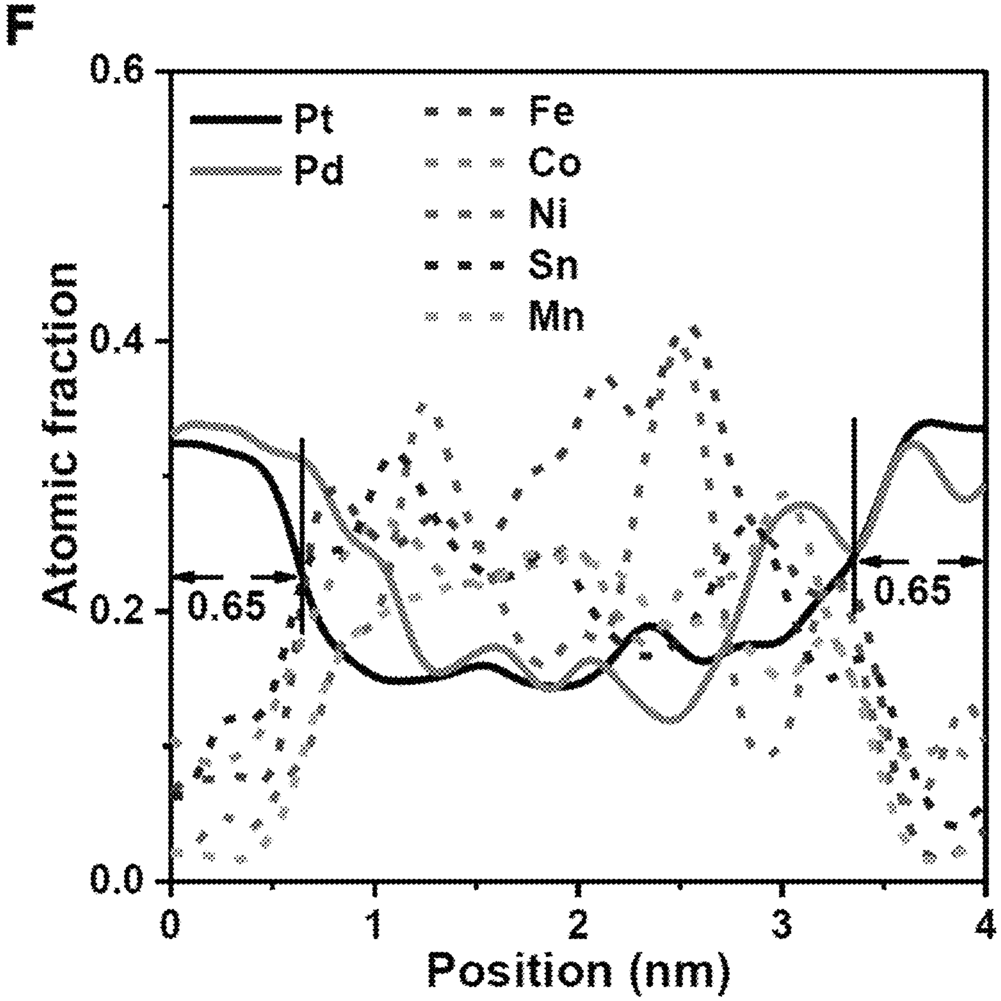
FIG. 14F is a plot illustrating a line profile corresponding to the atomic fraction of individual elements of FIG. 14E, according to an embodiment of the present disclosure.
Figure 14G:
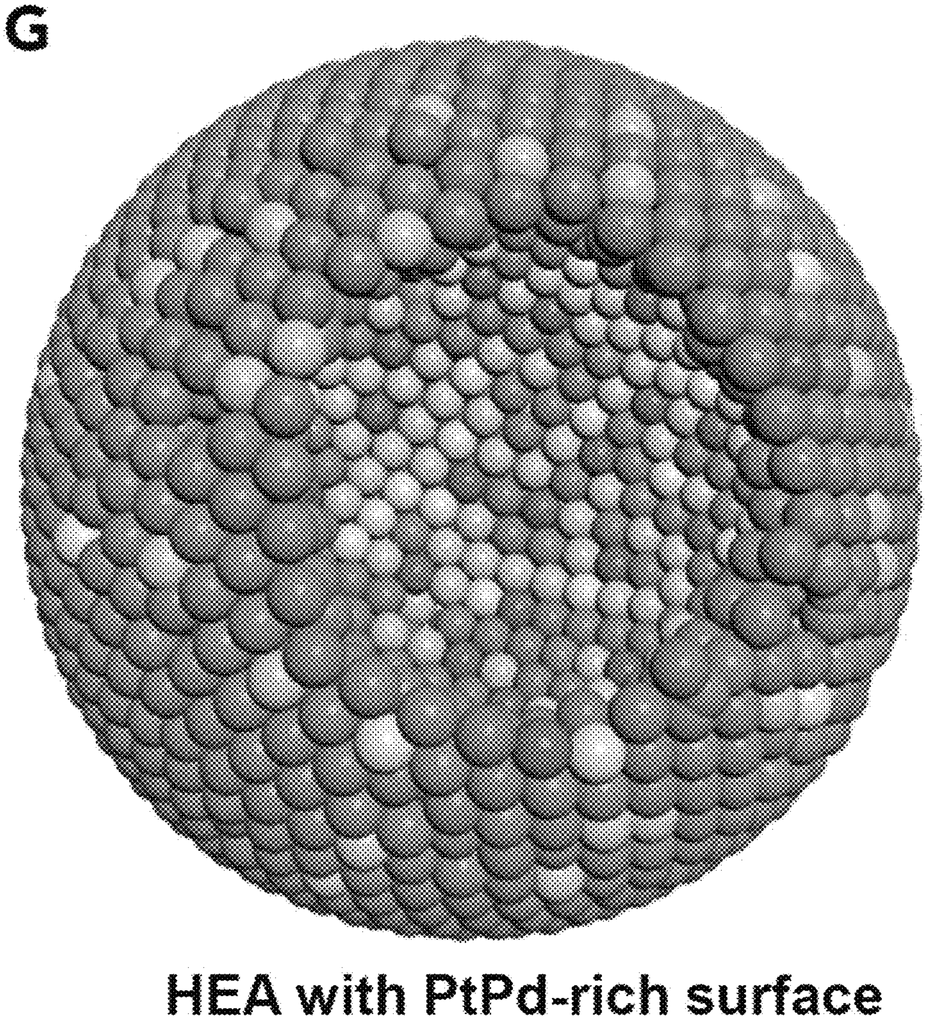
FIG. 14G is a diagrammatic image illustrating a schematic of an exemplary embodiment of a PtPd HEA with a PtPd-rich surface, according to an embodiment of the present disclosure.

Scanning transmission electron microscope (STEM) images show that the PtPd HEA has a close-connected nanostructure with even distribution of all the primary elements. The well-defined crystalline characteristics of PtPd HEA were found from the high-resolution high-angle annular dark-field (HAADF)-STEM images, as shown in FIG. 14B. The enlarged aberration-corrected STEM images show a clear (111) lattice with a measured spacing of 2.25 A° (FIGS. 1Ci and 1Cii), which is right in between the (111) facet spacings of Pt (2.265 A°) and Pd (2.246 A°). While the Fast Fourier Transform (FFT) images, FIG. 14C depicts that the PtPd HEA displays a well-defined spotted pattern corresponding to the diffraction along the (111) and (200) planes of the fcc Pt/Pd structure-which is consistent with the XRD results and further indicating the formation of PtPd-based HEA. FIG. 14D depicts that each element has a random but uniform distribution throughout the entire area according to the STEM-energy dispersive X-ray spectroscopy (EDS) mappings. FIG. 14E shows the HAADF while FIG. 14F shows the corresponding line profiles that represent the distribution of individual elements in a small particle, which indicates that the atomic fraction of all elements in each projected atomic column randomly fluctuates with small variations. Pt and Pd have a much higher surface concentration than other non-PGM elements, and thus the PtPd-rich surface (about 0.65 nm), as shown in FIG. 14F, was formed. All the above physical characterization results along with the electrochemical test demonstrate the successful synthesis of PtPd HEA with a PtPd-rich surface as illustrated in FIG. 14G, and this structure will maximize the atomic utilization efficiency of PGMs for the electrocatalysis reactions.

Figure 14H:
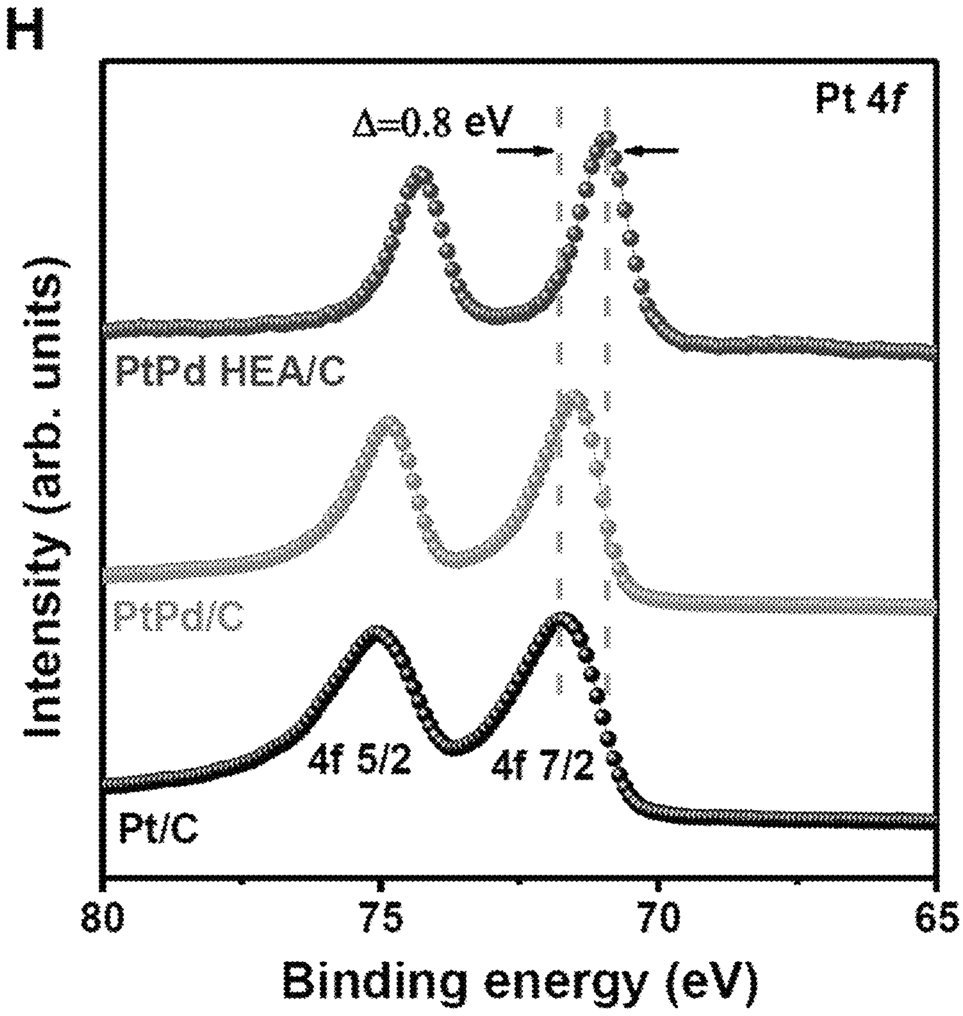
FIG. 14H is a plot illustrating XPS Pt 4f profiles, according to an embodiment of the present disclosure.
Figure 14I:
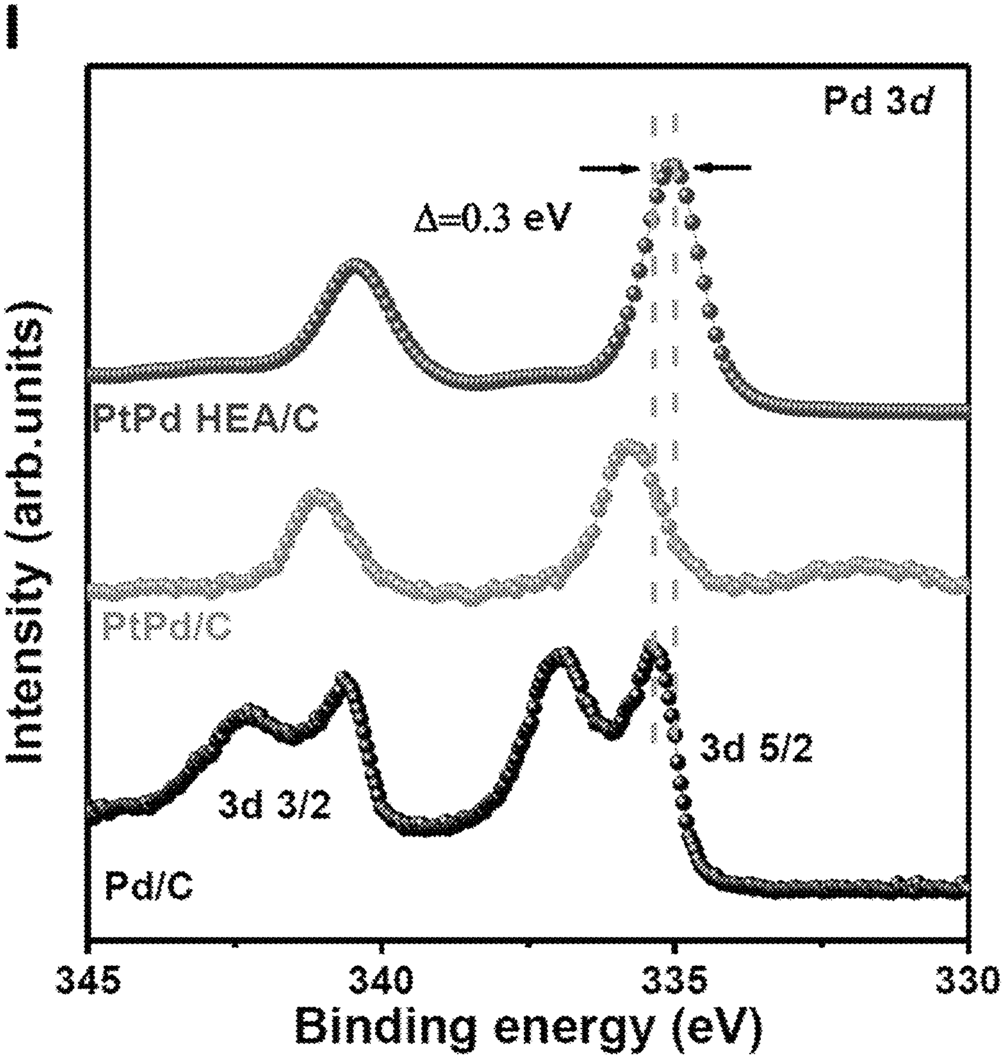
FIG. 14I is a plot illustrating XPS Pd 3d profile, according to an embodiment of the present disclosure.

To probe the potential electronic interaction of all the elements in the PtPd HEA, the high-resolution XPS was further compared. For the commercial Pt/C sample, the Pt 4f7/2 and 4f5/2 peaks are located at 71.7 and 75.0 eV, respectively, as shown in FIG. 14H, while for PtPd/C, a pair of Pt 4f7/2 and 4f5/2 peaks centered at 71.5 and 74.8 eV was found due to a potential electron transfer from Pt to Pd.42 Correspondingly, the Pd 3d5/2 and 3d3/2 peaks of PtPd/C show a positive shift of about 0.4 eV compared with Pd/C (FIG. 1I). In contrast, a negative shift of about 0.8 eV was found for Pt in the PtPd HEA (70.9 and 74.2 eV for Pt 4f7/2 and 4f5/2 peaks) compared with Pt/C. In addition, the Pd 3d5/2 and 3d3/2 peaks of PtPd HEA also show a negative shift of ca. 0.3 eV compared with Pd/C, as shown in FIG. 14I. Furthermore, the Pt and Pd in PtPd HEA are mainly assigned to a metallic phase, while all the other non-PGM elements have a positive shift associated with a slightly oxidized surface compared with their metallic phases, indicating the strong electronic interaction between PGMs and non-PGM elements in the PtPd HEA.

The positive shifts of all non-PGM elements enable an electrophilic (electron-deficient) state because they donate electrons to Pt and Pd, which makes the non-PGM elements more oxyphilic and much easier to adsorb O*/OH*. Additionally, the OH* coverage of PtPd HEA is much higher than in other control samples, thus oxidizing the CO molecules much more easily at a much lower potential, as shown in FIG. 15B. While the negative shifts of the binding energy of Pt and Pd narrow the d-band width and shift the d-band center upward in energy toward the Fermi level, which will promote the electrocatalytic reactions.

Example 4

Electrocatalytic EOR Performance and the Roles of Each Element in the PtPd HEA To identify the functional roles of each element in the electrocatalytic EOR, a series of control samples without one of the seven elements were prepared and compared. For instance, the control samples without Pd (hereinafter "Pt HEA"), without Pt (hereinafter "Pd HEA"), and without one of the transition metals (hereinafter "HEA w/o-M", where "M" is Fe, Co, Ni, Sn, or Mn) were synthesized. In addition, control samples without PtPd (HEA w/o-PtPd) and the PtPd alloy were also prepared. Commercial Pt/C and Pd/C were used as benchmark catalysts. All the synthesized samples were loaded onto the commercial Vulcan XC-72 active carbon (PtPd HEA/C) for electrochemical tests. The underpotentially deposited hydrogen (HUPD) peaks of PtPd HEA/C obtained from cyclic voltammogram (CV) curves are much stronger than those of PtPd/C, Pt/C, and Pd/C, indicating more active surfaces were exposed, as shown in FIG. 15A, and PGMs were more efficiently utilized.

In contrast, the HEA/C w/o-PtPd shows negligible HUPD due to the absence of PGMs. The electrochemically active surface area (ECSA) of PtPd HEA/C was evaluated by both HUPD (ECSAHUPD) and CO stripping (ECSACO) methods. The ECSACO of PtPd HEA/C (114.6 m2 $g^{-1}$) is 1.4 times than that of ECSAHUPD (81.8 m2 $g^{-1}$), as shown in FIG. 15A, suggesting the formation of the PtPd-skin-terminated (111) surface and agreeing well with the physical characterizations, as shown in FIGS. 14A-14I. Besides, the ratios between ECSA values determined by the integrated charge from ECSACO and ECSAHUPD for Pt HEA/C and Pd HEA/C were 1.36 and 1.34, respectively, as shown in FIG. 15A, indicating the formation of Pt/Pd-rich surface achieved in this work in the presence of transition metals. In contrast, the ratios for Pt/C, Pd/C, and PtPd/C are 1.03, 1.04, and 1.04, respectively.

Figure 15A:
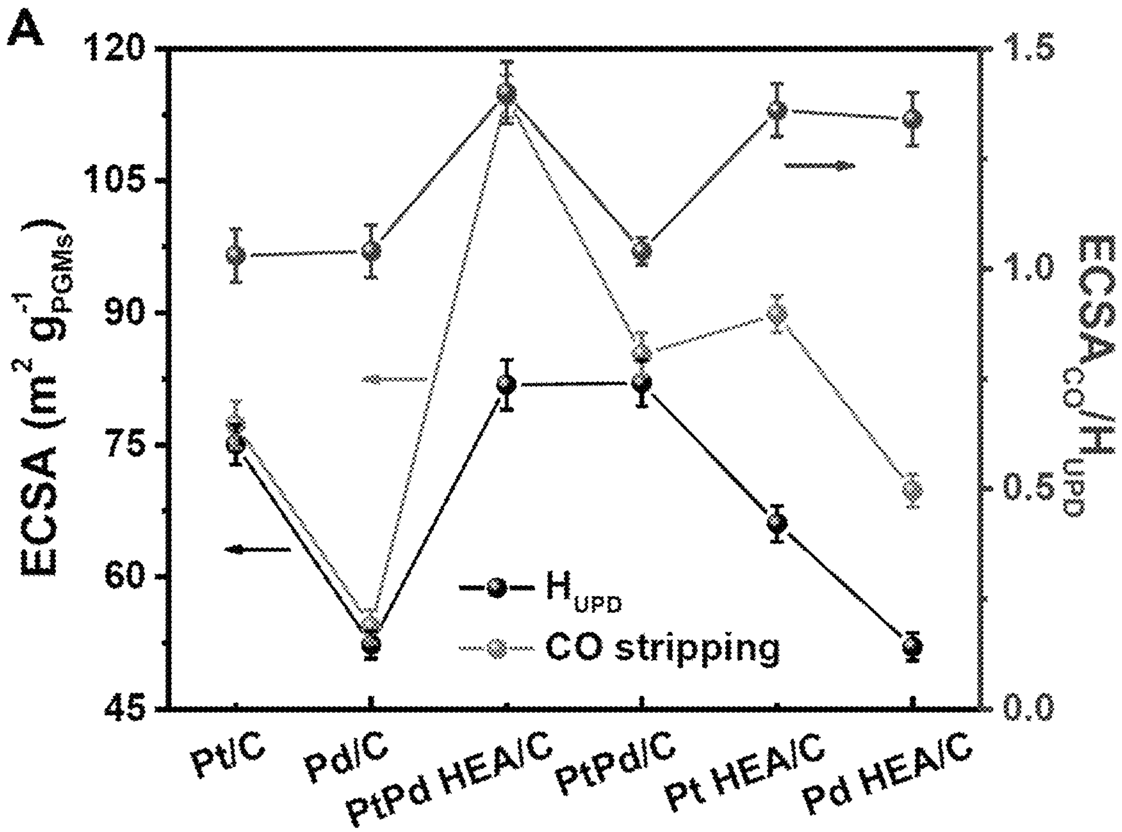
FIG. 15A is a plot illustrating an ECSA calculated from the $H_{UPD}$ and CO stripping methods and the ratio of $ECSA_{Co}/ECSA_{HUPD}$, according to an embodiment of the present disclosure.
Figure 15B:
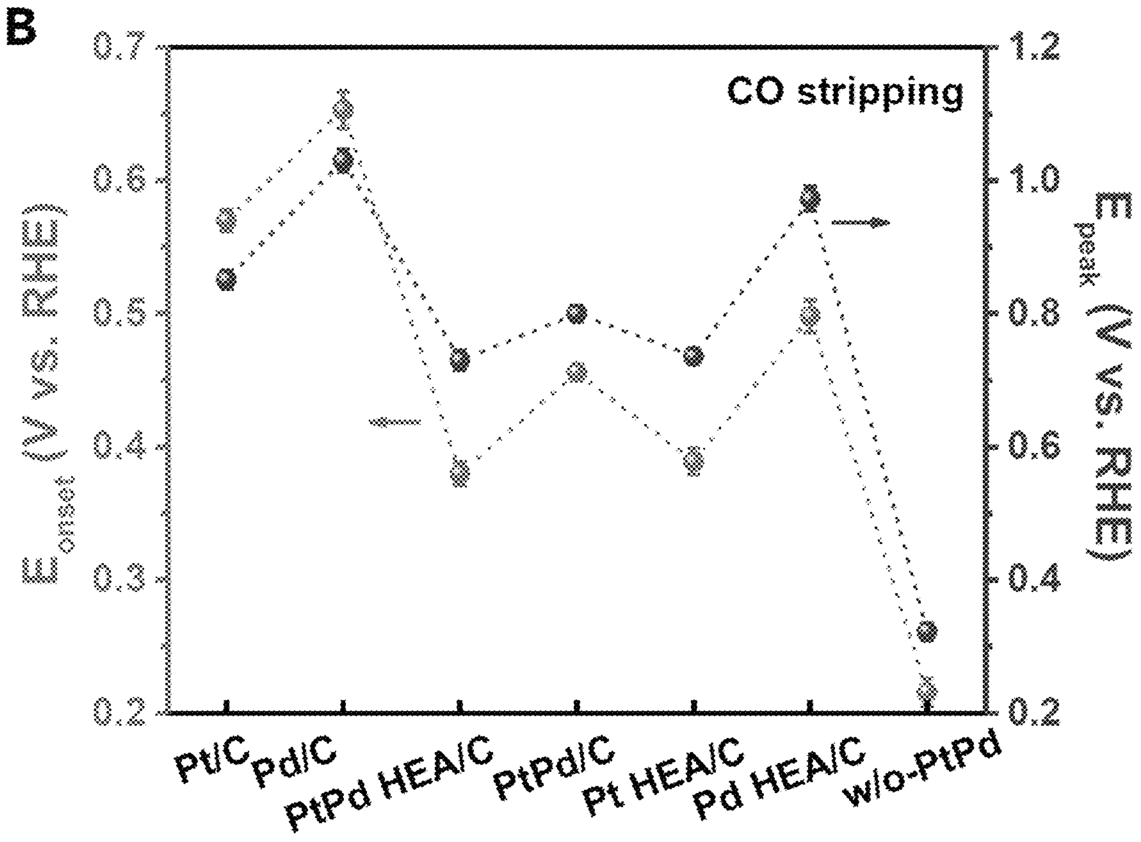
FIG. 15B is a plot illustrating onset and peak potentials for a CO stripping, according to an embodiment of the present disclosure.
Figure 16A:
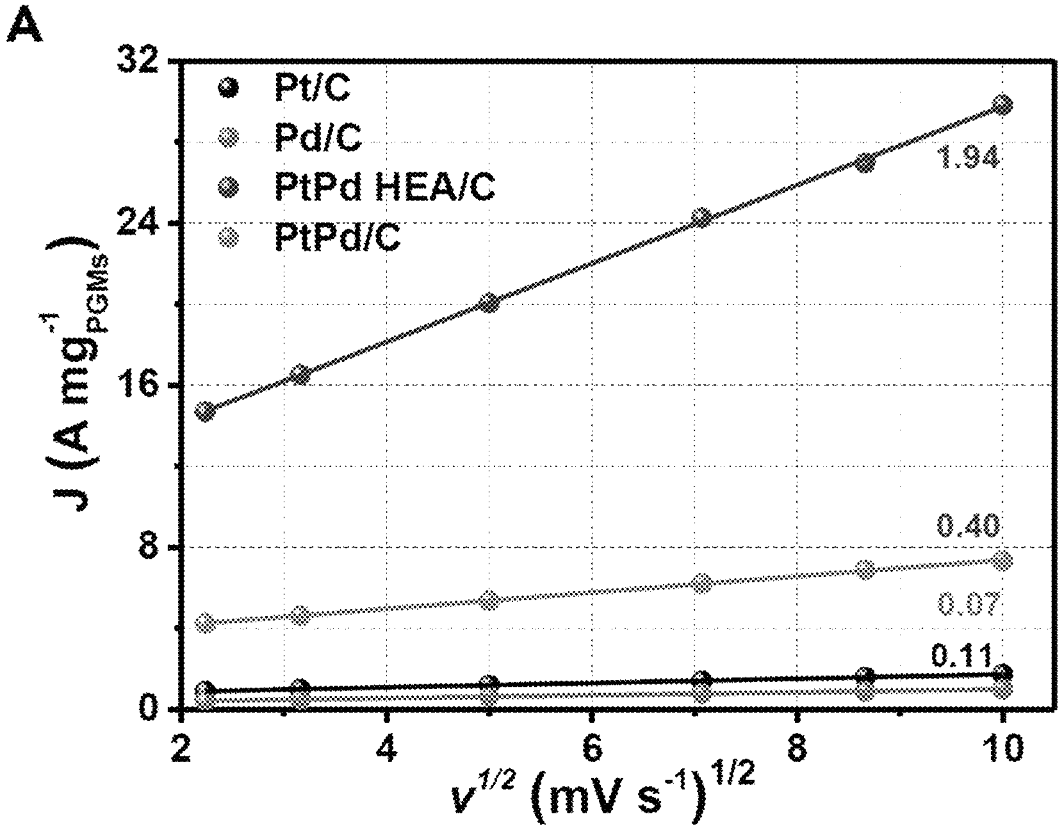
FIG. 16A is a plot illustrating J as a function of a square root of a scan rate ($v^{1/2}$) of samples, according to an embodiment of the present disclosure.
Figure 16B:
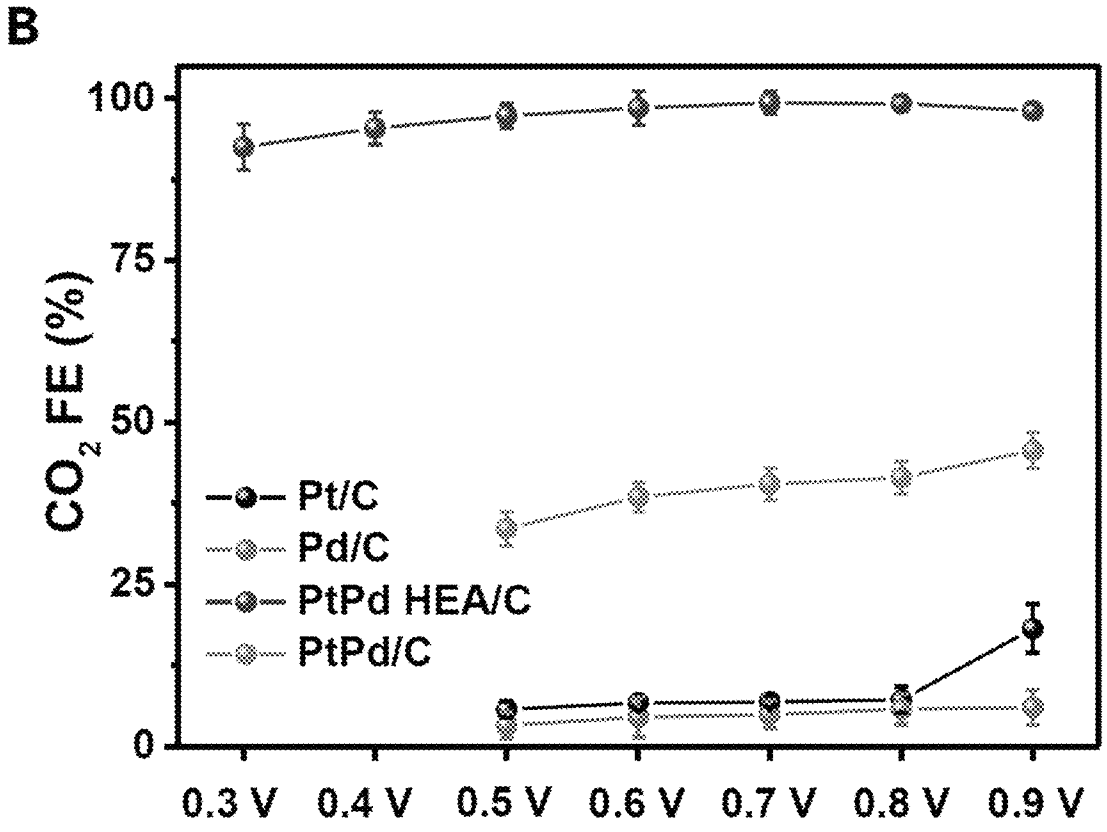
FIG. 16B is a plot illustrating Faradic efficiency (FE) of complete EOR at different potentials, according to an embodiment of the present disclosure. The error bars represent the SD of three independent tests, and the data is presented as mean values±SD.
Figure 16C:
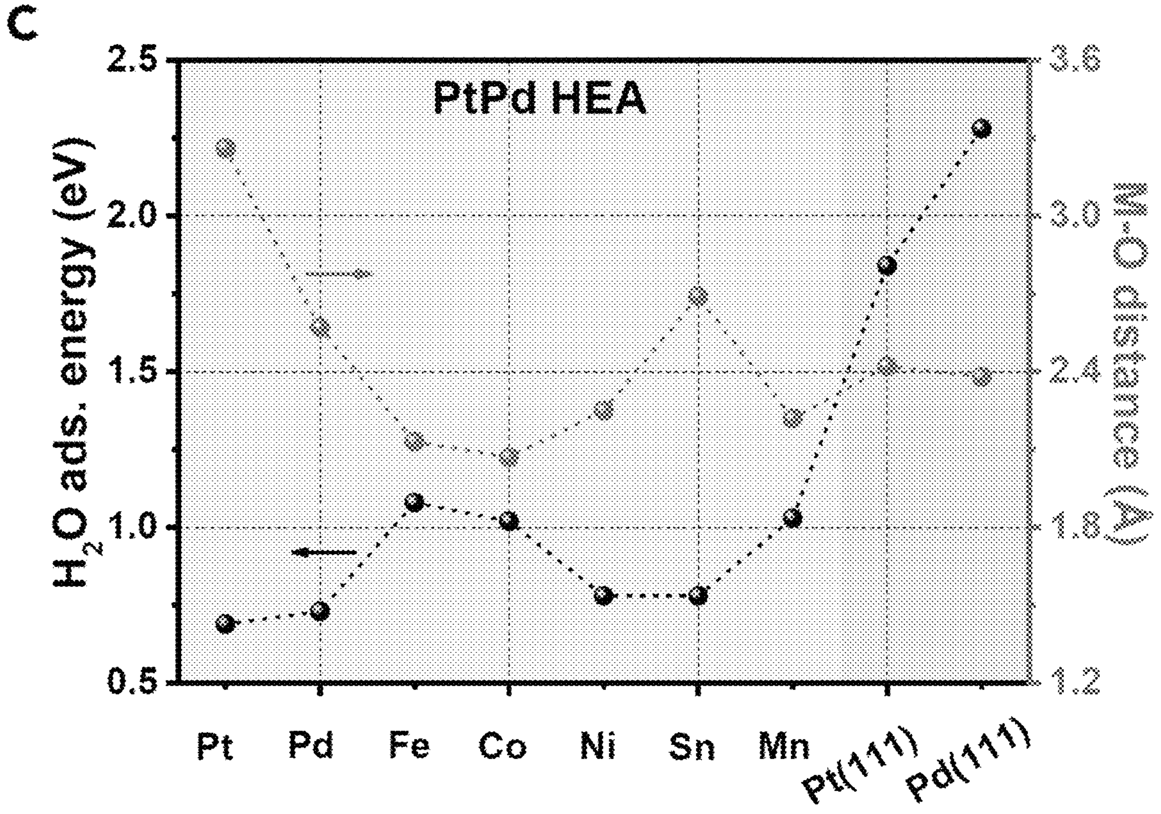
FIG. 16C is a plot illustrating water adsorption energies and a metal-oxygen (M-O) distance on all sites in an exemplary embodiment of PtPd HEA, Pt(111), and Pd(111), according to an embodiment of the present disclosure.
Figure 16D:
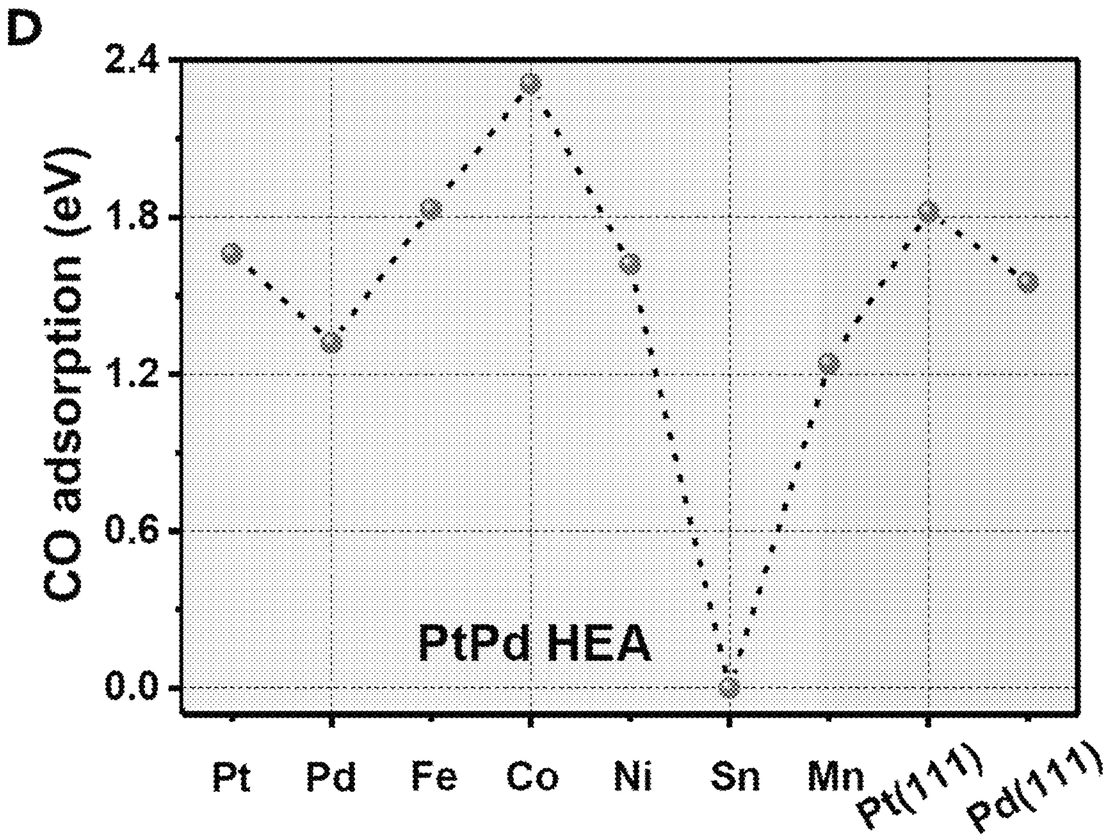
FIG. 16D is a plot illustrating CO adsorption energies on all sites in an exemplary embodiment of a PtPd HEA, PT(111), and Pd(111), according to an embodiment of the present disclosure.

Additionally, as shown in FIG. 15A, the PtPd-skin-terminated (111) surface of PtPd HEA/C has a much higher ECSA than the control samples and most of the reported materials, which is beneficial for maximizing the atomic utilization of PGMs for the electrocatalysis reactions. The onset potential (0.38 VRHE) and peak potential (0.73 VRHE) for CO electrooxidation on the PtPd HEA/C are much lower than other PGMs containing control samples, as shown in FIG. 15B, while the HEA/C w/o-PtPd samples show the most negative onset potential (0.22 VRHE) and peak potential (0.32 VRHE) for CO electrooxidation, indicating that the CO poisoning mainly occurs on the surface of PGMs. Alloying PGMs with transition metals in the PtPd HEA will significantly weaken the CO adsorption and binding strength, which matches well with the density functional theory (DFT) calculation results, as shown in FIG. 16D, thus enhancing the activity and stability for alcohol oxidation reactions due to the mitigation of the CO poisoning issue. The CO stripping experiments prove that the PtPd HEA with higher OH* coverage than other control samples can oxidize the CO much more easily at a much lower potential due to its oxyphilic characteristics.

Figure 15C:
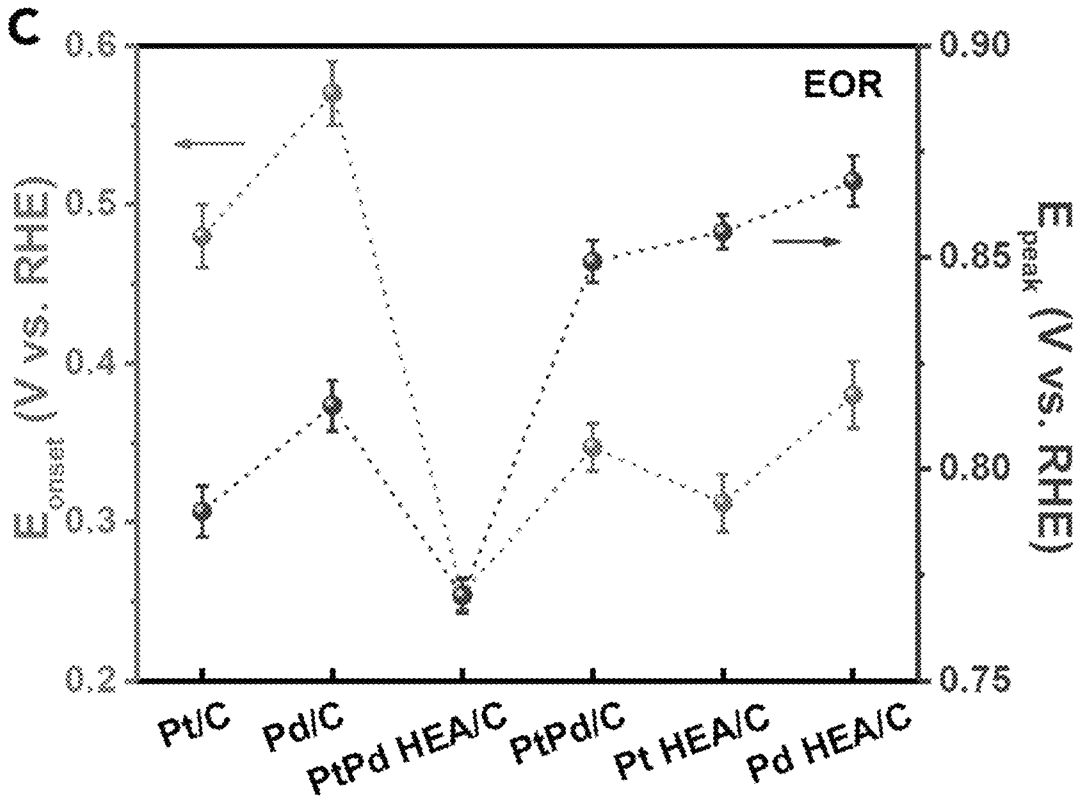
FIG. 15C is a plot illustrating an onset and peak potentials for the EOR, according to an embodiment of the present disclosure.

The electrocatalytic EOR performance was then evaluated by performing CV curves in nitrogen (N2)-saturated 1.0 M potassium hydroxide (KOH) solution+1.0 M ethanol. As shown in FIG. 15C, the onset potential of PtPd HEA/C for EOR is 0.255 VRHE, which is negatively shifted by 0.255, 0.323, and even 0.077 V compared with Pt/C, Pd/C, and PtPd/C, respectively. The onset potential of Pt HEA/C and Pd HEA/C for EOR is 0.312 and 0.38 VRHE, respectively, indicating that the Pt-based HEA is much easier to promote CO oxidation than Pd-based HEA. The peak potential of PtPd HEA/C for EOR is 0.77 VRHE, which is negatively shifted by ca. 0.01-0.098 V compared with the control samples, as shown in FIG. 15C. The obvious negatively shifted onset potential and peak potential indicate the much lower activation-energy barrier for EOR on PtPd HEA/C than other control samples. The decrease in the onset anodic potential indicates an earlier C—C bond cleavage. The much lower onset and peak potentials of PtPd HEA/C suggest a significantly promoted C—C bonds cleavage and thus a greatly improved EOR activity.

Figure 15D:
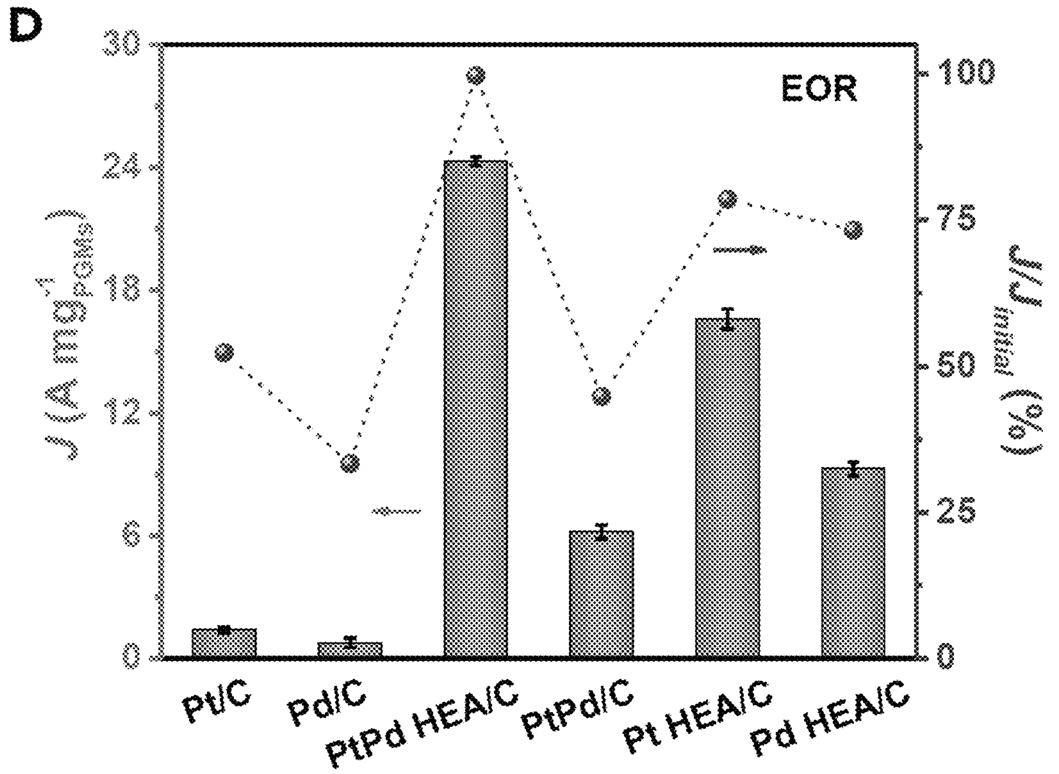
FIG. 15D is a plot illustrating EOR MA and the corresponding retention after 50,000 cycles of an exemplary embodiment of PtPd HEA/C, PtPd/C, Pt HEA/C, and PD HEA/C, according to an embodiment of the present disclosure. The Pt/C and Pd/C just undergo 1,000 cycles. $J_{initial}$ denotes the initial mass activity before a stability test
Figure 15E:
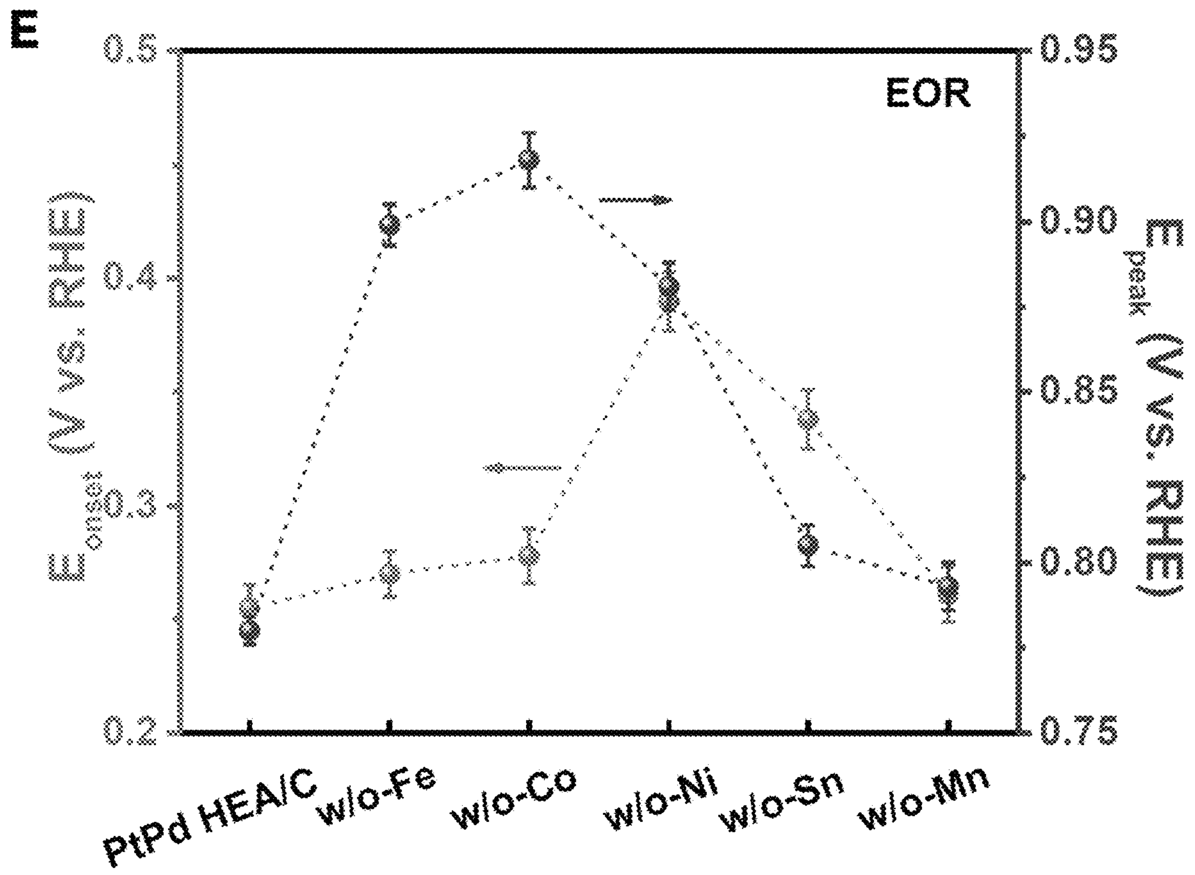
FIG. 15E is a plot illustrating onset and peak potentials for an EOR of control samples without at least one transition metal, according to an embodiment of the present disclosure.
Figure 15F:
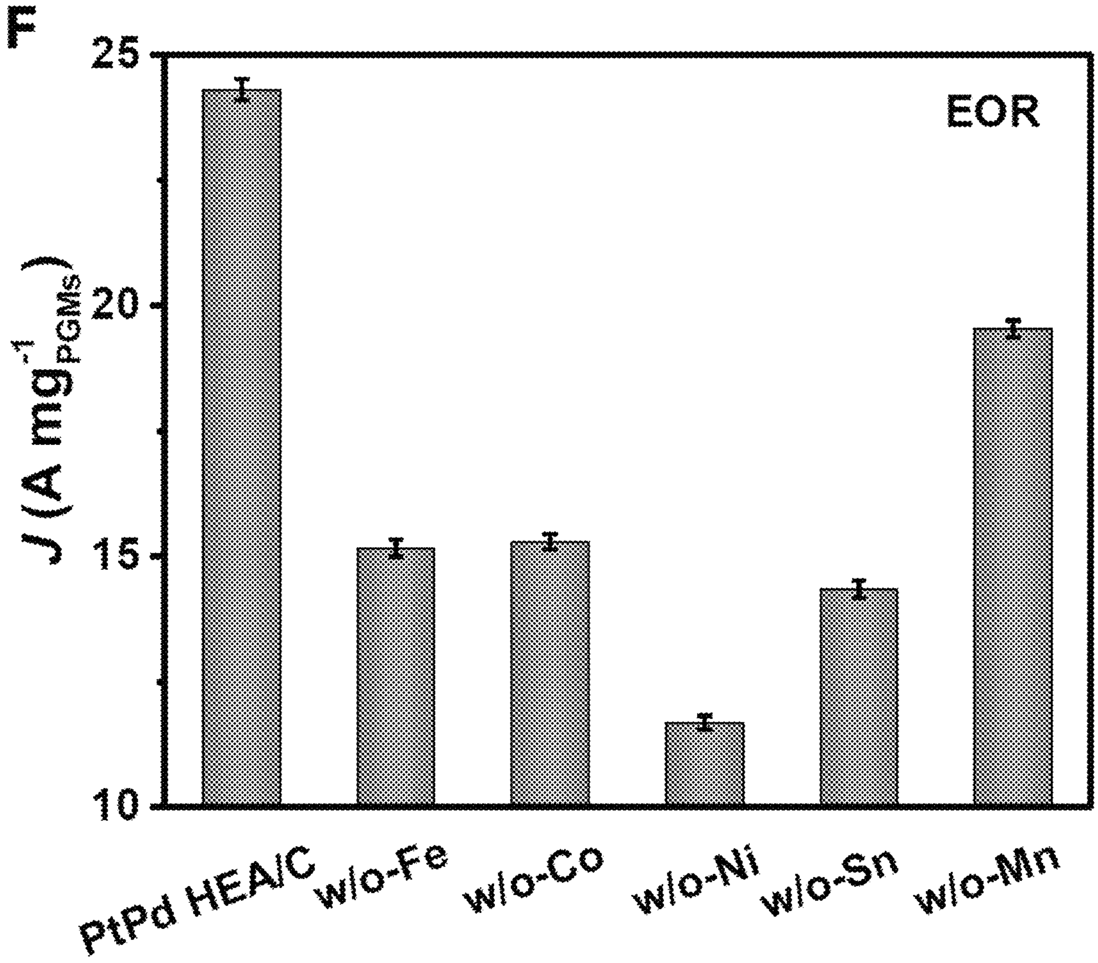
FIG. 15F is a graph illustrating EOR MA of control samples without at least one transition metal, according to an embodiment of the present disclosure.
Figure 15G:
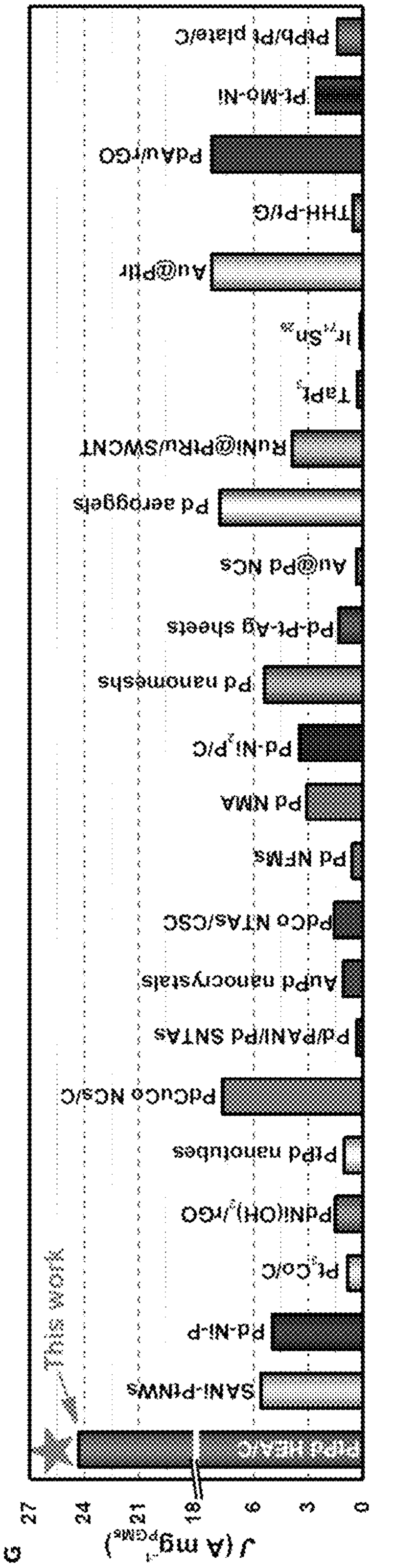
FIG. 15G is a graph illustrating comparisons of MA of an exemplary embodiment of PtPd HEA/C with benchmarking EOR catalysts, according to an embodiment of the present disclosure.

The intrinsic activity for the electrocatalytic EOR was assessed by two metrics: namely the mass activity (Jmass) (current normalized by the mass of PGMs, including both Pt and Pd) and specific activity (Jspecific) (current normalized by ECSA calculated from the CO stripping method). The PtPd HEA/C shows a peak mass current density Jmass of 24.3 A $mgPGMs^{-1}$, as shown in FIG. 15D, which is ca. 17.4, 31.6, and even 3.9 times higher than those of Pt/C (1.4 A mg $Pt^{-1}$), Pd/C (0.77 A mg $Pd^{-1}$), and PtPd/C (6.19 A mg PGMs$^{-1}$), respectively. The Jspecific of PtPd HEA/C (21.2 mA cm$^{-2}$) is ca. 14.9 to 2.9 times those of Pt/C (1.81 mA cm$^{-2}$), Pd/C (1.42 mA cm$^{-2}$), and PtPd/C (7.26 mA cm$^{-2}$), respectively. As shown in FIG. 15D, the Pt HEA/C (16.6 A mg PGMs$^{-1}$, 18.5 mA cm$^{-2}$) and Pd HEA/C (9.3 A mg PGMs$^{-1}$, 13.3 mA cm$^{-2}$) show a performance that is inferior to PtPd HEA/C, indicating the potential synergistic promotion effect between Pt and Pd. In contrast, no appreciable current can be found on the HEA w/o-PtPd sample, indicating that Pt and Pd are the catalytically active sites for EOR while the non-PGM elements act as performance promoters. The PtPd HEA/C shows the best EOR performance among the control samples at all potentials. In addition, Jmass of PtPd HEA/C at 0.45 and 0.6 VRHE is 6.65 and 15.22 A mg PGMs$^{-1}$, respectively, which is more than 9.2-83.1 times greater than the recently reported Au at PtIr/C (0.08 and 0.52 A mg PGMs$^{-1}$), PGM-HEA (about 0.2 and 1.65 A mg PGMs$^{-1}$), 48 and other state-of-the-art catalysts, as shown in FIG. 15G.

Figure 2D:
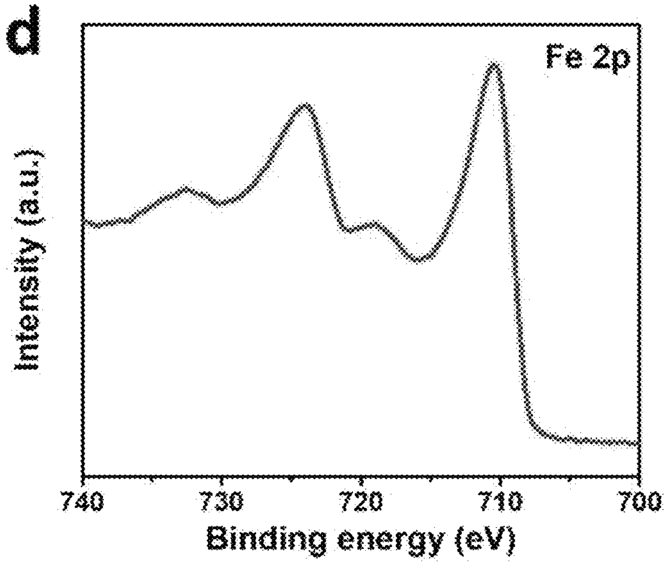
FIG. 2D is a plot illustrating a XSP of Fe 2p HEA, according to an embodiment of the present disclosure.
Figure 2E:
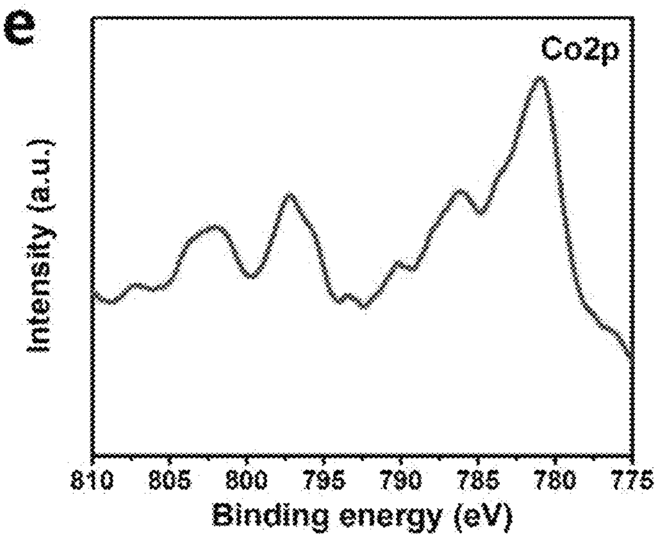
FIG. 2E is a plot illustrating a XSP of Co 2p HEA, according to an embodiment of the present disclosure.
Figure 2F:
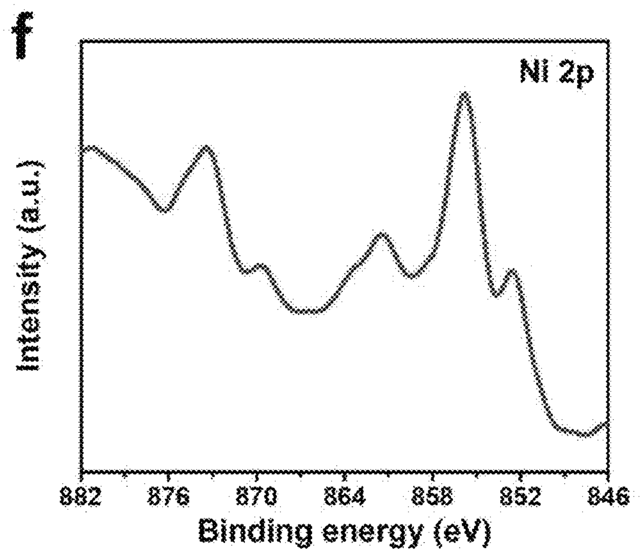
FIG. 2F is a plot illustrating a XSP of Ni 2p HEA, according to an embodiment of the present disclosure.
Figure 2G:
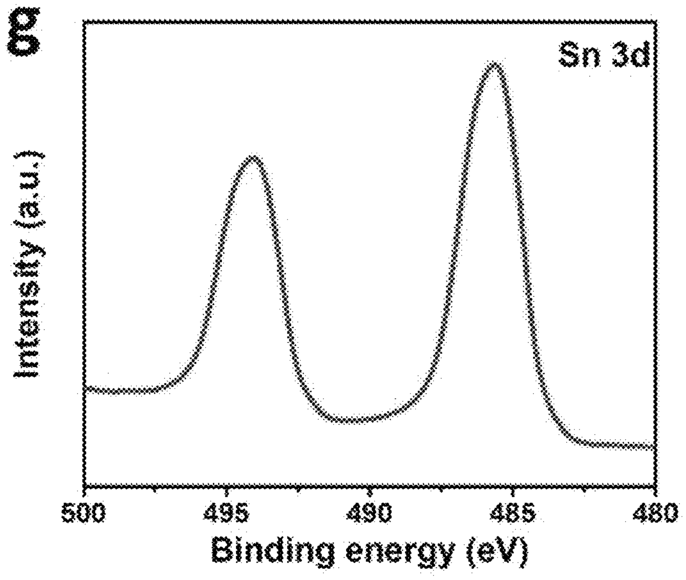
FIG. 2G is a plot illustrating a XSP of Sn 3d HEA, according to an embodiment of the present disclosure.
Figure 2H:
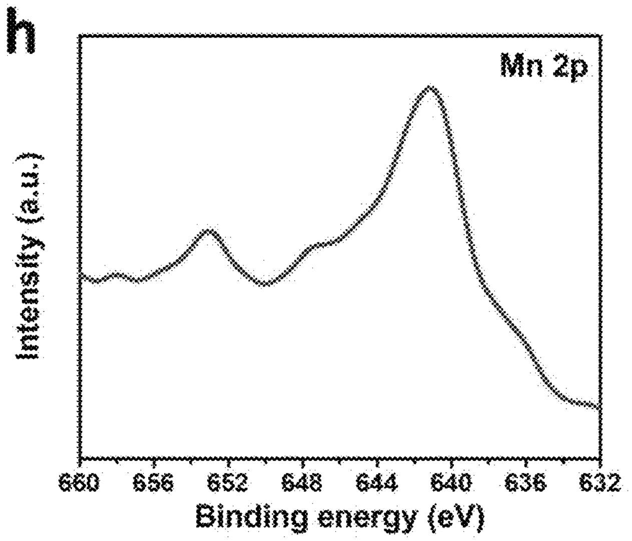
FIG. 2H is a plot illustrating a XSP of Mn 2p HEA, according to an embodiment of the present disclosure.

Besides the catalytic activity, stability is another crucial metric for EOR. As shown in FIG. 15D, the negligible EOR performance decay was found even after 30,000 and 50,000 cycles (current density retention of 99.9% and 99.7%, respectively), showing the extraordinary durability of PtPd HEA/C (FIGS. 2D and S14A). In contrast, the PtPd/C shows more than 55% performance decay after 50,000 cycles. As shown in FIG. 15D, for Pt/C and Pd/C, ca. 50% and 67% performance decay were found only after 1,000 cycles. The superior activity and stability of PtPd HEA/C to other control samples are attributed to the formation of PtPd-skin-terminated (111) surface and anti-CO poisoning ability, as shown in FIG. 15B, while the PtPd HEA/C had a much higher corrosion resistance than the other samples due to the increased configurational entropy, further making it a robust catalyst.

To understand the functional roles of each element in determining the EOR property of PtPd HEA/C, a series of control samples without one of the seven non-PGM elements were prepared and compared (i.e., HEA w/o-M, where M is Fe, Co, Ni, Sn, or Mn). As shown in FIG. 15E and FIG. 15F, the EOR onset potential (Eonset) of HEA w/o-Fe and without Co has a slight increase but the EOR peak potential (Epeak) has a sharp increase compared with PtPd HEA/C, indicating that the addition of Fe and Co cannot reduce the activation barrier of EOR but weakens the adsorption of CO. For the sample of HEA w/o-Ni, both the Eonset and Epeak have an obvious increase compared with PtPd HEA/C, indicating that the Ni element is not only beneficial for reducing the activation barrier of EOR but also plays an important role in anti-CO poisoning. For the sample of HEA w/o-Sn, the Eonset has an obvious increase but with a slight increase of Epeak, indicating that the Sn is good for reducing the activation barrier of EOR. While for the HEA w/o-Mn, only slightly increased Eonset and Epeak were found for EOR compared with PtPd HEA/C, indicating that the Mn contributes the smallest role in boosting EOR among the non-PGM elements but has the biggest contribution to the improved ORR, which will be discussed in a later section. As shown in FIG. 15F, all of the HEA w/o-M samples show a moderate EOR activity compared with PtPd HEA/C. The greatly improved EOR performance of PtPd HEA/C should be attributed to the synergistic interactions between each element.

Example 5

Theoretical Understanding of the Underlying EOR Mechanism of PtPd HEA

To study the reaction kinetics of the samples, the scan-rate-dependent EOR activities were tested, As shown in FIGS. 16A-16F. The kinetic reaction rate of PtPd HEA/C is calculated to be 1.94, according to the slope of Jmass versus v1/2, which is 17.6, 27.7, and lower potential than Pt to provide OH* groups, which will oxidize the CO ads to the final CO2.13 Herein, Fe, Co, and Mn may act similarly to Ru, becoming a source of OH* to help in the oxidation of CO molecules. This will keep Pt/Pd active sites available for EOR by remaining free from both H2O and CO molecules. To prove this point, the CO adsorption was further calculated on all elements of PtPd HEA/C, as well as on Pt(111) and Pd(111) surfaces. The detailed calculated values of adsorption energies on different sites are compared and presented in FIG. 3D. The CO adsorption on the Pt site (1.66 eV) and Pd site (1.32 eV) of HEA is weaker as compared with Pt(111) (1.82 eV) and Pd(111) (1.55 eV). Thus, it may be concluded that CO adsorption becomes weaker at Pt/Pd sites of PtPd HEA with the help of non-PGMs compared with pure metals. The better CO anti-poisoning ability is an important factor for the high activity and stability achieved in PtPd HEA for EOR.

Figure 16E:
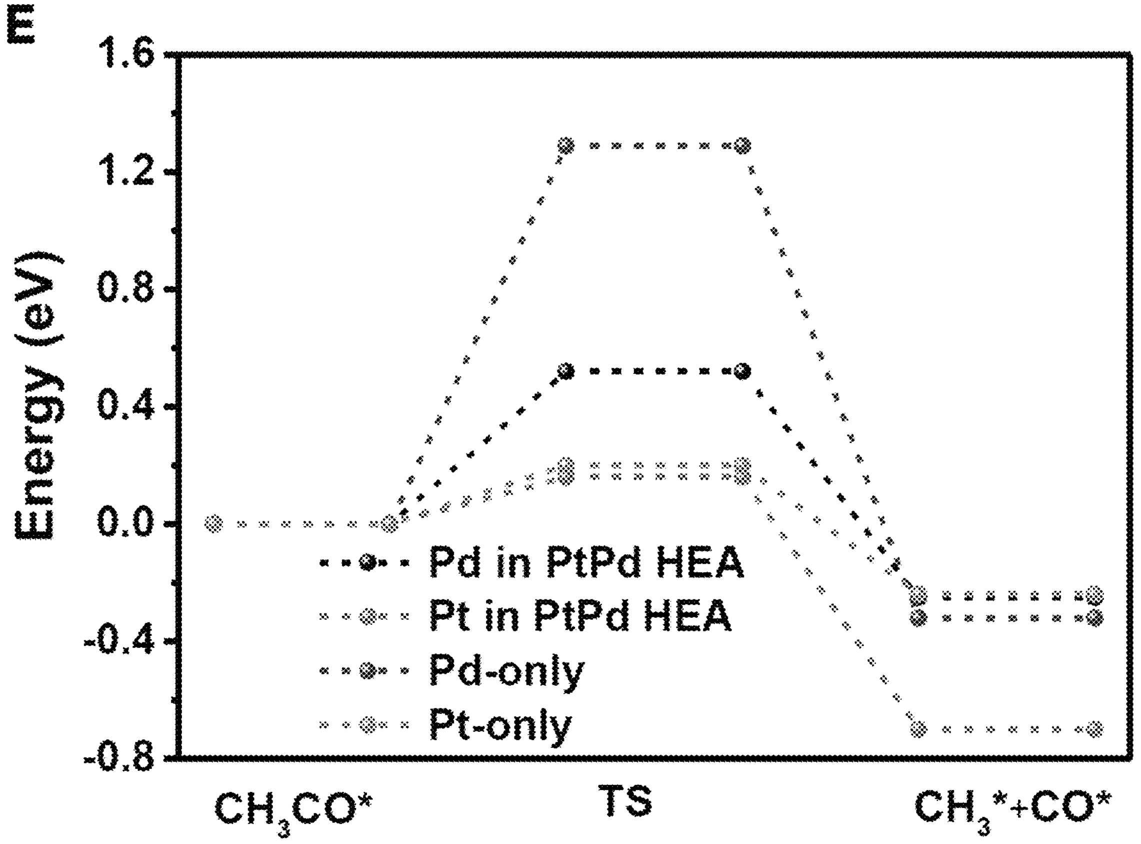
FIG. 16E is a plot illustrating a reaction energy barrier of C—C cleavage on Pt and Pd sites in the exemplary embodiment of a PtPd HEA, pure Pt, and Pd with (111) facets, according to an embodiment of the present disclosure.
Figure 16F:
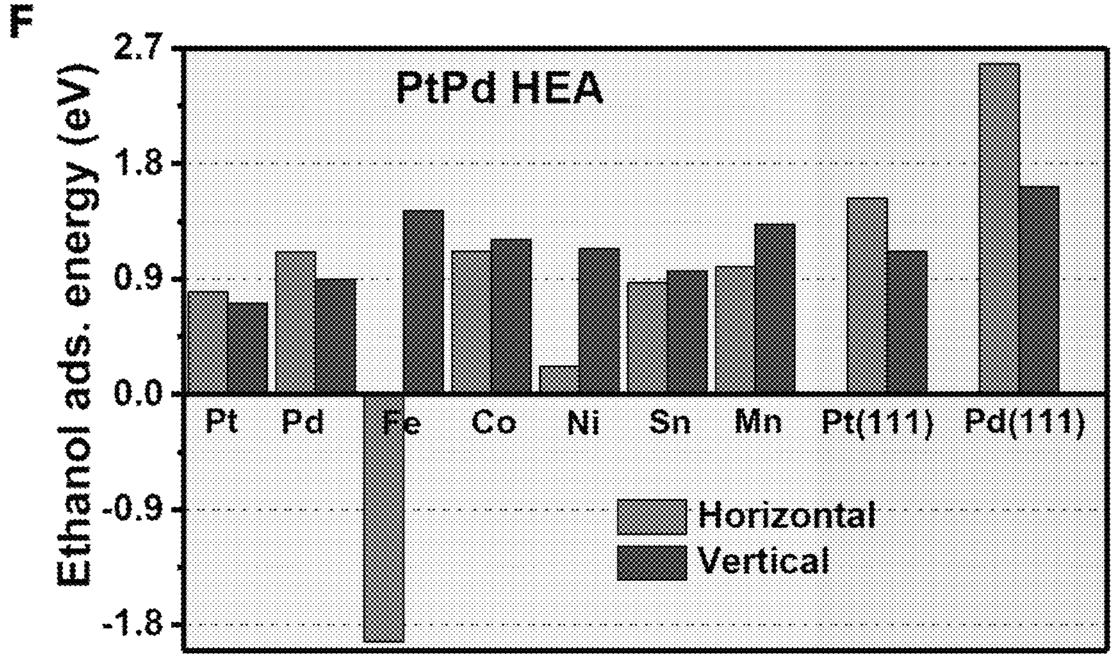
FIG. 16F is a graph illustrating an ethanol adsorption energy in an exemplary embodiment of a PtPd HEA, Pt (111), and Pd(111) facets, according to an embodiment of the present disclosure.

Another decisive reaction pathway for complete EOR to CO2 is the C—C bond cleavage of CH3CO* intermediate. The barrier of C—C bond breaking for CH3CO* intermediate was calculated using nudged elastic band (NEB) methods on the Pd and Pt sites of the HEA surface. The reaction dynamics of the same reaction were also studied on Pt(111) and Pd(111) surfaces for comparison. The results are shown in FIG. 16E. The reaction barrier on the Pt active site of HEA (0.16 eV) is slightly lower than Pt(111) (0.2 eV). This lower barrier suggests that despite the reduction of Pt content in PtPd HEA, C—C bond cleavage remains unaffected and has been stimulated due to the help of other non-PGM elements. For the Pd active site, the reaction barrier decreased from 1.29 eV for Pd(111) to 0.52 eV for the Pd site on the PtPd HEA surface. This proves that C—C bond cleavage on the PtPd HEA surface is favorable for both Pt and Pd sites. The ethanol adsorption strengths in different metal sites on HEA surfaces, as well as on Pt(111) and Pd(111), in both horizontal and vertical configurations, were further calculated, as shown in FIG. 16F. From the calculation, ethanol is bound strongly on pure metal surfaces compared with the HEA surface, which results in the difficulty of desorption for the products of EOR, leading to blocked active sites. Adsorption strength was reduced from 2.58 and 1.53 eV on the Pd(111) and Pt(111) surfaces, respectively, to 1.11 and 0.80 eV on the Pd and Pt site of PtPd HEA, as shown in FIG. 16F. Thus, a suitable adsorption strength of the ethanol molecule on the Pt and Pd sites of PtPd HEA was found due to the addition of non-PGM elements. A comparison of the adsorption strengths shows that the adsorption of ethanol on Pt and Pd marginally prefers horizontal configurations while Co, Ni, Sn, and Mn prefer vertical configurations. For the Fe site, the ethanol molecule dissociates spontaneously into OH* and C2H4* when placed horizontally, while for vertical configuration, it adsorbs with the highest adsorption energy among all the metal sites. Apart from Fe and Ni, the difference in adsorption strengths between both configurations for other adsorption sites is quite small (<30 meV). The presence of many adsorption sites, with close-lying energies, is favorable for ethanol adsorption and further oxidization. Thus, it can be predicted that the ethanol will first adsorb on the surface of non-PGM elements, and the nearby Pt and Pd are ready to oxidize ethanol thoroughly and completely on the PtPd HEA.

Example 6

Electrocatalytic ORR Performance of PtPd HEA/C

Figure 17A:
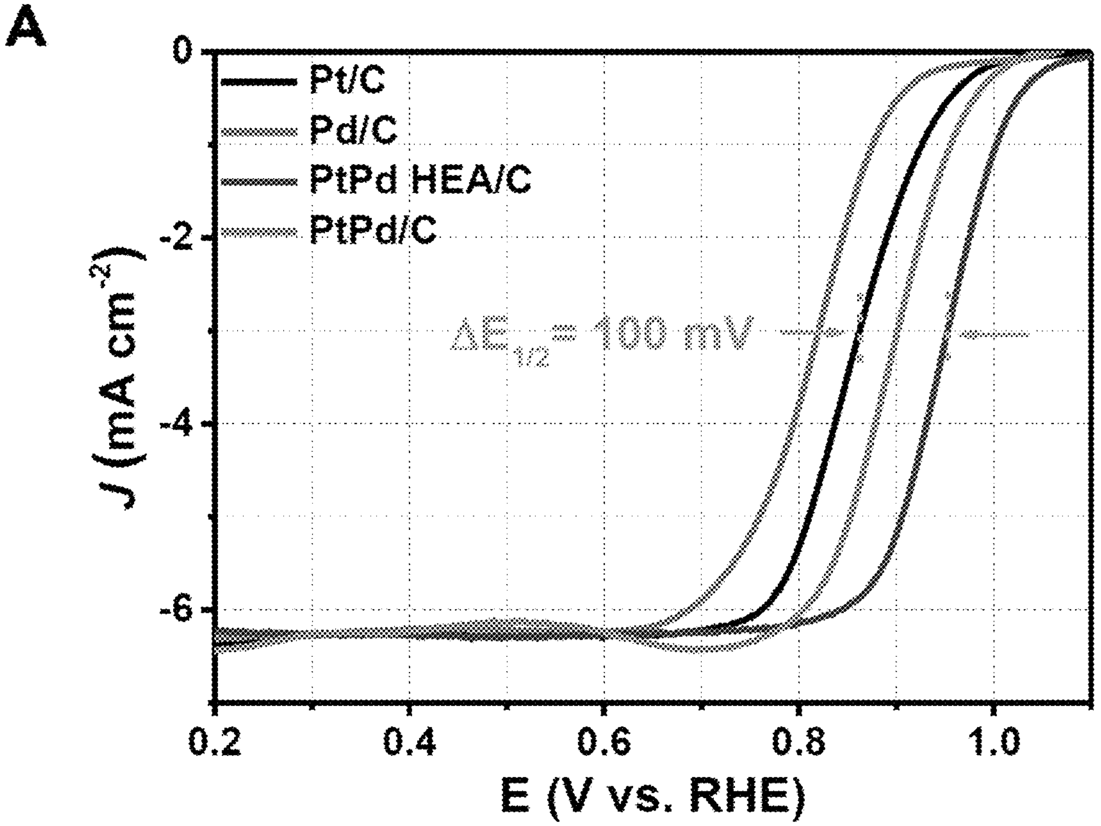
FIG. 17A is a plot illustrating ORR LSV polarization curves of Pt/C, Pd/C, an exemplary embodiment of PtPd HEA/C, and PtPd/C in 02-saturated 0.1 M KOH solution at a scan rate of 5 mV $s^{-1}$ and 1600 rpm, according to an embodiment of the present disclosure.
Figure 17B:
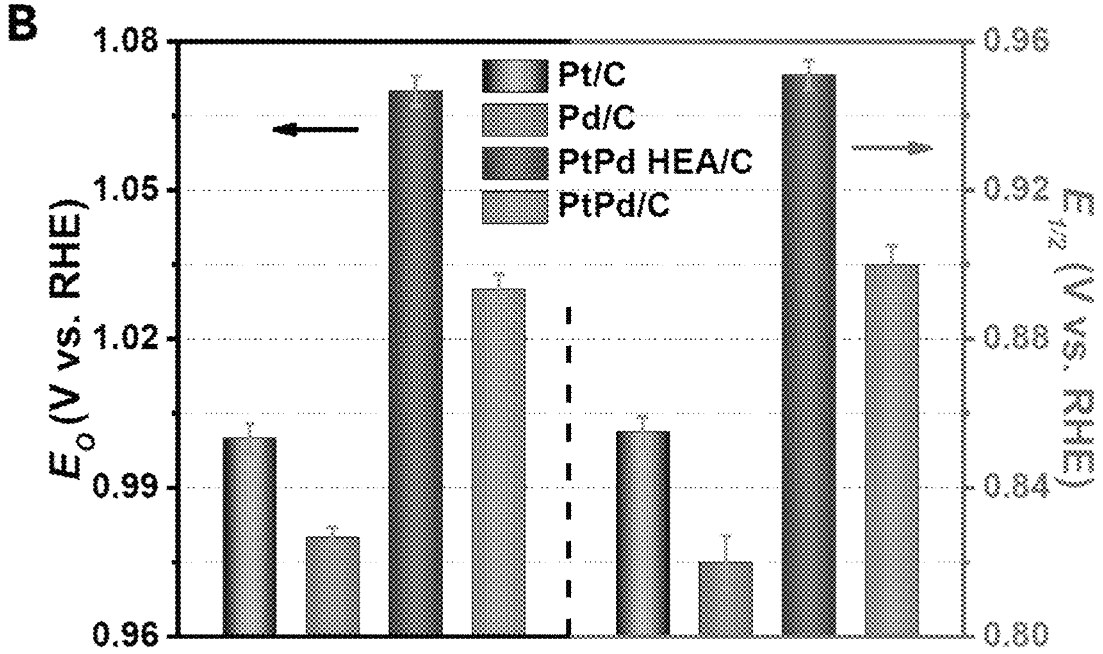
FIG. 17B is a graph illustrating an onset potential and half-wave potential for ORR on different samples, according to an embodiment of the present disclosure. The error bars represent the SD of three independent tests, and the data is presented as mean values±SD.
Figure 17C:
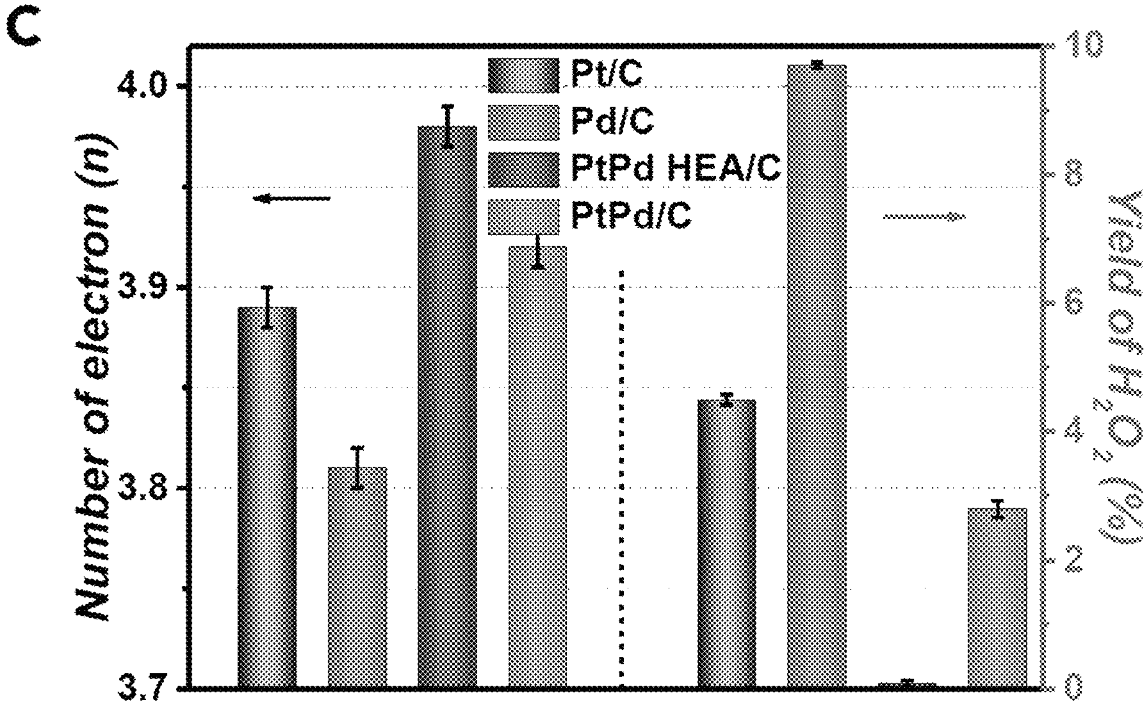
FIG. 17C is a graph illustrating an electron transfer number and $H_2O_2$ selectivity of the samples of FIG. 17B, as determined by the RRDE test, according to an embodiment of the present disclosure. The error bars represent the SD of three independent tests, and the data is presented as mean values±SD.
Figure 17D:
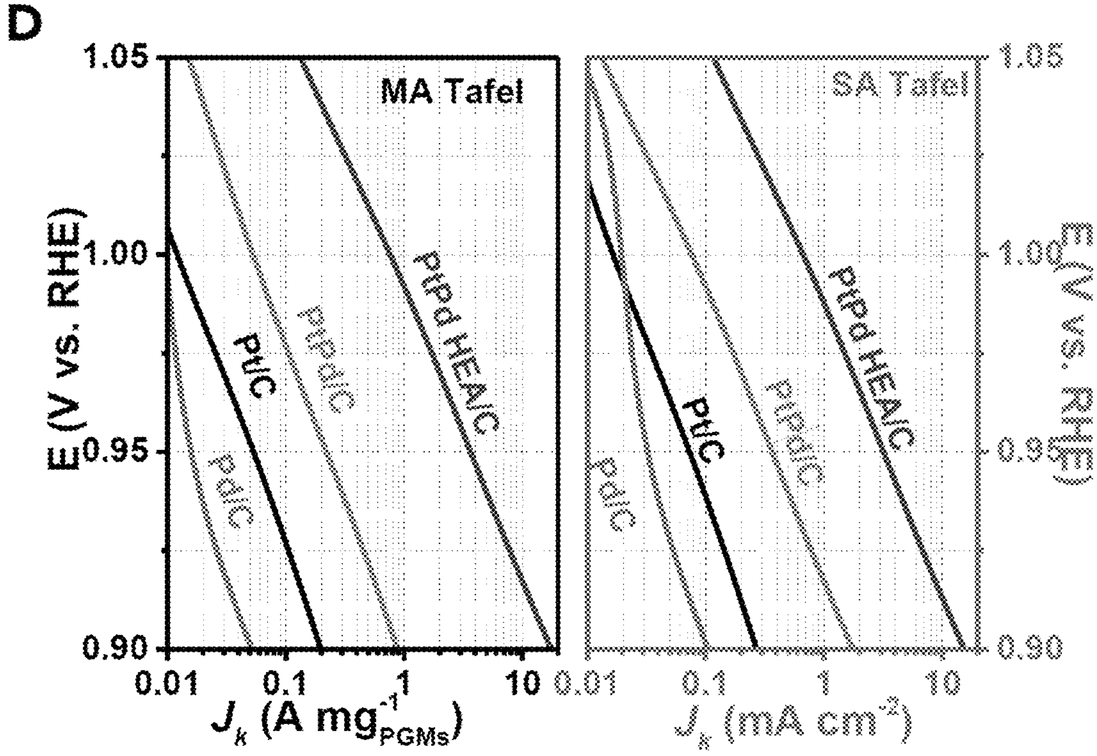
FIG. 17D is a plot illustrating Mass activity and specific activity for the samples of FIG. 17B, according to an embodiment of the present disclosure.
Figure 17E:
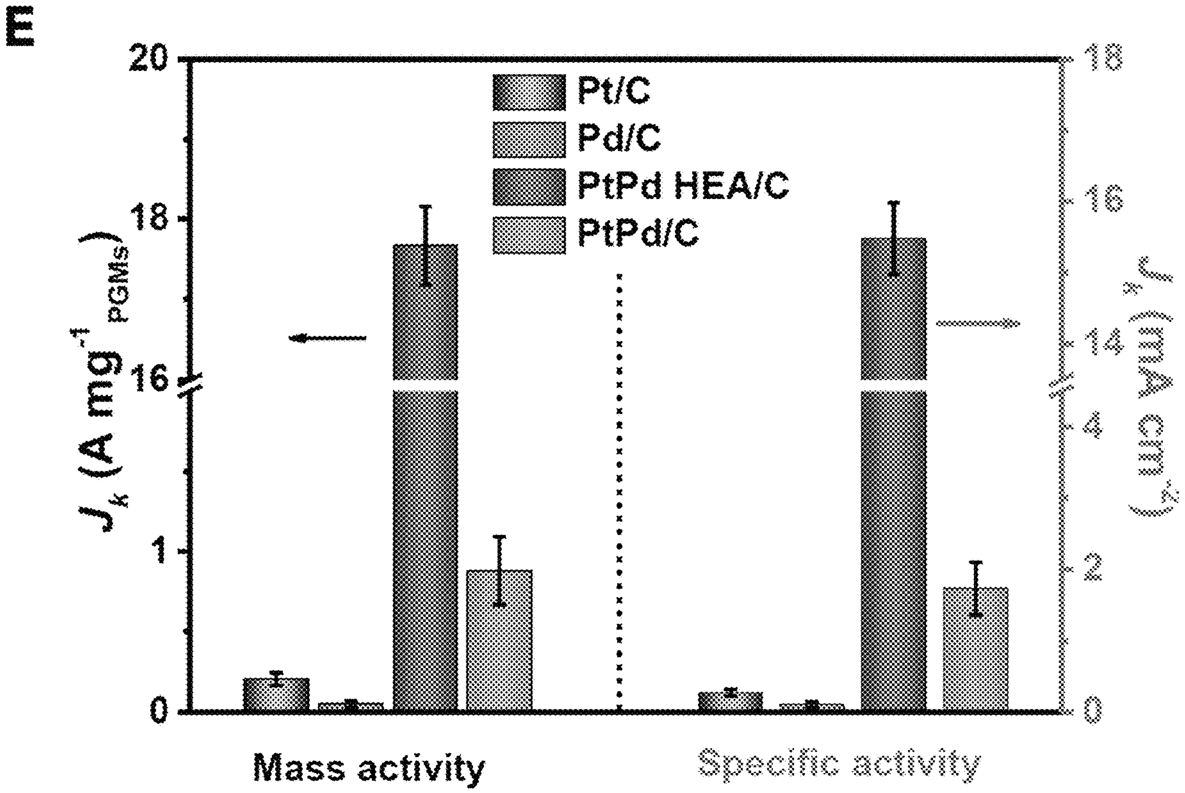
FIG. 17E is a graph illustrating a comparison of MA and SA at 0.9 $V_{RHE}$ of the samples of FIG. 17B, according to an embodiment of the present disclosure. The error bars represent the SD of three independent tests, and the data is presented as mean values±SD.
Figure 17F:
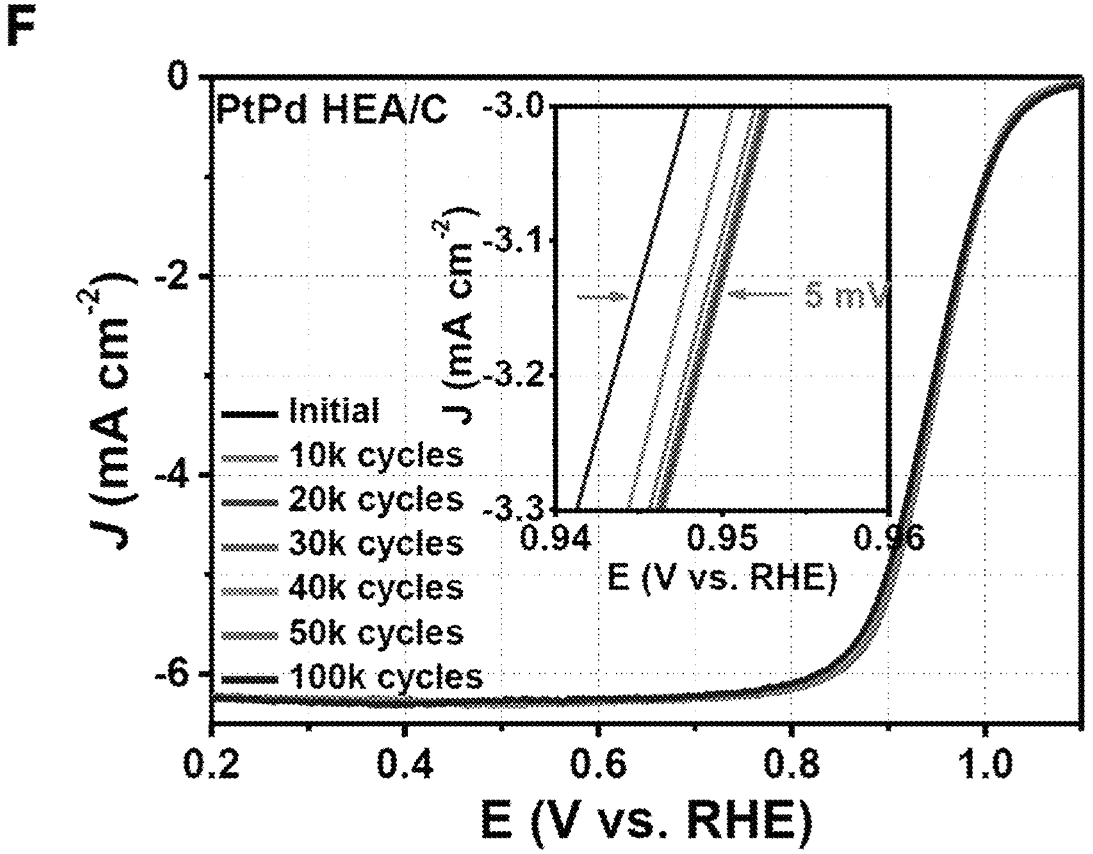
FIG. 17F is a plot illustrating ORR LSV polarization curve of PtPd HEA/C before and after 10,000, 20,000, 30,000, 40,000, 50,000, and 1000,000 cycles. The inset is the enlarges areas in near-$E_{1/2}$ regions.
Figure 17G:
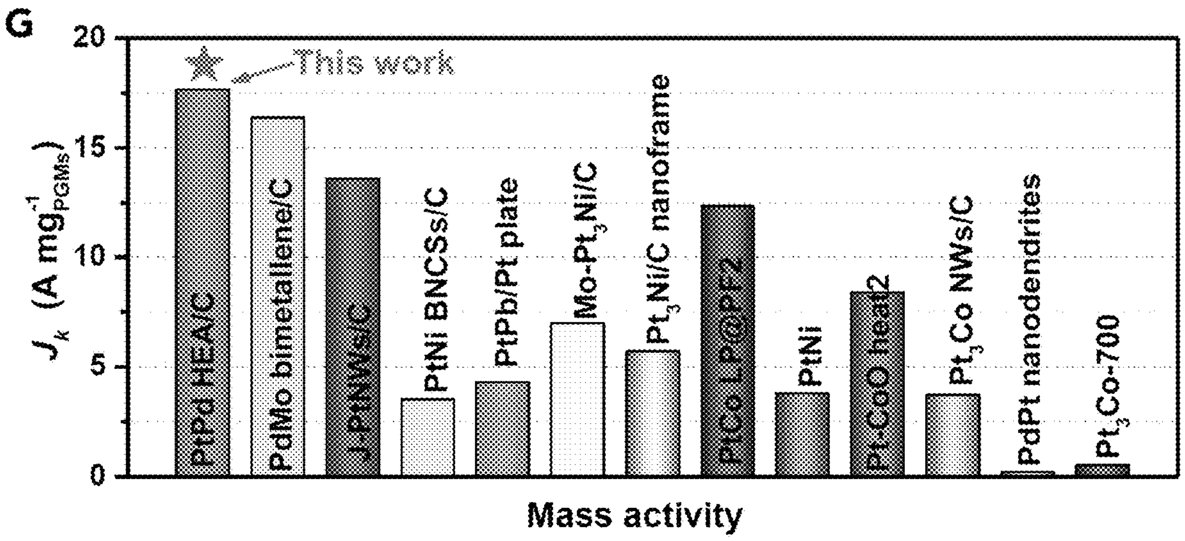
FIG. 17G is a graph illustrating a comparison of MA of PtPd HEA/C with benchmarking ORR catalysts, according to an embodiment of the present disclosure.
Figure 17H:
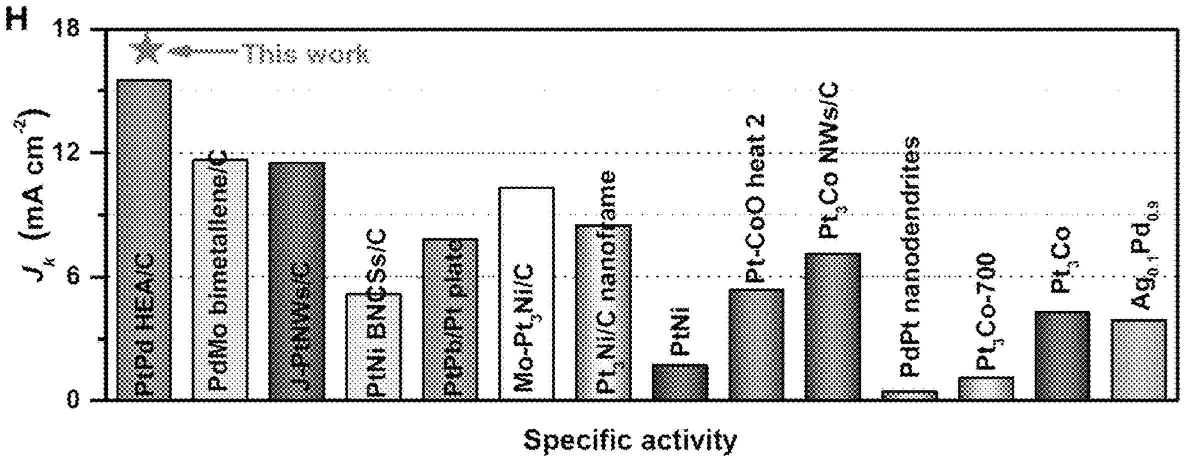
FIG. 17H is a graph illustrating a comparison of SA of PtPd HEA/C with benchmarking ORR catalysts, according to an embodiment of the present disclosure.

As the cathodic reaction in fuel cells, ORR also suffers from sluggish reaction kinetics, which can largely reduce the output performance of DEFCs. As the PtPd HEA/C has abundant active sites and plenty of configurations, it may be speculated that it should also have excellent ORR activity. Thus, the ORR activities of Pt/C, Pd/C, PtPd HEA/C, and PtPd/C were first studied and compared. As shown in FIG. 17A, the ORR linear sweep voltammetry (LSV) polarization curves in oxygen (02)-saturated 0.1 M KOH show that the half-wave potential (E1/2) of PtPd HEA/C is ca. 100 and 130 mV more positive than that of commercial Pt/C and Pd/C, respectively. Specifically, E0 and E1/2 are 1.07 and 0.95 VRHE for PtPd HEA/C, as shown in FIG. 17B, both of which are more positive than those of Pt/C (E0=1.00 VRHE and E1/2=0.85 VRHE), Pd/C (E0=0.98 VRHE and E1/2=0.82 VRHE), and PtPd/C (E0=1.04 VRHE and E1/2=0.90 VRHE). The rotating ring-disk electrode (RRDE) results indicate that an almost 4e-ORR pathway with a super-lower hydrogen peroxide ($H_2O_2$) yield (cH2O2) of <0.3% was achieved on the PtPd HEA/C, as shown in FIG. 17C, which are much better than other control samples, thus proving the superior ORR performance. The Tafel slopes of Pt/C, Pd/C, PtPd HEA/C, and PtPd/C are 71, 92, 51, and 60 mV $dec^{-1}$, respectively, as shown in FIG. 17D, indicating that the O—O bond cleavage is the rate-determining step (RDS) for all these catalysts. The smallest Tafel slope of PtPd HEA/C indicates significantly improved ORR kinetics. The kinetic current normalized by mass activities (MA) and specific activities (SA) of these samples obtained from FIG. 17D were further compared and shown in FIG. 17E. The MA and SA for PtPd HEA/C are 17.7 A mg $PGMs^{-1}$ and 15.5 mA $cm^{-2}$ at 0.9 VRHE, which are ca. 71 and 54 times greater than Pt/C (MA=0.25 A $mgPt^{-1}$ SA=0.27 mA $cm^{-2}$), 354 and 141 times higher than Pd/C (MA=0.05 A $mgPt^{-1}$, SA=0.11 mA $cm^{-2}$), and 20 and 8.9 times more than PtPd/C (MA=0.88 A $mgPt^{-1}$, SA=1.73 mA $cm^{-2}$), respectively. The PtPd HEA/C almost represents the best ORR catalysts compared with other state-of-the-art representative works, as shown in FIG. 17G and FIG. 17H.

Besides the superior activity, stability is also important for an ORR catalyst in real applications. Even after 100,000 continuous cycling accelerated stability tests (AST) between 0.6 and 1.1 VRHE, the ORR-LSV of PtPd HEA/C shows no obvious change (FIG. 4F), and the E1/2 shows only a 5 mV negative shift after 100,000 CV cycles compared with the initial curves, as shown in FIG. 17F. In contrast, the Pt/C (loss of E1/2 of 55 mV), Pd/C (loss of E1/2 of 68 mV), and PtPd/C (loss of E1/2 of 17 mV) show a dramatic performance decay after only 30,000 cycles. Previous studies have verified that the activity decay for Pd/C and Pt/C is mainly due to the loss of ECSA, particle aggregation, and Ostwald ripening. 27,55 While the structure, composition, valence state, and morphology of PtPd HEA/C have no obvious change after 50,000 cycles of EOR and 100,000 cycles of ORR test, as proved by XRD, XPS, and TEM. The chronoamperometry further proves that even after 100 h of continuous ORR tests, the activity of PtPd HEA/C can be well preserved to ca. 91.6%. In contrast, only 56.1%, 62.0%, and 89.3% of initial ORR activity were found for Pt/C, Pd/C, and PtPd/C, respectively, further proving the robust durability of PtPd HEA/C as an efficient and robust ORR catalyst.

Besides, the ORR performance of control samples without one of the seven elements was tested and compared with identify the functional roles of each element that play in PtPd HEA for ORR. All control samples show the Tafel slope between 55-85 mV $dec^{-1}$, indicating that the cleavage of O—O bonds is the rate-determining step (RDS) for ORR for all samples. The Pt and Pd sites are the major active components in HEA. Mn plays a vital role in boosting ORR performance via weakening the binding of chemical species (such as OOH*) to the Pt/Pd surface. which matches well with previous work both experimentally and theoretically. Ni will change the electronic structure (d-band center position) and arrangement of surface atoms in the near surface region of the catalyst, which results in weak interaction between the Pt/Pd surface atoms and nonreactive oxygenated species, thus increasing the number of active sites for O2 adsorption. Fe, Co, and Mn show a similar role to Ni, which further stimulates the activity of Pt and Pd. The non-PGM elements have a significant promotion effect on the Pt and Pd sites by modifying the electronic structure of Pt/Pd, and thus can enhance electron transfer efficiency for electrocatalysis. The outstanding ORR performance of other control samples indicates the universal method to produce highly efficient electrocatalysts, while all these control samples show inferior performance than PtPd HEA/C, indicating the synergistic effect of multi-active sites on the HEA significantly boosts the electrocatalytic ORR performance.

Example 7

DEFC Performance of PtPd HEA/C

Figure 18A:
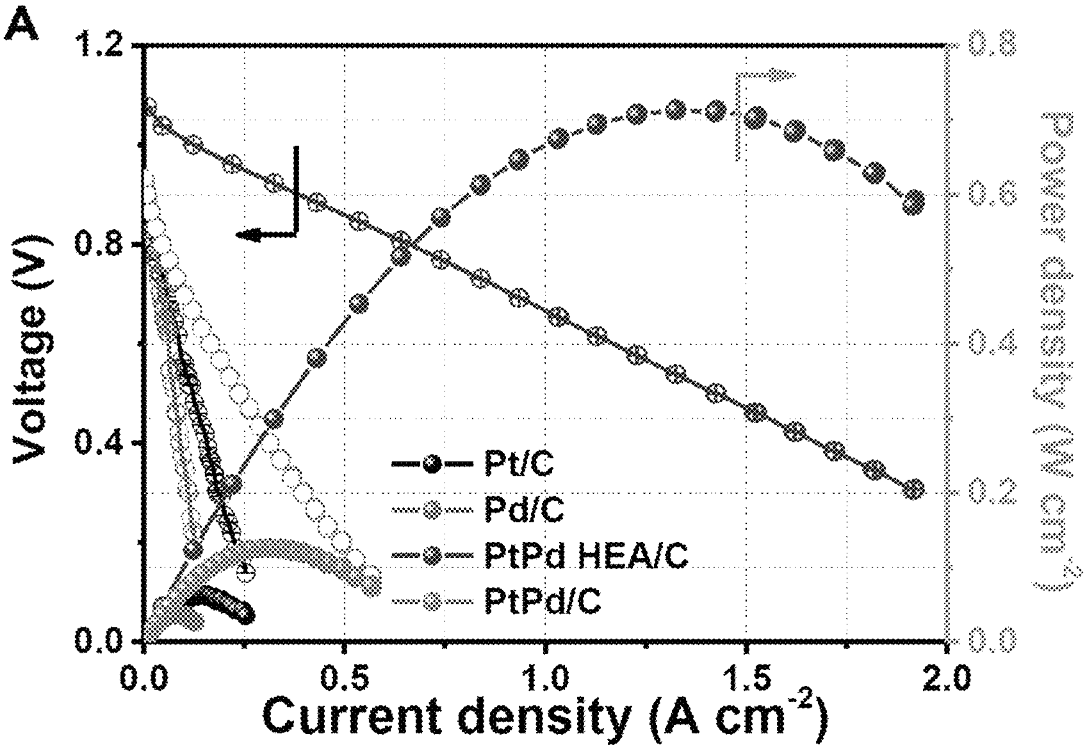
FIG. 18A is a plot illustrating steady-state DEFC polarization and power-density curve using PT/C, Pd/C, PtPd HEA/C, and PtPd/C as catalysts for MEA, according to an embodiment of the present disclosure.
Figure 18B:
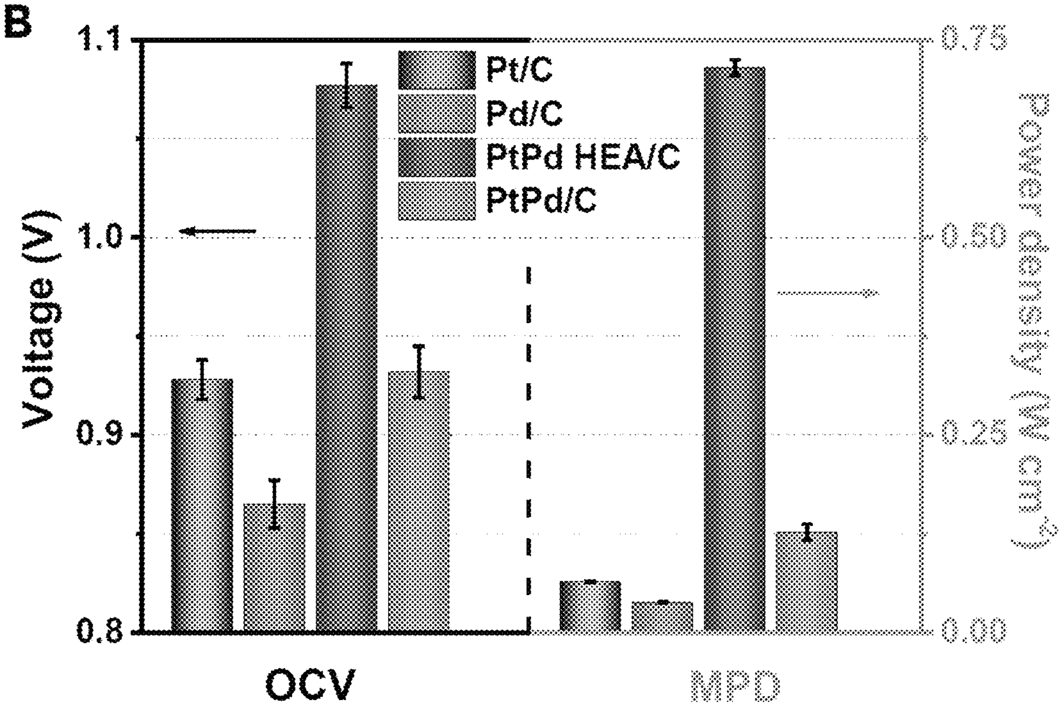
FIG. 18B is a graph illustrating an open circuit voltage and maximum power density of the samples of FIG. 18A, according to an embodiment of the present disclosure. The error bars represent the SD of three independent tests, and the data is presented as mean values±SD.
Figure 18C:
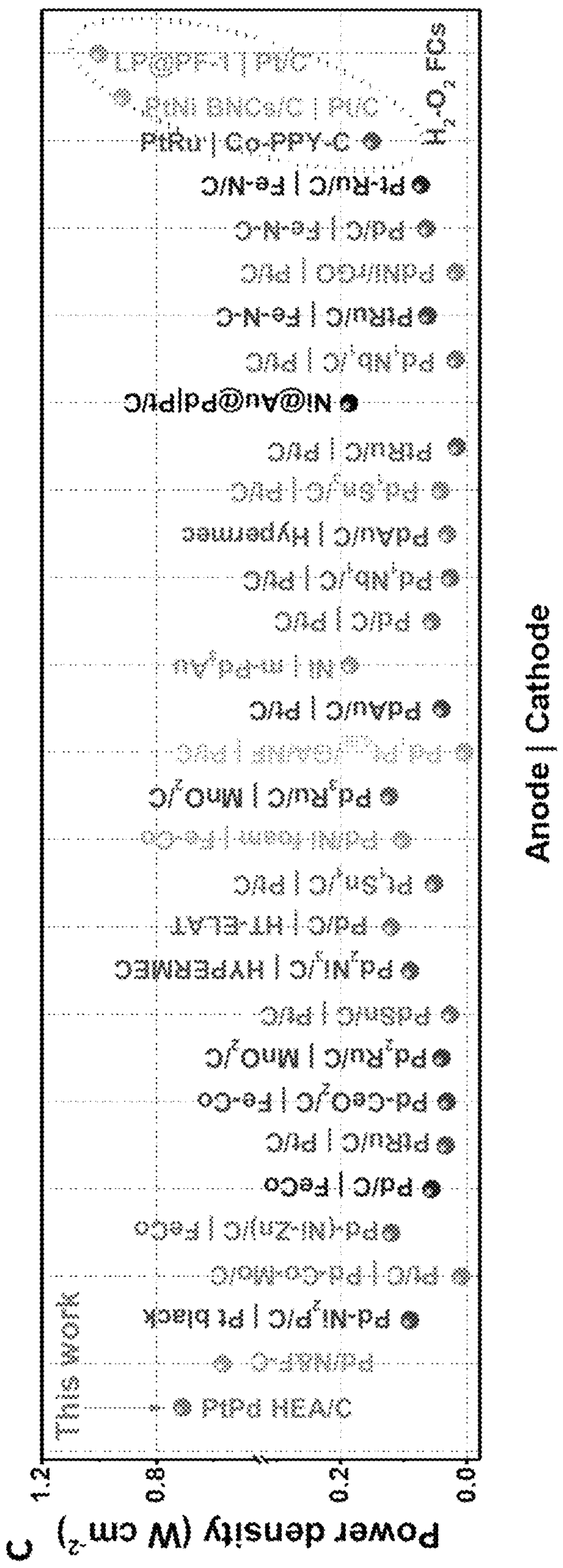
FIG. 18C is a graph illustrating comparisons of DEFCs performance with PtPd HEA/C and benchmarking catalysts, according to an embodiment of the present disclosure.
Figure 18D:
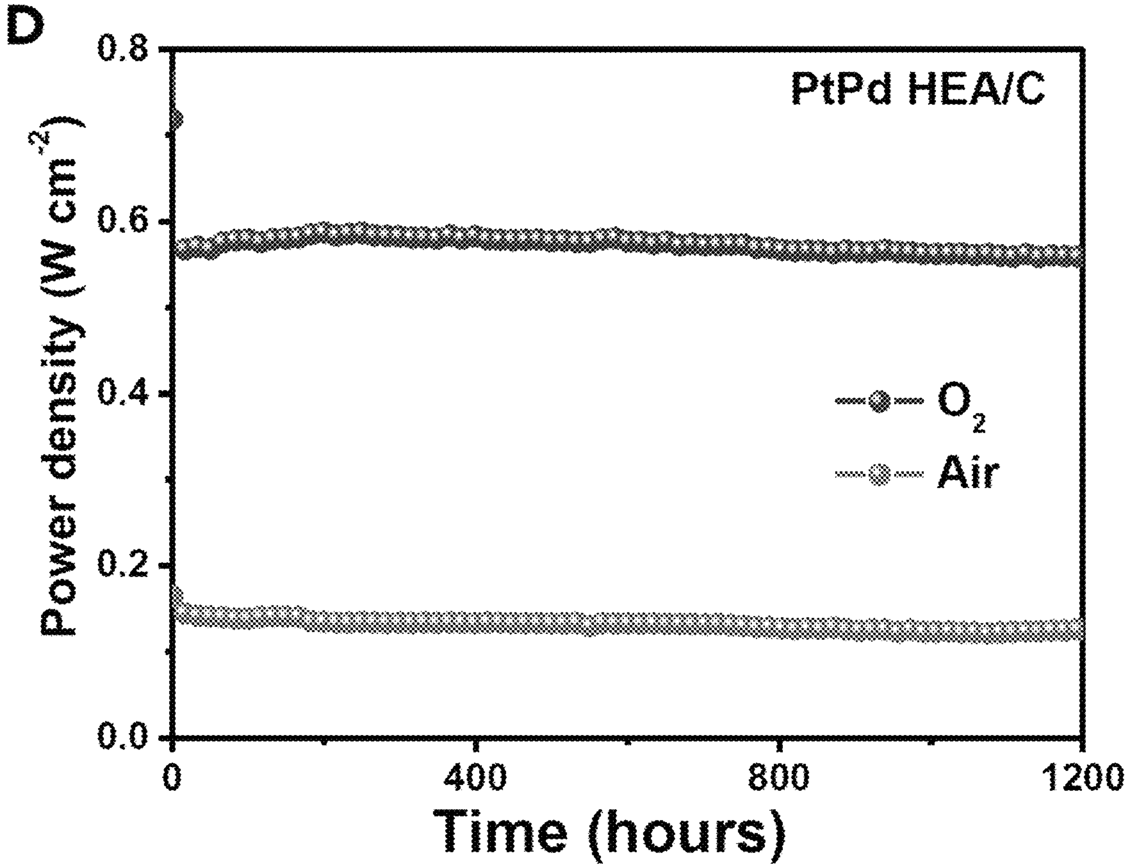
FIG. 18D is a plot illustrating discharge curves for DEFCs at 0.6 V, according to an embodiment of the present disclosure. The cathode side was fed with purity $O_2$ and air with a flow rate of 200 mL $min^{-1}$, respectively.
Figure 18E:
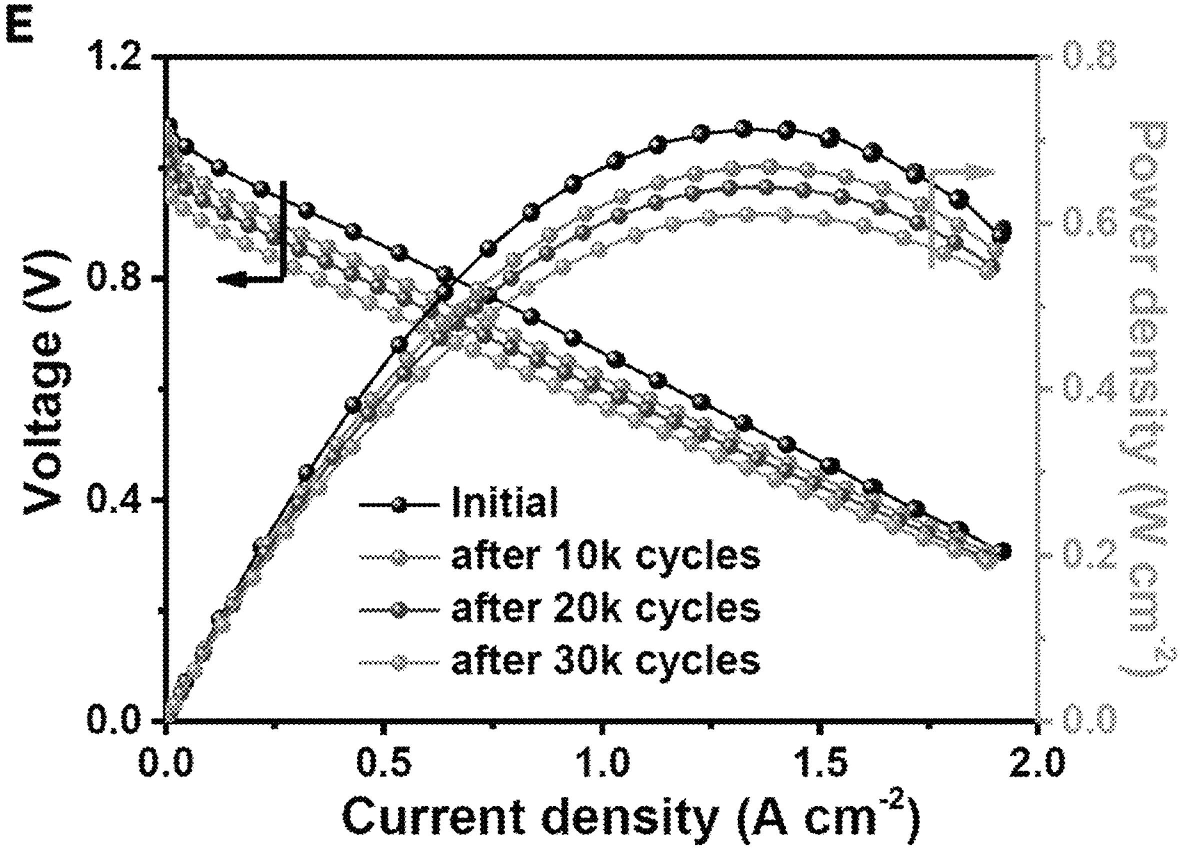
FIG. 18E is a plot illustrating stead-state DEFCs polarization and power density curves of PtPd HEA/C after voltage cycling within 0.6-0.9V for 10,000, 20,000, and 30,000 cycles, according to an embodiment of the present disclosure. The anode was fed with 1M KOH+ $2MCV_2H_5OH$ aqueous solution with a flow rate of 20 mL $min^{-1}$, and the cathode was fed with high pure $O_2$ (e.g., air with a flow rate of 200 mL min-). The test temperature was 60° C. without backpressure.

As the PtPd HEA/C shows outstanding activity and stability for EOR and ORR, the proof-of-concept application was then performed to display its feasibility in real DEFCs as both anode and cathode catalysts. The membrane electrode assembly (MEA) fabricated by PtPd HEA/C shows an open-circuit voltage (OCV) of 1.07 V, as shown in FIG. 18A and FIG. 18B, which is very close to the theoretical value of DEFCs (1.14 V)59 and much higher than Pt/C (0.92 V), Pd/C (0.87 V), and PtPd/C (0.93 V). The much higher OCV indicates a much lower polarization overpotential for DEFCs due to a lower activation-energy barrier. More importantly, the maximum power density (MPD) of PtPd HEA/C is 0.72 W $cm^{-2}$ at 1.3 A $cm^{-2}$, equivalent to a high PGM utilization of 0.16 g PGMs $kW^{-1}$. This power density is even higher than the reported Pt based single-atom catalyst in a hydrogen fuel cell (0.68 W $cm^{-2}$) with similar PGM utilization (0.13 g Pt $kW^{-1}$). As shown in FIG. 18B, the power density is ca. 11.3, 18.9, and 5.7 times higher than Pt/C (0.06 W $cm^{-2}$), Pd/C (0.038 W $cm^{-2}$), and PtPd/C (0.127 W $cm^{-2}$), respectively. The MPD of PtPd HEA/C is over 10 times higher than other state-of-the-art DEFCs and almost the same level as the performance of hydrogen fuel cells, as shown in FIG. 18C. The DEFC performance was temperature-dependent, and the maximum power density can reach 0.8 W $cm^{-2}$ at 75° C. As shown in FIG. 18D, the PtPd HEA/C MEA fed with $O_2$ or air can both operate stably at a constant working voltage of 0.6 V for over 1,200 h (i.e., 50 days) with a negligible performance decay (<4%) of the output power densities. In contrast, the power density of Pt/C, Pd/C, and PtPd/C MEA show a quick performance decay, especially for Pt/C and Pd/C MEAs, degrading to almost zero within 100 h due to the particle aggregation, Ostwald ripening, and serious CO poisoning. As shown in FIG. 18E, the stability was also tested by the AST by cycling within 0.6-0.9 V. Even after 30,000 cycles of AST, the MPD of 0.61 W $cm^{-2}$ remained on PtPd HEA/C MEA (86% of the initial one), further confirming the superior stability under DEFC operation. Thus, the PtPd HEA/C shows great promise for practical application to replace hydrogen fuel cells, which can provide similar power density with long-term operation and solve the storage and transportation problems of $H_2$.

In this work, a viable principle for the rational design of a septenary PtPd HEA with abundant and available active sites to catalyze the reactions for DEFCs was established. In addition the critical roles of each element in the PtPd HEA was identified. Pt and Pd were proved to be the active sites in HEA to catalyze EOR and ORR, while the other five non-PGM elements played a vital role in stimulating the activity of adjacent Pt and Pd active sites. Fe, Co, and Mn could adsorb water and make the Pt/Pd sites clean and ready for catalytic reactions, especially for EOR through a complete 12e pathway. Ni and Sn enhanced the activity and kinetics of EOR due to the strong electronic interactions with Pt and Pd. The electrophilic state of the five non-PGM elements makes it much easier to adsorb OH* and further promote CO oxidation. The surface-rich PtPd-skin-terminated (111) of PtPd HEA enables a large ECSA and high atomic utilization of PGMs, thus leading to superior activities for both EOR and ORR. This advanced feature endows the high-entropy material an excellent activity toward EOR through a complete 12e pathway. The PtPd HEA/C shows a mass activity of 24.3 A $mgPGMs^{-1}$ at 0.815 VRHE for EOR and 17.7 A $mgPGMs^{-1}$ at 0.9 VRHE for ORR, which are 17 and 71 times higher, respectively, than Pt/C. The DEFCs assembled using the PtPd HEA/C show a maximum power density of 0.72 $Wcm^{-2}$ and long-time stability for over 1,200 h, which outperforms other benchmarking catalysts and can be comparable with hydrogen fuel cells.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

INCORPORATION BY REFERENCE

Han N, Yang K R, Lu Z, et al. Nitrogen-doped tungsten carbide nanoarray as an efficient bifunctional electrocatalyst for water splitting in acid. *Nat Commun.* 2018; 9: 924-933.

Yang L, Zeng X, Wang W, Cao D. Recent progress in MOF-derived, heteroatom-doped porous carbons as highly efficient electrocatalysts for oxygen reduction reaction in fuel cells. *Adv Funct Mater.* 2018; 28:1704537.

Jia Z, Yang T, Sun L, et al. A novel multinary intermetallic as an active electrocatalyst for hydrogen evolution. *Adv Mater.* 2020; 32:2000385.

Sultan S, Tiwari J N, Singh A N, et al. Single atoms and clusters based nanomaterials for hydrogen evolution, oxygen evolution reactions, and full water splitting. *Adv Energy Mater.* 2019; 9:1900624.

Shao W, Tebyetekerwa M, Marriam I, et al. Polyester-MXene nanofibers-based yarn electrodes. *J Power Sources.* 2018; 396: 683-690.

Huo W Y, Wang S Q, Zhu W H, et al. Recent progress on high-entropy materials for electrocatalytic water splitting applications. *Tungsten.* 2021; 3: 161-180.

Xin Y, Li S, Qian Y, et al. High-entropy alloys as a platform for catalysis: progress, challenges, and opportunities. *ACS Catal.* 2020; 10: 11280-11306.

Tomboc G M, Kwon T, Joo J, Lee K. High entropy alloy electrocatalysts: a critical assessment of fabrication and performance. *J Mater Chem.* 2020; 8: 14844-14862.

Amiri A, Shahbazian-Yassar R. Recent progress of high-entropy materials for energy storage and conversion. *J Mater Chem.* 2021; 9: 782-823.

Kim J, Shih P C, Qin Y, Al-Bardan Z, Sun C J, Yang H. A porous pyrochlore $Y_2$ $[Ru_{1.6}Y_{0.4}]$ $O_{7-\delta}$ electrocatalyst for enhanced performance towards the oxygen evolution reaction in acidic media. *Angew Chem.* 2018; 130: 14073-14077.

Stoerzinger K A, Qiao L, Biegalski M D, Shao-Horn Y. Orientation-dependent oxygen evolution activities of rutile $IrO_2$ and $RuO_2$. *J Phys Chem Lett.* 2014; 5: 1636-1641.

Li C, Baek J B. Recent advances in noble metal (Pt, Ru, and Ir)-based electrocatalysts for efficient hydrogen evolution reaction. *ACS Omega.* 2019; 5: 31-40.

Li P, Wang M, Duan X, et al. Boosting oxygen evolution of single-atomic ruthenium through electronic coupling with cobalt-iron layered double hydroxides. *Nat Commun.* 2019; 10: 1-11.

Yu J, He Q, Yang G, Zhou W, Shao Z, Ni M. Recent advances and prospective in ruthenium-based materials for electrochemical water splitting. *ACS Catal.* 2019; 9: 9973-10011.

Liu H, Zakhtser A, Naitabdi A, et al. Operando near-ambient pressure X-ray photoelectron spectroscopy study of the CO oxidation reaction on the oxide/metal model catalyst ZnO/Pt (111). *ACS Catal.* 2019; 9: 10212-10225.

Naitabdi A, Boucly A, Rochet F, et al. CO oxidation activity of Pt, Zn, and ZnPt nano catalysts: a comparative study by in situ near-ambient pressure X-ray photoelectron spectroscopy. *Nanoscale.* 2018; 10: 6566-6580.

Wang W, Lei B, Guo S. Engineering multi-metallic nanocrystals for highly efficient oxygen reduction catalysts. *Adv Energy Mater.* 2016; 6:1600236.

Feng C, Faheem M B, Fu J, Xiao Y, Li C, Li Y. Fe-based electrocatalysts for oxygen evolution reaction: progress and perspectives. *ACS Catal.* 2020; 10: 4019-4047.

Wang X, Li Z, Wu D Y, et al. Porous cobalt-nickel hydroxide nanosheets with active cobalt ions for overall water splitting. *Small.* 2019; 15:1804832.

Yan J, Kong L, Ji Y, et al. Single atom tungsten doped ultrathin α-Ni $(OH)_2$ for enhanced electrocatalytic water oxidation. *Nat Commun.* 2019; 10: 1-10.

Zhang P, Liu Y, Liang T, et al. Nitrogen-doped carbon wrapped Co—$Mo_2C$ dual Mott-Schottky nanosheets with large porosity for efficient water electrolysis. *Appl Catal B.* 2021; 284:119738.

Liang T, Liu Y, Zhang P, et al. Interface and valence modulation on scalable phosphorene/phosphide lamellae for efficient water electrolysis. *Chem Eng J.* 2020; 395: 124976.

Bianchini, C., and Shen, P. K. (2009). Palladium based electrocatalysts for alcohol oxidation in half cells and in direct alcohol fuel cells. Chem. Rev. 109, 4183-4206.

Steele, B. C., and Heinzel, A. (2001). Materials for fuel-cell technologies. Nature 414, 345-352.

Ramaswamy, N., and Mukerjee, S. (2019). Alkaline anion-exchange membrane fuel cells: challenges in electrocatalysis and interfacial charge transfer. Chem. Rev. 119, 11945-11979

Kim, I., Han, O. H., Chae, S. A., Paik, Y., Kwon, S. H., Lee, K. S., Sung, Y. E., and Kim, H. (2011). Catalytic reactions in direct ethanol fuel cells. Angew. Chem. Int. Ed. Engl. 50, 2270-2274.

Kavanagh, R., Cao, X. M., Lin, W. F., Hardacre, C., and Hu, P. (2012). Origin of low CO2 selectivity on platinum in the direct ethanol fuel cell. Angew. Chem. Int. Ed. Engl. 51, 1572-1575.

Du, W., Wang, Q., Saxner, D., Deskins, N. A., Su, D., Krzanowski, J. E., Frenkel, A. I., and Teng, X. (2011). Highly active iridium/iridium-tin/tin oxide heterogeneous nanoparticles as alternative electrocatalysts for the ethanol oxidation reaction. J. Am. Chem. Soc. 133, 15172-15183.

Liang, Z., Song, L., Deng, S., Zhu, Y., Stavitski, E., Adzic, R. R., Chen, J., and Wang, J. X. (2019). Direct 12-electron oxidation of ethanol on a ternary Au(core)-Ptlr(Shell) electrocatalyst. J. Am. Chem. Soc. 141, 9629-9636.

Rizo, R., Ara'n-Ais, R. M., Padgett, E., Muller, D. A., La'zaro, M. J., Solla-Gullon, J., Feliu, J. M., Pastor, E., and Abruna, H. D. (2018). Pt-Rich core/Sn-Rich subsurface/Pt skin nano cubes as highly active and stable electrocatalysts for the ethanol oxidation reaction. J. Am. Chem. Soc. 140, 3791-3797.

Kowal, A., Li, M., Shao, M., Sasaki, K., Vukmirovic, M. B., Zhang, J., Marinkovic, N. S., Liu, P., Frenkel, A. I., and Adzic, R. R. (2009). Ternary Pt/Rh/SnO2 electrocatalysts for oxidizing ethanol to CO2. Nat. Mater. 8, 325-330.

Zhu, Y., Bu, L., Shao, Q., and Huang, X. (2019). Sub nanometer PtRh nanowire with alleviated poisoning effect and enhanced C—C bond cleavage for ethanol oxidation electrocatalysis. ACS Catal. 9, 6607-6612.

Wang, H., Jusys, Z., and Behm, R. J. (2004). Ethanol electrooxidation on a carbon supported Pt catalyst: reaction kinetics and product yields. J. Phys. Chem. B 108, 19413-19424.

Bianchini, C., Bambagioni, V., Filippi, J., Marchionni, A., Vizza, F., Bert, P., and Tampucci, A. (2009). Selective oxidation of ethanol to acetic acid in highly efficient polymer electrolyte membrane-direct ethanol fuel cells. Electrochem. Commun. 11, 1077-1080.

Chang, J., Wang, G., Zhang, W., and Yang, Y. (2022). Atomically dispersed catalysts for small molecule electrooxidation in direct liquid fuel cells. J. Energy Chem. 68, 439-453.

Li, M., Cullen, D. A., Sasaki, K., Marinkovic, N. S., More, K., and Adzic, R. R. (2013). Ternary electrocatalysts for oxidizing ethanol to carbon dioxide: making it capable of splitting C—C bond. J. Am. Chem. Soc. 135, 132-141.

Erini, N., Beermann, V., Gocyla, M., Gliech, M., Heggen, M., Dunin-Borkowski, R. E., and Strasser, P. (2017). The effect of surface site ensembles on the activity and selectivity of ethanol electrooxidation by octahedral PtNiRh nanoparticles. Angew. Chem. Int. Ed. Engl. 56, 6533-6538.

Kodiyath, R., Ramesh, G. V., Koudelkova, E., Tanabe, T., Ito, M., Manikandan, M., Ueda, S., Fujita, T., Umezawa, N., Noguchi, H., et al. (2015). Promoted C—C bond cleavage over intermetallic TaPt3 catalyst toward low temperature energy extraction from ethanol. Energy Environ. Sci. 8, 1685-1689.

Luo, S., Zhang, L., Liao, Y., Li, L., Yang, Q., Wu, X., Wu, X., He, D., He, C., Chen, W., et al. (2021). A tensile-strained Pt—Rh single-atom alloy remarkably boosts ethanol oxidation. Adv. Mater. 33, 2008508.

Fu, X., Wan, C., Huang, Y., and Duan, X. (2022). Noble metal based electrocatalysts for alcohol oxidation reactions in alkaline media. Adv. Funct. Mater. 32, 2106401.

Chang, J., Wang, G., Wang, M., Wang, Q., Li, B., Zhou, H., Zhu, Y., Zhang, W., Omer, M., Orlovskaya, N., et al. (2021). Improving Pd—N—C fuel cell electrocatalysts through fluorination driven rearrangements of local coordination environment. *Nat. Energy* 6, 1144-1153.

Zhang, W., Chang, J., and Yang, Y. (2023). Strong precious metal-metal oxide interaction for oxygen reduction reaction: A strategy for efficient catalyst design. Sus Mat 3, 2-20.

Huang, L., Zaman, S., Tian, X., Wang, Z., Fang, W., and Xia, B. Y. (2021). Advanced platinum based oxygen reduction electrocatalysts for fuel cells. Acc. Chem. Res. 54, 311-322.

Wang, G., Yang, Z., Du, Y., and Yang, Y. (2019). Programmable exposure of Pt active facets for efficient oxygen reduction. Angew. Chem. Int. Ed. Engl. 58, 15848-15854.

Kulkarni, A., Siahrostami, S., Patel, A., and Nprskov, J. K. (2018). Understanding catalytic activity trends in the oxygen reduction reaction. Chem. Rev. 118, 2302-2312.

Shao, M., Chang, Q., Dodelet, J. P., and Chenitz, R. (2016). Recent advances in electrocatalysts for oxygen reduction reaction. Chem. Rev. 116, 3594-3657.

Wang, S., and Xin, H. (2019). Predicting catalytic activity of high-entropy alloys for electrocatalysis. Chem 5, 502-504.

Stamenkovic, V. R., Fowler, B., Mun, B. S., Wang, G., Ross, P. N., Lucas, C. A., and Markovic, N. M. (2007). Improved oxygen reduction activity on Pt3Ni(111) via increased surface site availability. Science 315, 493-497.

Darling, R. M., and Meyers, J. P. (2003). Kinetic model of platinum dissolution in PEMFCs. J. Electrochem. Soc. 150, A1523.

Batchelor, T. A. A., Pedersen, J. K., Winther, S. H., Castelli, I. E., Jacobsen, K. W., and Rossmeisl, J. (2019). High-entropy alloys as a discovery platform for electrocatalysis. Joule 3, 834-845.

George, E. P., Raabe, D., and Ritchie, R. O. (2019). High-entropy alloys. Nat. Rev. Mater. 4, 515-534.

Yao, Y., Dong, Q., Brozena, A., Luo, J., Miao, J., Chi, M., Wang, C., Kevrekidis, I. G., Ren, Z. J., Greeley, J., et al. (2022). High-entropy nanoparticles: synthesis-structure-property relationships and data-driven discovery. Science 376, eabn3103.

Yao, Y., Huang, Z., Xie, P., Lacey, S. D., Jacob, R. J., Xie, H., Chen, F., Nie, A., Pu, T., Rehwoldt, M., et al. (2018). Carbothermal shock synthesis of high-entropy-alloy nanoparticles. Science 359, 1489-1494.

Ding, Q., Zhang, Y., Chen, X., Fu, X., Chen, D., Chen, S., Gu, L., Wei, F., Bei, H., Gao, Y., et al. (2019). Tuning element distribution, structure and properties by composition in high-entropy alloys. Nature 574, 223-227.

Loffler, T., Ludwig, A., Rossmeisl, J., and Schuhmann, W. (2021). What Makes High-Entropy Alloys Exceptional Electrocatalysts? Angew. Chem. Int. Ed. 60, 26894-26903.

Zhan, C., Xu, Y., Bu, L., Zhu, H., Feng, Y., Yang, T., Zhang, Y., Yang, Z., Huang, B., Shao, Q., et al. (2021). Sub nanometer high-entropy alloy nanowires enable remarkable hydrogen oxidation catalysis. Nat. Commun. 12, 6261.

Zhao, P., Cao, Q., Yi, W., Hao, X., Li, J., Zhang, B., Huang, L., Huang, Y., Jiang, Y., Xu, B., et al. (2022). Facile and general method to synthesize Pt-based high-entropy-alloy nanoparticles. ACS Nano 16, 14017-14028.

Li, H., Han, Y., Zhao, H., Qi, W., Zhang, D., Yu, Y., Cai, W., Li, S., Lai, J., Huang, B., et al. (2020). Fast site-to-site electron transfer of high entropy alloy nano catalyst driving redox electrocatalysis. Nat. Commun. 11, 5437.

Bai, S., Xu, Y., Cao, K., and Huang, X. (2021). Selective ethanol oxidation reaction at the Rh—SnO2 interface. Adv. Mater. 33, e2005767.

Tian, X., Zhao, X., Su, Y. Q., Wang, L., Wang, H., Dang, D., Chi, B., Liu, H., Hensen, E. J. M., Lou, X. W. D., et al. (2019). Engineering bunched Pt—Ni alloy nanocages for efficient oxygen reduction in practical fuel cells. Science 366, 850-856.

Li, M., Zhao, Z., Cheng, T., Fortunelli, A., Chen, C. Y., Yu, R., Zhang, Q., Gu, L., Merinov, B. V., Lin, Z., et al. (2016). Ultrafine jagged platinum nanowires enable ultra-high mass activity for the oxygen reduction reaction. Science 354, 1414-1419.

Sun, Y., Zhang, X., Luo, M., Chen, X., Wang, L., Li, Y., Li, M., Qin, Y., Li, C., Xu, N., et al. (2018). Ultrathin PtPd-based nano rings with abundant step atoms enhance oxygen catalysis. Adv. Mater. 30, 1802136.

Hong, W., Shang, C., Wang, J., and Wang, E. (2015). Bimetallic PdPt nanowire networks with enhanced electrocatalytic activity for ethylene glycol and glycerol oxidation. Energy Environ. Sci. 8, 2910-2915.

Wang, D., Xin, HuolinL., Yu, Y., Wang, Hongsen, Rus, E., Muller, D. A., and Abruna, H. D. (2010). Pt-decorated PdCo@Pd/C Core-Shell nanoparticles with enhanced stability and electrocatalytic activity for the oxygen reduction reaction. J. Am. Chem. Soc. 132, 17664-17666.

Chang, J., Feng, L., Liu, C., Xing, W., and Hu, X. (2014). An effective Pd—Ni2P/C anode catalyst for direct formic acid fuel cells. Angew. Chem. Int. Ed. Engl. 53, 122-126.

Chang, J., Feng, L., Liu, C., Xing, W., and Hu, X. (2014). Ni2P enhances the activity and durability of the Pt anode catalyst in direct methanol fuel cells. Energy Environ. Sci. 7, 1628-1632.

Van der Vliet, D. F., Wang, C., Li, D., Paulikas, A. P., Greeley, J., Rankin, R. B., Strmcnik, D., Tripkovic, D., Markovic, N. M., and Stamenkovic, V. R. (2012). Unique electrochemical adsorption properties of Pt skin surfaces. Angew. Chem. Int. Ed. Engl. 51, 3139-3142.

Li, M., Duanmu, K., Wan, C., Cheng, T., Zhang, L., Dai, S., Chen, W., Zhao, Z., Li, P., Fei, H., et al. (2019). Single-atom tailoring of platinum nano catalysts for high-performance multifunctional electrocatalysis. Nat. Catal. 2, 495-503.

Wu, D., Kusada, K., Yamamoto, T., Toriyama, T., Matsumura, S., Kawaguchi, S., Kubota, Y., and Kitagawa, H. (2020). Platinum-group-metal high-entropy-alloy nanoparticles. J. Am. Chem. Soc. 142, 13833-13838.

Zeng, K., Zhang, J., Gao, W., Wu, L., Liu, H., Gao, J., Li, Z., Zhou, J., Li, T., Liang, Z., et al. (2022). Surface-decorated high-entropy alloy catalysts with significantly boosted activity and stability. Adv. Funct. Mater. 32, 2204643.

Ni, W., Wang, T., Heroguel, F., Krammer, A., Lee, S., Yao, L., Schuler, A., Luterbacher, J. S., Yan, Y., and Hu, X. (2022). An efficient nickel hydrogen oxidation catalyst for hydroxide exchange membrane fuel cells. Nat. Mater. 21, 804-810.

Chang, J., Wang, G., Yang, Z., Li, B., Wang, Q., Kuliiev, R., Orlovskaya, N., Gu, M., Du, Y., Wang, G., and Yang, Y. (2021). Dual-doping and synergism toward high-performance seawater electrolysis. Adv. Mater. 33, e2101425.

Wang, Y., Zheng, M., Li, Y., Ye, C., Chen, J., Ye, J., Zhang, Q., Li, J., Zhou, Z., Fu, X. Z., et al. (2022). P-d orbital hybridization induced by a monodispersed Ga Site on a Pt3Mn nano catalyst boosts ethanol electrooxidation. Angew. Chem., Int. Ed. 61, e202115735.

Henkelman, G., Uberuaga, B. P., and Jonsson, H. (2000). A climbing image nudged elastic band method for finding saddle points and minimum energy paths. J. Chem. Phys. 113, 9901-9904.

Holewinski, A., and Linic, S. (2012). Elementary mechanisms in electrocatalysis: revisiting the ORR Tafel slope. J. Electrochem. Soc. 159, H864-H870.

Luo, M., Zhao, Z., Zhang, Y., Sun, Y., Xing, Y., Lv, F., Yang, Y., Zhang, X., Hwang, S., Qin, Y., et al. (2019). PdMo bimetallene for oxygen reduction catalysis. Nature 574, 81-85.

Huang, X., Zhao, Z., Cao, L., Chen, Y., Zhu, E., Lin, Z., Li, M., Yan, A., Zettl, A., Wang, Y. M., et al. (2015). High-performance transition metal-doped Pt3Ni octahedra for oxygen reduction reaction. Science 348, 1230-1234.

Li, S., Tang, X., Jia, H., Li, H., Xie, G., Liu, X., Lin, X., and Qiu, H.-J. (2020). Nano porous high entropy alloys with low Pt loadings for high performance electrochemical oxygen reduction. J. Catal. 383, 164-171.

Jin, Z., Lyu, J., Zhao, Y.-L., Li, H., Lin, X., Xie, G., Liu, X., Kai, J.-J., and Qiu, H.-J. (2020). Rugged high-entropy alloy nanowires with in situ formed surface spinel oxide as highly stable electrocatalyst in Zn-air batteries. ACS Mater. Lett. 2, 1698-1706.

Carrera-Cerritos, R., Fuentes-Ramirez, R., Cuevas-Muniz, F. M., Ledesma-Garcia, J., and Arriaga, L. G. (2014). Performance and stability of Pd nanostructures in an alkaline direct ethanol fuel cell. J. Power Sources 269, 370-378.

Liu, J., Jiao, M., Lu, L., Barkholtz, H. M., Li, Y., Wang, Y., Jiang, L., Wu, Z., Liu, D. J., Zhuang, L., et al. (2017). High performance platinum single atom electrocatalyst for oxygen reduction reaction. Nat. Commun. 8, 15938.

Tian, X., Lu, X. F., Xia, B. Y., and Lou, X. W. (2020). Advanced electrocatalysts for the oxygen reduction reaction in energy conversion technologies. Joule 4, 45-68.

Xiao, C., Lu, B.-A., Xue, P., Tian, N., Zhou, Z.-Y., Lin, X., Lin, W.-F., and Sun, S.-G. (2020). High index-facet- and high-surface-energy nanocrystals of metals and metal oxides as highly efficient catalysts. Joule 4, 2562-2598.

All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede and/or take precedence over any such contradictory material.

It is also to be understood that the following claims are intended to cover all of the generic and specific features of the invention herein described, and all statements of the scope of the invention which, as a matter of language, might be said to fall therebetween.

What is claimed is:

1. A high-entropy alloy (HEA) catalyst, the HEA catalyst comprising:

platinum acetylacetonate metallically bonded with palladium acetylacetonate, and five non-platinum-group metal (non-PGM) acetylacetonates forming an HEA compound;

at least one carbon atom, wherein the HEA compound is chemically bonded to the at least one carbon atom (C), forming an HEA/C construct;

wherein the HEA compound is disposed evenly upon at least one portion of a surface of the at least one carbon atom; and wherein at least one portion of a surface of the HEA/C construct comprises at least one metal oxide configured to resist CO poisoning.

2. The high-entropy alloy catalyst of claim 1, wherein the five non-PGM acetylacetonates comprise iron acetylacetonate, cobalt acetylacetonate, nickel acetylacetonate, tin bis (acetylacetonate) dichloride, and manganese acetylacetonate.

3. The high-entropy alloy catalyst of claim 1, wherein, when at least one of the five non-PGM acetylacetonates interacts with the platinum acetylacetonate or the palladium acetylacetonate, the at least one non-PGM acetylacetonate comprises a positive electron shift.

4. The high-entropy alloy catalyst of claim 1, wherein the HEA/C construct comprises strong metal-oxide bonds.

5. The high-entropy alloy catalyst of claim 1, wherein the HEA/C construct is electrochemically stable.

6. The high-entropy alloy catalyst of claim 1, wherein the HEA/C construct comprises a direct 12e pathway.

7. The high-entropy alloy catalyst of claim 1, wherein when the HEA/C construct is incorporated into an electrochemical cell, the HEA/C construct is configured to produce $CO_2$ byproducts.

8. The high-entropy alloy catalyst of claim 7, wherein the HEA/C construct incorporated into the electrochemical cell produces negligible acetate byproducts.

9. A method of optimizing a catalytic reaction within an electrochemical cell, the method comprising:

incorporating a high-entropy alloy catalyst into the electrochemical cell, the high-entropy alloy catalyst comprising:

platinum acetylacetonate metallically bonded with palladium acetylacetonate, and five non-platinum-group metal (non-PGM) acetylacetonates forming an HEA compound;

at least one carbon atom, wherein the HEA compound is chemically bonded to the at least one carbon atom (C), forming an HEA/C construct;

wherein the metal acetylacetonate is disposed evenly upon at least one portion of a surface of the at least one carbon atom;

wherein at least one portion of a surface of the HEA/C construct comprises at least one metal oxide configured to resist CO poisoning; and wherein the incorporation of the HEA catalyst into the electrochemical cell thereof optimizes the catalytic reaction within the electrochemical cell.

10. The method of claim 9, wherein the five non-PGM acetylacetonates comprise iron acetylacetonate, cobalt acetylacetonate, nickel acetylacetonate, tin bis(acetylacetonate) dichloride, and manganese acetylacetonate.

11. The method of claim 9, wherein the HEA/C construct is configured to operate continuously for at least 1,200 hours.

12. The method of claim 11, wherein the HEA/C construct is configured to retain a constant working voltage of at least 0.6 V.

13. The method of claim 12, wherein the HEA/C construct comprises a performance decay of at most 4%.

14. The method of claim 9, wherein the HEA/C construct is configured to produce $CO_2$ byproducts.

15. The method of claim 9, wherein the HEA/C construct is configured to produce negligible acetate byproducts.

* * * * *